US010346287B1

(12) United States Patent
Dillon

(10) Patent No.: US 10,346,287 B1
(45) Date of Patent: Jul. 9, 2019

(54) DETECTION OF DEGENERATE SOFTWARE FORMS IN OBJECT ORIENTED CODE

(71) Applicant: Brian S. Dillon, King George, VA (US)

(72) Inventor: Brian S. Dillon, King George, VA (US)

(73) Assignee: The United States of America, as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 16/001,334

(22) Filed: Jun. 6, 2018

(51) Int. Cl.
*G06F 8/30* (2018.01)
*G06F 8/40* (2018.01)
*G06F 8/41* (2018.01)
*G06F 11/36* (2006.01)

(52) U.S. Cl.
CPC .................. *G06F 11/366* (2013.01)

(58) Field of Classification Search
CPC ....................................... G06F 11/366
USPC ................................. 717/100–168
See application file for complete search history.

(56) References Cited

U.S. PATENT DOCUMENTS

| 5,142,668 | A | 8/1992 | Priem et al. .................. 345/627 |
| 6,356,921 | B1 | 3/2002 | Kumar et al. ................. 715/203 |
| 6,593,940 | B1 | 7/2003 | Peterson et al. ............. 715/700 |
| 7,017,077 | B2 | 3/2006 | Lowen et al. ................. 714/20 |
| 8,589,889 | B2 | 11/2013 | Kim et al. ..................... 717/127 |
| 8,788,884 | B2 | 7/2014 | Perkins et al. ............... 714/38.1 |
| 9,098,619 | B2 | 8/2015 | Bhatt et al. |
| 9,959,365 | B2* | 5/2018 | Louni ................. G06F 16/9024 |
| 10,002,678 | B2 | 6/2018 | Dambra et al. |
| 2009/0144698 | A1* | 6/2009 | Fanning ..................... G06F 8/75 717/120 |
| 2015/0135166 | A1* | 5/2015 | Tarlow ....................... G06F 8/34 717/125 |
| 2016/0191560 | A1* | 6/2016 | Pegna ................... G06F 21/552 726/23 |
| 2016/0381183 | A1* | 12/2016 | Jusko .................. H04L 63/1433 726/23 |
| 2018/0097828 | A1* | 4/2018 | Coskun ............... H04L 63/1425 |

OTHER PUBLICATIONS

S. Oloruntoba "S.O.L.I.D: The First 5 Principles of Object Oriented Design" Mar. 2015, https://scotch.io/bar-talks/s-o-l-i-d-the-first-five-principles-of-object-oriented-design.

(Continued)

*Primary Examiner* — Chat C Do
*Assistant Examiner* — Noor Alkhateeb
(74) *Attorney, Agent, or Firm* — Gerhard W. Thielman, Esq.

(57) ABSTRACT

The current invention generally relates to analysis of software and more specifically to techniques for identifying integrated code elements, e.g., those that pose harm to the software under analysis. The invention enables the automatic detection of degenerate software forms, e.g., those that violate SOLID principles. The invention also enables the automatic detection of code elements related to state. The invention provides a hybrid approach to software analysis using a pseudo-compilation process to enable control- and data-flow analysis using heuristic analysis algorithms to detect degenerate software forms at the higher semantic level usually inaccessible to static analysis tools.

4 Claims, 42 Drawing Sheets

(56) References Cited

OTHER PUBLICATIONS

S. Wagner et al.: "Comparing Bug Finding Tools with Reviews and Test", Nov. 2017, http://opendl.ifip-tc6.org/db/conf/pts/testcom2005/WagnerJKT05.pdf (preprint) https://arxiv.org/pdf/1711.05019.

M. M. Lehman et al.: "Metrics and Laws of Software Evolution", *Proc 4$^{th}$ ISMS*, 1997, http://users.ece.utexas.edu/~perry/work/papers/feast1.pdf.

V. D. Blondel et al.: "Fast unfolding communities in large networks", *J. of Statistical Mechanics* Oct. 2008 https://pdfs.semanticscholar.org/b434/c0199bbf38163abd5j995e76aa1619d39db9.pdf http://iopscience.iop.org/article/10.1088/1742-5468/2008/10/P10008/pdf preprint https://arxiv.org/pdf0803.0476.pdf.

\* cited by examiner

```
610 ─ public List<EventListener>addListeners(List<EventListener>list) ○ ─ 650
     {
         List<EventListener>myAnswer = new list<EventListener>();
                                 625
620 ─ foreach(EventListener I in list) ○
     { 635a  635b                        660
630 ─ myAnswer.Add(I); ○ ─ 670
         if(I.GetType().equals(myType))
         {
             myPrivateList.Add(I);
         }
     }
640 ─ return myAnswer; ○ ─ 680
     }
```

DETECTION OF DEGENERATE SOFTWARE FORMS IN OBJECT ORIENTED CODE

STATEMENT OF GOVERNMENT INTEREST

The invention described was made in the performance of official duties by one or more employees of the Department of the Navy, and thus, the invention herein may be manufactured, used or licensed by or for the Government of the United States of America for governmental purposes without the payment of any royalties thereon or therefor.

CROSS REFERENCE TO RELATED APPLICATION

Pursuant to 35 U.S.C. § 119, the benefit of priority from provisional application 62/516,228, with a filing date of Jun. 7, 2017, is claimed for this non-provisional application.

BACKGROUND

The invention generally relates to software analysis. In particular, the invention relates to techniques for identifying and correcting integrated code elements that pose harm to the software.

Software development involves diagnosis for identifying non-optimal code portions. One principle developed by Robert C. Martin is known as SOLID, an acronym for Single responsibility principle, Open-closed principle, Liskov substitution principle, Interface segregation principle and Dependency inversion principle. This is further described by Samuel Olonutoba on "SOLID Object Oriented Design" at https://scotch.io/bar-talk/s-o-l-i-d-the-first-five-principles-of-object-oriented-design.

SUMMARY

Conventional methods and tools for software analysis yield disadvantages addressed by various exemplary embodiments of the present invention. Fundamental metrics exist which describe ideal and adverse relationships between objects and their constituent parts. The process for program compilation maps source code into a final product that embodies all of its structure and complexity in a readily usable form. Finally, software is known to evolve over time. Unless effort is expended to maintain the situation, the software will degenerate.

Exemplary embodiments provide the ability to automatically detect degenerate software forms related to violations of the SOLID principles and to state-related program elements. Exemplary embodiments afford the developer the ability to identify and prioritize areas of concern which may be used to improve the health of the program. In addition, exemplary embodiments provide the novice programmer (one who is unfamiliar with a specific codebase and has need of a guide or oracle as to its structure and content) access to design introspection for the software program. Each of these embodiments represents an ability that the developer already has. However, the automation of that task accomplishes the same goal without the expenditure of human hours and at a known high level of competency.

Various exemplary embodiments provide a hybrid approach to software analysis that uses a pseudo-compilation process to enable control and data-flow analysis. Other various embodiments additionally provide heuristic analysis algorithms that detect degenerate software forms at the higher semantic level usually inaccessible to static analysis tools.

BRIEF DESCRIPTION OF THE DRAWINGS

These and various other features and aspects of various exemplary embodiments will be readily understood with reference to the following detailed description taken in conjunction with the accompanying drawings, in which like or similar numbers are used throughout, and in which:

FIG. 6 is a diagram view of an instruction code sequence.

DETAILED DESCRIPTION

Figure 1:
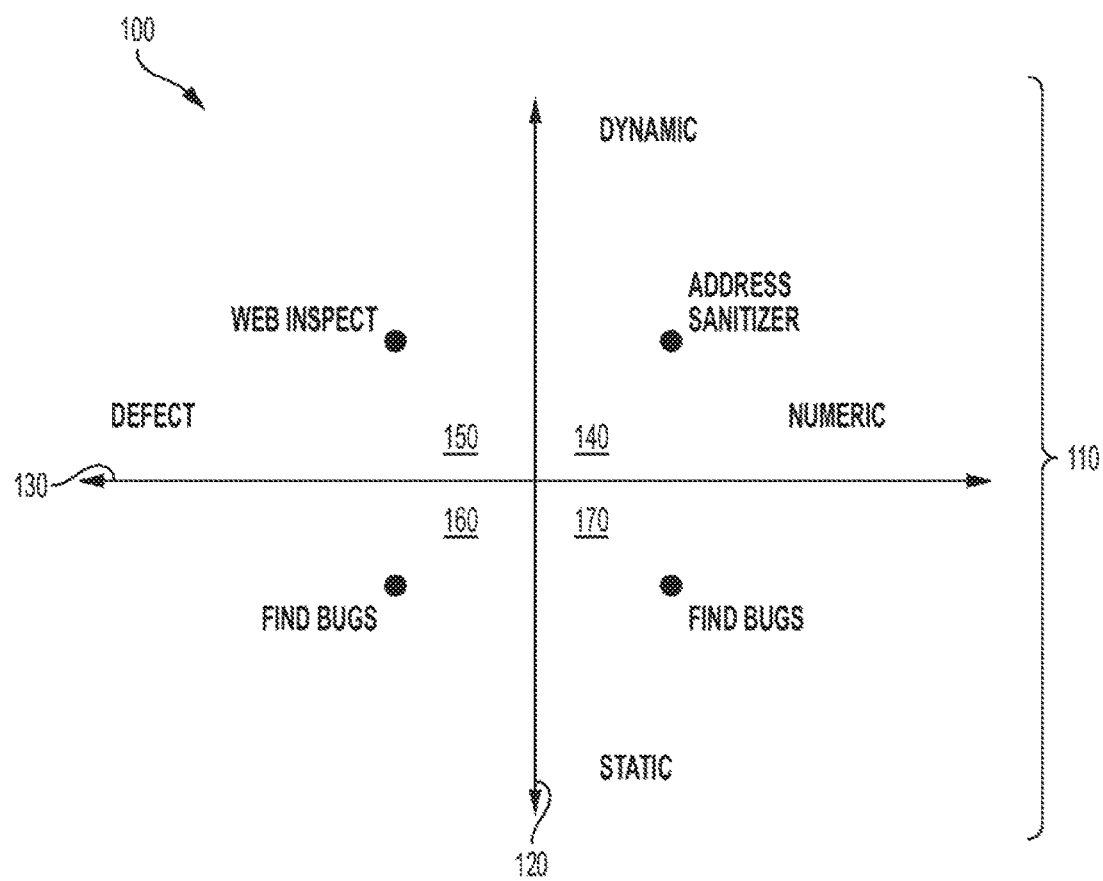
FIG. 1 is a graphical view of code analysis techniques.

In the following detailed description of exemplary embodiments of the invention, reference is made to the accompanying drawings that form a part hereof, and in which is shown by way of illustration specific exemplary embodiments in which the invention may be practiced. These embodiments are described in sufficient detail to enable those skilled in the art to practice the invention. Other embodiments may be utilized, and logical, mechanical, and other changes may be made without departing from the spirit or scope of the present invention. The following detailed description is, therefore, not to be taken in a limiting sense, and the scope of the present invention is defined only by the appended claims.

In accordance with a presently preferred embodiment of the present invention, the components, process steps, and/or data structures may be implemented using various types of operating systems, computing platforms, computer programs, and/or general purpose machines. In addition, those of ordinary skill in the art will readily recognize that devices of a less general purpose nature, such as hardwired devices, or the like, may also be used without departing from the scope and spirit of the inventive concepts disclosed herewith. General purpose machines include devices that execute instruction code. A hardwired device may constitute an application specific integrated circuit (ASIC), a field programmable gate array (FPGA), a digital signal processor (DSP) or other related component.

Section I: Software Definitions. The following background sections exhibit a non-exhaustive list of terminology and definitions that are referred to in the description. They are explained here as a reference so that the description will not be continually interrupted by additional definitions.

Part I.1: Software Analysis Tools—During software development, programmers usually employ automatic analysis tools to determine characteristics of the software they are producing. Analysis tools fall into two broad categories: dynamic and static. Dynamic analysis tools insert instruments into the source code and then execute the code to determine the flow of control and data through the program. Instrumentation in this case refers to adding source code that logs data and control flow details without disturbing the underlying program. The instrumented code now runs normally and provides a verbose log that indicates what data are present when the code ran and where control flow moved through the program. Such verbose logging can also be read automatically to create data summaries in various output formats that are easily read and interpreted by humans.

Static analysis tools examine the text of the source code. In other words, the metric program reads the text of the source code, analyzes what is present, and determines characteristics of the program based on that analysis. Static analysis plays to the strength of the computer. As an example, the word "responsibility" and misspelled "responsibility" differ by only one character. To a human, the difference is negligible, but to a computer the words are completely different. The static analyzer is assisted by the fixed syntax of the programming language which is mathematical in nature and devoid of the ambiguities found in all human languages. With these advantages, the static analyzer is able to detect syntax-level defects with great ease and more accuracy than a human developer.

Static analysis methods, however, are limited by the computer's inability to assess semantic material. Stefan Wagner et al. found that while static analysis detected many syntax errors, humans found errors that are completely undetected by static analyzers. Because the latter are more complicated, the relative value of the static analysis was low. Further information is available with their "Comparing bug-finding tools with reviews and tests" at http://opendl.ifip-tc6.org/db/conf/pts/estcom2005/WagnerJKT05.pdf.

Static and dynamic analysis tools are also very different in their capabilities and runtime characteristics. Static analysis, for example, tends to be completed rather quickly with low amounts of memory usage to provide individual, specific findings that often refer to few lines of code or even one. Nevertheless, static analysis cannot detect data or control flow anomalies. On the other hand, dynamic analysis tends to run for longer and may consume more memory to produce more complicated results displaying complex relationships that are not obvious from static analysis alone.

Analysis tools can also be divided another way into defect detectors and numeric indicators. Defect detectors attempt to find faults in the program that need to be rectified. In theory, a defect detector can find problems of which the programmer is unaware, increasing the effectiveness of the programmer. Certainly a programmer can learn from these metrics in order to improve individual native ability for future programming as well as resolve current problems detected by the tool. A numeric indicator determines a set of quantifiable values that describe the characteristics of the software. This category of tool may be referred to as the "beautiful numbers" approach to programming. Although "acceptable" values and "detectable" thresholds may be adjusted, all numeric indicators attempt to identify good or bad code based on its conformation to these numeric parameters.

FIG. 1 shows a diagram view 100 of a software metric categorization surface 110 divided by vertical axis 120 quantifying the method of analysis and horizontal axis 130 quantifying the type of result. The axes 120 and 130 separate the surface 110 into four quadrants identified anti-clockwise into categorization schemes based on tools: Address Sanitizer 140, Web Inspect 150, FindBugs (defect) 160 and FindBugs (numeric) 170. This quadratic map for surface 110 shows metrics that fit into the surface described by these two broad categorization schemes. Note that FindBugs, a free static analysis tool, appears in both defect 160 and numeric 170 categories. This is because some of the many hundreds of algorithms that compose FindBugs are purely numeric, while others are defect-oriented. Compare this with Web Inspect 150, that attempts to provoke or detect security defects within a functioning website, or Address Sanitizer 140, that tracks the address space accessed by a functioning program. Both of these dynamic tools require a functioning program to test, but they identify very different findings. Like FindBugs, many available tools identify both numerical and defect-based findings because the tool incorporates a variety of software metric algorithms.

Part I.2: Software Metrics—Cohesion is a numeric quantity that describes the strength of internal connections between program elements. Generally used within an object or class, cohesion is considered to be desirable and should be increased. A class that shows a high cohesion value is well written; its members are highly related to each other. A class with low cohesion is poorly written; its members have little or no relation to each other. The exact method of calculation varies from tool to tool, but is generally a weighted sum of connection counts between program elements considered to be within a module or group.

Coupling is a numeric quantity that describes the strength of external connections between program elements. Generally used between at least two objects or classes, coupling is considered to be bad and should be decreased. Two classes that show high coupling are poorly written; they cannot change independently of each other. Two classes with low coupling are well written; each can change independently without significantly altering the other. The exact method of calculation varies from tool to tool, but generally involves a numeric indicator related to imports, class names, and extra-class references.

The SOLID programming principles are based on the concepts of coupling and cohesion. These metrics are designed for object-oriented code. The name SOLID is a mnemonic taken from each of the five principles. The single-responsibility principle (SRP) refers to the need for one purpose for each object. An object that attempts to handle two responsibilities has a low cohesion and often suffers from other design failings. On the other hand, two objects that attempt to handle the same responsibility have a high coupling along with other related design failings. Adhering to SRP helps to improve overall software design.

The open/closed principle (OCP) refers to the need to avoid changes in previously written code. An object that has been written once should be closed—no further changes should be permitted or required to satisfy the needs of newer code. At the same time, any object should be open to extension by child classes, composition and other techniques enabling augmented functionality that does not abrogate the original program.

The Liskov substitution principle (LSP) is the least accessible to laymen and as it is not relevant to this invention it will only be given a limited description here. Essentially the LSP requires that any object that agrees to fulfill a contract must do so as specified and that failing to meet with that contract is a sign of poor program design.

The interface segregation principle (ISP) is based on the interface, a program contract that describes some available functionality and may be limited to even a single program element. Limited interfaces, sometimes called role interfaces, enable interaction between objects without revealing non-interface capabilities. This prevents additional coupling between classes. Good code should use interfaces rather than class types for most interactions.

The dependency inversion principle (DIP) is also irrelevant to the exemplary embodiments. The DIP refers to the relationship between high-level, abstract programming constructs and low-level detailed constructs. Following this principle leaves the high-level program free to act on an abstraction without particular concern for the low-level details.

Part I.3: Software Compilation Process—Source code is produced as at least one text file containing text lines that can be compiled into an executable file. The compilation process takes place in four stages. First, the file or files are read according to semantic rules of the programming language in order to produce an abstract syntax tree (AST). The semantic rules of the programming language must be non-ambiguous, meaning that only one tree is possible as the interpretation for any segment of code. These rules must also be precise, often requiring multiple levels of definitions that are overly redundant from a human perspective, but are necessary to completely categorize the full range of valid program syntax.

Once an AST has been produced, the identifiers within the file(s) are inserted into a table. Identifiers are plain text strings that name specific portions of the code. The compilation process may incorporate a variant of name-mangling, a process by which an identifier is expanded using other characteristics (e.g., the type of a field) in order to further distinguish it from other identifiers. Once the identifiers are all registered in the table, that table is used as a ready reference to the specific sections of memory for each program element.

In the third stage of compilation, separate files are linked together. Linking enables a new source code file to refer to other files. This reference can be part of the native programming language or a standard program library to be included in the available program code. By including such a library, all of the previously created source code becomes part of the new file, giving the program all of those capabilities. Because of the registration step, these libraries are already registered and their members can be readily accessed. When all files have been linked, each statement in the source code can be directly read as a set of operations on known memory addresses.

The final step in compilation is the transcription of individual statements. Typically, this process creates byte code which is readily executed by a computer. Compiler technology has been developed over many years to optimize the final byte code by taking advantage of low-level memory and processing techniques. After the transcription process, the compiled program bears little resemblance to the original source code, but all the structures, dependencies, and content of the source code are embodied in the compiled program.

Part I.4: Laws of Software Evolution—Although multiple names have been used for this phenomenon, this invention description will use the terminology chosen by M. M. Lehman et al.: "Metrics and Laws of Software Evolution" at *Proc. 4th International Software Metrics Symposium* 20-32 as they described the laws of software evolution. See http://users.ece.utexas.edu/~perry/work/papers/feast1.pdf. The laws of evolution state that a program must change to be relevant (I), but that such change leads to increased complexity (II), size (VI), and decreased quality (VII). In order to prevent, reverse, or ameliorate these trends care must be taken to maintain a steady working pace (IV) and retain knowledge of the software (V), which is a form of self-regulation (III). Lehman actually argued that these laws are self-stabilizing in a multi-loop feedback system (VIII). Lehman showed through studies of various programs under development that distinct trends are discernable in terms of productivity, growth, and complexity. His laws also warn that effort must be expended in order to retain control of the software.

Lehman's terminology describes the phenomenon, but does not consider whether the effect has produced a net advantage or disadvantage. For exemplary embodiments, the term "degenerate form" will be used in reference to any software which has evolved in a negative way. The term is meant to be generic and refers only to the design of the software, not the function. In other words, a software application may satisfy its requirements and yet be built wrong (i.e., exhibit degenerate software forms) that are detrimental to its health.

Section II: Pseudo Compilation Process. As described above in Section I.3, compilation is a multi-staged process which converts text files containing source code into a useful compilation product, typically executable byte code. The pseudo compilation process that supported these embodiments, however, creates a graph of vertices and edges representing individual program elements and their relationships as the final compilation product. These vertices are further tagged with a variety of information that enabled a knowledgeable developer to locate the exact file and line of code within that file that was indicated by the vertex in the graph—a theme that repeats frequently in the metric output. Critical to the formulation of these metrics, the graph contained the following properties.

Part III.1: Hierarchical Structure (see VII)—The fundamental structure of the graph is a tree descending from a parentless root representing the declarations of the program. Each vertex in the graph was a member of another vertex and could contain zero or more members itself. This structure naturally follows from the relationships defined by the program such that packages contain classes that contain fields.

Part II.2: Relationships—A number of distinct data and control relationships between types are identified in the compiled graph. These relationships form a network of links that is superimposed on and unrelated to the hierarchy. Each edge in this network represents a relationship between two program elements (e.g., a literal value '3' is written to a field 'x'). Some of these relationships, like the type associated with a field, are irrelevant to the metrics. Other metrics may be developed that are dependent on those relationships, however, and they are left in the graph for the time being. The relationships relevant to exemplary embodiments include the following:

Part II.2.A: Read—Variable x is said to read variable y when the value of x is changed by the value of y. The relationship is also used to describe class-member accesses such as myObject.member, the setting of a formal parameter by an actual parameter, and the return value of a method. All of these phenomena indicate that one program element is used to change or affect the value of another and thus a read relationship is created. The relationship may be identified as a FROM dependency, but the difference at that point is purely semantic.

Part II.2.B: Access/Write—Variable y is said to write to variable x when the value of x is changed by the value of y. This relationship is obviously the reciprocal of the Read relationship and is a TO dependency. The only distinction between Write and Access is that Access is used purely to follow membership relationships as in myObject.member while Write is used only to follow data relationships. The former "dot" syntax typical of many C-derived programming languages indicates that the myObject variable is only being used to gain access to the member of that object. No data transmission is involved.

Part II.2.C: Member/MemberOf—These reciprocal relationships indicate the hierarchical nature of the program structure and are used frequently to determine the type to which a member belongs or the members of a type. While lower levels of granularity (scopes, control structures, and statements) exist in the graph, these are incidental to the main hierarchical relationships.

Part II.2.D: NewImplementation—In object-oriented programming, classes may be related hierarchically and functions in the higher or parent class may be redefined to meet the specific needs of the lower or child class. Each lower or child class can define its own implementation of the parent's function, creating a new branch in the tree structure which is imposed on the graph. This exemplary relationship was provided only to demonstrate that overwrite dependencies between various implementations of the same function by a child class. ClassA defines a method print( ) for printing its contents, but such a method cannot take into account all possible child classes that may descend from the original class. ChildClassB can define its own implementation of print( ). Then ChildClassB.print( ) is said to be a NewImplementation of ClassA.print( ).

Part II.2.E: Control—Control structures are common program elements that determine the flow of the program, and control dependencies show where an object member was used in determining the flow of control through the program. Various program elements may be used in determining which of several flow paths will be taken. For example, the common while loop employs a Boolean expression to determine whether control will flow into the nested scope of the loop. Any program element that features in that Boolean expression necessarily has a control relationship with the while loop.

Part II.2.F: Statements—A statement is a single line within a source code file that shows how the two program elements are related. In the graph each relationship link is tagged with a statement. For example, an algebraic statement c=sqrt(b*b+a*a) indicates that a and b are both used to set the value of c. The Read and Write relationships between members {a, c} and {b, c} are associated with the original statement. The use of statements served two purposes. In the metrics exact relationships could be determined based on the statement associated with the relationship. Also, that statement enabled a knowledgeable developer to identify the exact file and line of the code within that file where the relationship was created.

Part II.3: File Structures—These vertices and relationships are stored in a file structure for future recall and further analysis. While various file structures may be used by those skilled in the art, exemplary embodiments include the following description of such file structures.

Part II.3.A: Vertices—Individual vertices within the graph file, including statements, are represented by a number of data points and contain only a limited amount of data points related either to its position in the graph or to its origin in a source code file. These data points are: a numerical identifier (ID), the type of node (e.g., Package, Class, Field, etc.), the text of the identifier (e.g., "myVariable"), the line and character location of the definition, and the file of the definition. In some nodes, at least one of these data points was irrelevant (e.g., there is no identifier for a scope), and so a null character was used as a placeholder.

Part II.3.B: Edges—Individual edges contain even fewer data points. Each edge indicates the type of relationship as well as three IDs for the vertices on either end and the relevant statement. Some edges contain no statement as a relationship was unrelated to any specific line in the source code (e.g., new implementations lack an express line of code associated with the condition). Edges do not require unique identifiers, and in fact two or more edges of the same relationship could exist between the same two nodes. For a unique relationship (e.g., a specific write from y to x), then the statement serves as a unique identifier.

Section III: Performance Considerations. Upon production of the graph file, the original source code is irrelevant. Any intermediate files, RAM, or other constructs that are used to form the compilation product may be discarded. The graph file should be created so as to be read into memory very quickly to restore the graph of vertices and edges. That process should be sufficiently rapid such that that loading from the file constitutes an unambiguous cost savings over the original compilation process. The implementation tested for exemplary embodiments displayed all of these characteristics.

During compilation, the code routinely absorbed a high quantity of RAM and then subsequently released the majority of that memory after the process was completed. Compilation time was usually measured in the tens of minutes with most of that time being spent on the original scan of all the source code. This implementation stored the AST in an auxiliary file so that AST formation did not need to be repeated between compilations.

Despite using only the AST files to avoid that scan time, the total compilation was still a lengthy process requiring as much as to five minutes for a large program (300KSLOC). By comparison, the load process from the graph file could be completed in a matter of seconds and never has been observed to take more than a minute. The time saved by loading from AST files and later from the graph file allows the metrics to be applied quickly rather than waiting for a laborious compilation process for each execution. This, however, is a favorable design feature of the metric framework as implemented and not part of the invention.

Section IV: Metric Application. In order to enable the metrics, the graph was analyzed by several preliminary processes that paired each vertex in the graph with a propertied object that both represented the vertex and enabled new properties to be added to the vertex without disturbing the original graph. This layer worked as a metadata overlay on top of the graph, thereby becoming somewhat independent thereof.

The metrics described in the exemplary embodiments are described in this section. In order to define the novel terminology applied to the metrics the following definitions are offered:

Accessor—See Getter, Setter. One of the novel metrics with data flow significance. Methods which control the public interface for a privately scoped variable. An accessor can be used to write to (e.g., "set") or read from (e.g., "get") the variable.

API Class—One of the novel metrics with object relationship significance. API classes may be unused or have further connections with third-party code and standard libraries.

Big Module—an intermediate designation for a module which has a large portion within the class.

Cancer—See Dysplasia.

Class integrity—the largest percentage of a class which belongs to a single module.

Constructor—A method which creates an instance of a class. Critically, use of constructors may have significance in the classification of API classes.

Data transparent—Used to describe methods which serve to transmit data, having little if any effect on the data so transmitted. See Accessor, Decorator Method. A method which receives data as a parameter and returns the data after some secondary effect (e.g., logging data) is data transparent. A method which uses the data to activate some feature or make a critical decision, never returning the original data, is not data transparent.

Decorator Method—See FIG. 6. One of the novel metrics with data flow significance. See Decorator Pattern. As with the decorator pattern which works with classes, the decorator method can be specific to a single method with a matching signature, regardless of the class types. The value of this pattern is not disputed or known, but knowledge of the decorator methods enables additional metrics.

Decorator Pattern—An object-oriented design pattern wherein child Classes of the same interface may be nested in their operations. Thus A(B(C(D))) would indicate that classes A through D are of the same parent interface and that they perform their functions in the order D, C, B, A with each class adding its own distinct "decoration" to the total output.

Depth First Search—Also known as DFS, this process searches a graph by following a single pathway to exhaustion. Once all paths are exhausted or the desired goal is reach, the path is returned.

Divided class—an intermediate designation for a class with low integrity and which forms part of a low integrity module. This kind of class may yield splinters and dysplasia.

Dysplasia—One of the novel metrics with object relationship significance. Minor intrusions into a class from another module. Indicative of cancer. Occurs in two modes with single or multiple module involvement.

Figure 5:
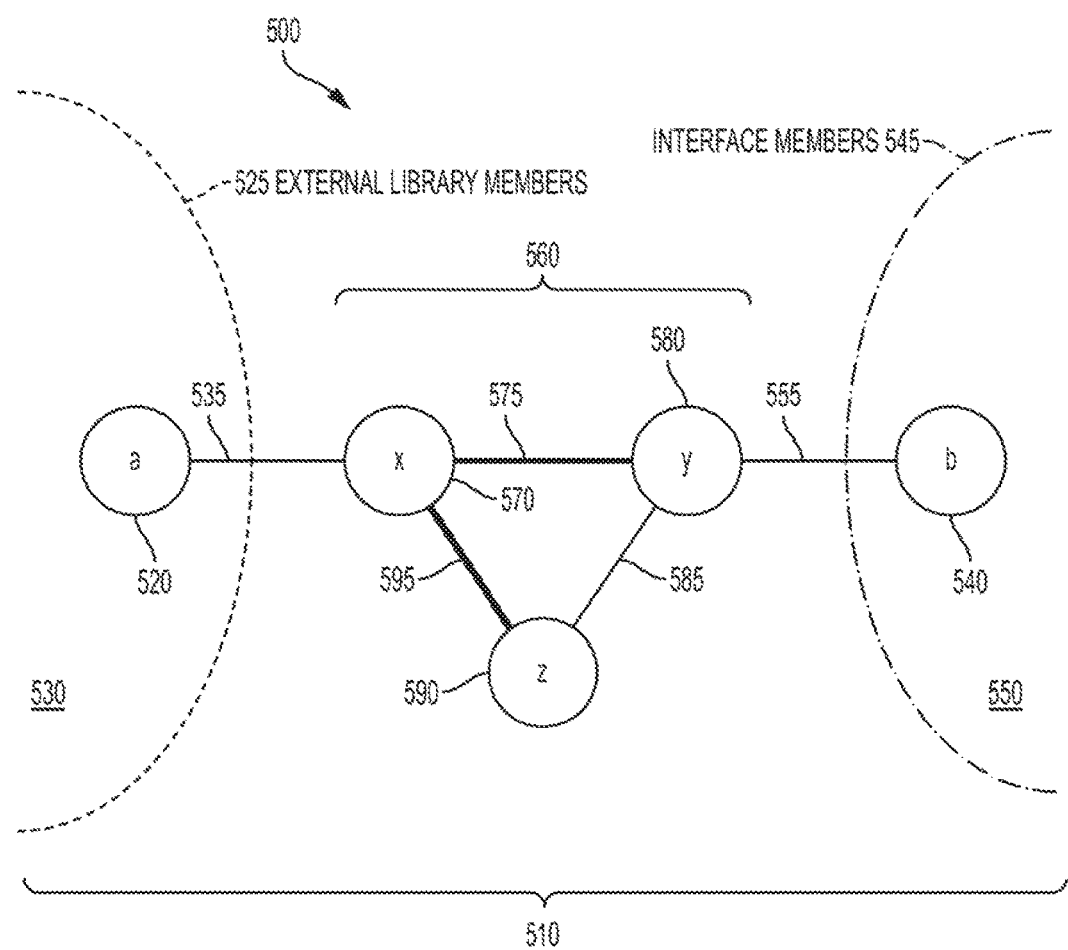
FIG. 5 is a diagram view of member interfaces.

External—See Internal and FIG. 5. Denoting program elements derived from third-party or standard libraries and not from the program under scrutiny.

Getter—See Accessor.

Incompetent Node—One of the novel metrics with object relationship significance. An incompetent node has only one member so it is impossible to determine if it is cancerous or not. This element is excluded from Tumor calculations.

Internal—See External and FIG. 5. Denoting program elements that are part of the program under scrutiny.

Linked state—A method or field that is linked to another state member either by Accessor relationships or by a method override relationship.

Lone Nodes—One of the novel metrics with object relationship significance. Lone nodes are only connected to external program elements, divorcing them from the rest of the program under scrutiny.

Minor Class—an intermediate designation for a class with high integrity in a module with low integrity. Such a class may have incompetent members or dysplasia.

Module—The purpose of the Blondel algorithm (Part IV.C) is to identify groups of closely-related nodes within a graph. For convenience these are referred to as modules which compare favourably with the Class as a group of coherent program elements.

Module Integrity—The largest percentage of a module that belongs to a single class.

Native state—A field of type Enumeration or Boolean.

Q membership—A setting on all nodes that are removed from Accessor methods, interfaces, external code, and separated modules for exclusion from the Q algorithm.

Separated—One of the novel metrics with object relationship significance. Designates a module that has no links to internal nodes outside of the module.

Setter—See Accessor.

Small Module—an intermediate designation for a class that only has a small portion involved in a class.

Splinter—Any portion of a class within a single module that represents the largest portion of the class. A class may have more than one large splinter as several modules may be tied for this distinction.

State—One of the novel metrics. State-related members form state machines that may affect the correctness of the program or give rise to other conditions of interest.

Statistical state—a member that has a control relationship count above the $nZ\sigma$ threshold.

Supermodule—A designation for a module that is created through the combination of two modules. At least one of the two modules has internal links only with the other module.

Tumor—One of the novel metrics with object relationship significance. A module that contains a majority of cancer members and more cancer classes than large splinters is designated as a tumor. That majority is based on a tumor threshold parameter.

Figure 2:
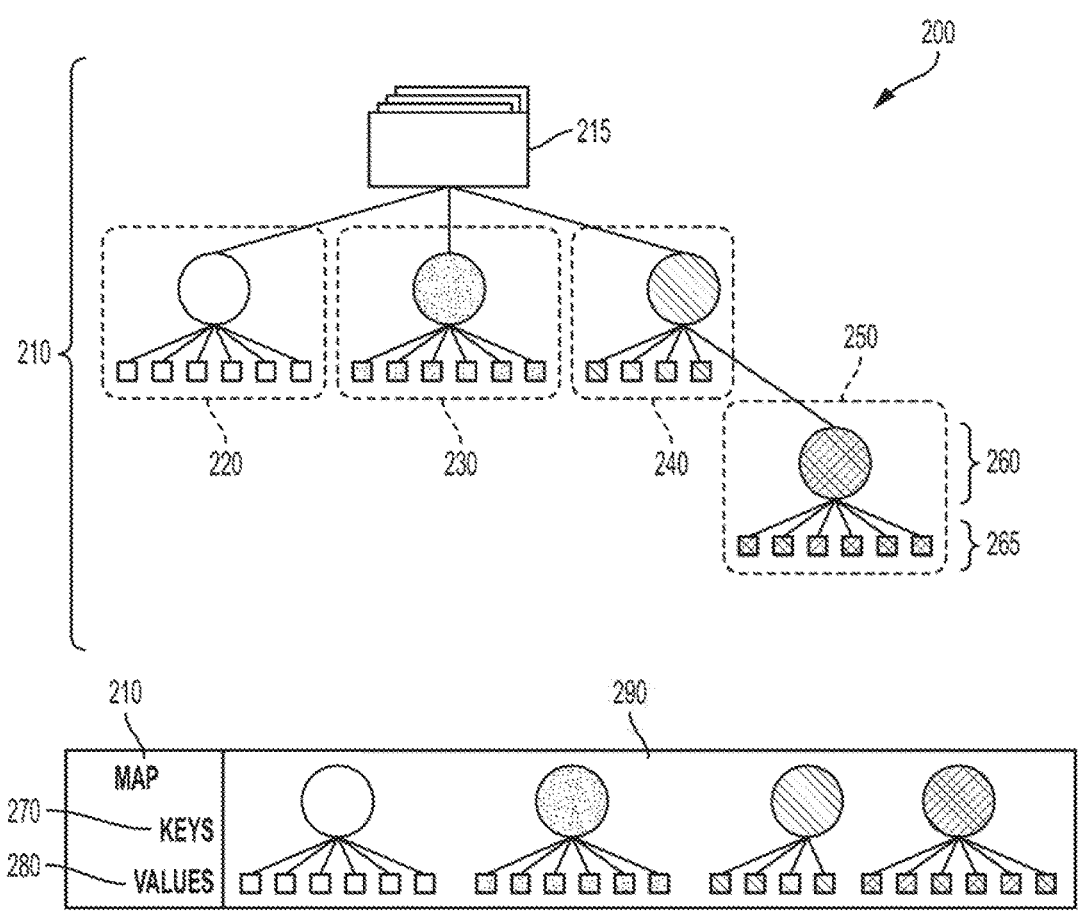
FIG. 2 is a diagram view of a flattened class member data map.

Part IV.A: Metagraph Formation—The first step in this process is shown in FIG. 2, which shows a diagram view 200 of a flattened class member data map 210. The actual class structure consists of a package 215; classes 220, 230 and 240; and nested class 250. Each class is defined by a type vertex 260 and a list of one or more type members 265 shown as tree graphs. In the map 210, the classes 290 have been inserted into the set of keys 270, while the list of type members have been inserted into the set of corresponding values 280.

To create the map 210, the first step involves examination in the hierarchy of each type in the tree graph, e.g., Class, Interface, Enumeration. These types 260 are inserted into a map data structure 210 as keys 270. A set of type members 265, e.g., fields, methods, etc., exists for each type. These members 265 are inserted into a list that is stored in the map 210 as the corresponding value 280. The map 210 represents only one level of the hierarchy, forcing the tree structure into a flat representation.

Figure 3:
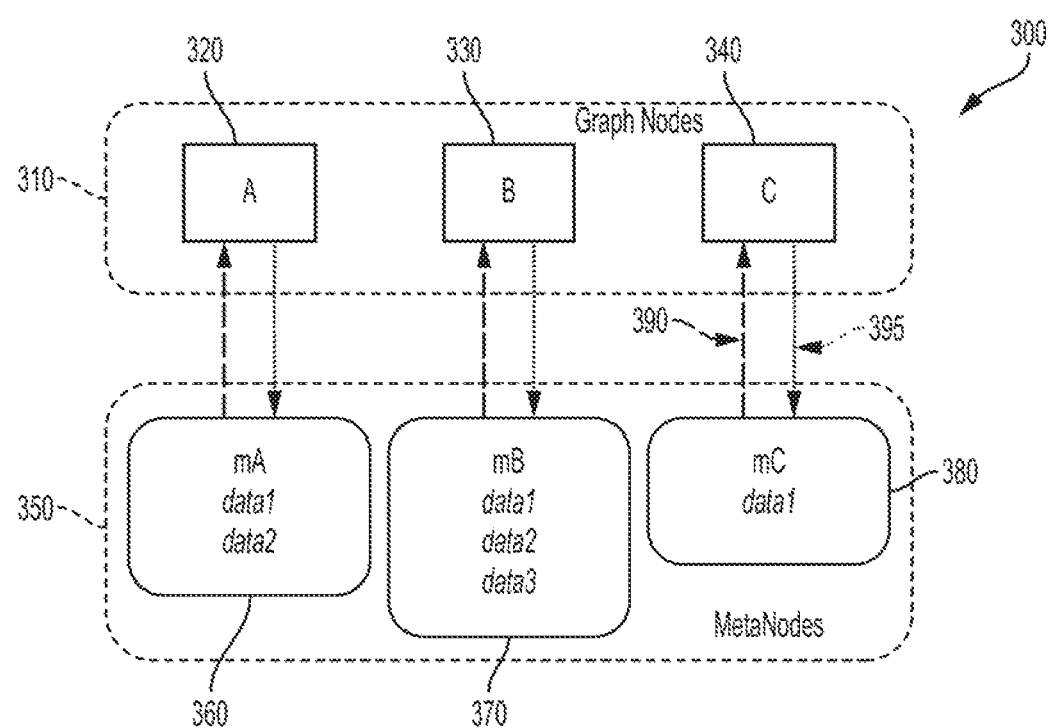
FIG. 3 is a diagram view of nodal graphical exchange.

The second step is depicted in FIG. 3 showing view 300, which shows in parallel a graph set 310 of graph nodes A 320, B 330 and C 340, together with a corresponding meta set 350 of MetaNode graphs mA 360, mB 370 and mC 380. Mapping between elements of the two sets 310 and 350 is shown by arrows 390 and 395 that respectively represent the mapping from MetaNodes to graph nodes 320, 330 and 340 and from graph nodes to MetaNodes 360, 370 and 380. The two map structures 310 and 350 enable rapid, reciprocal access from one context to the other. Each context has different performance advantages, with graph nodes 320, 330 and 340 retaining the full structure of the graph, while MetaNodes 360, 370 and 380 may be annotated with additional properties derived by analysis.

Once all the members have been represented by a MetaNode, MetaEdges are created for Write, Read, and NewImplementation relationships. As described previously, graph edges form a relationship between a source and destination node with a third statement node to identify the location within the file. Now those statement nodes are used to identify the method or field associated with Read and Write actions.

Figure 4:
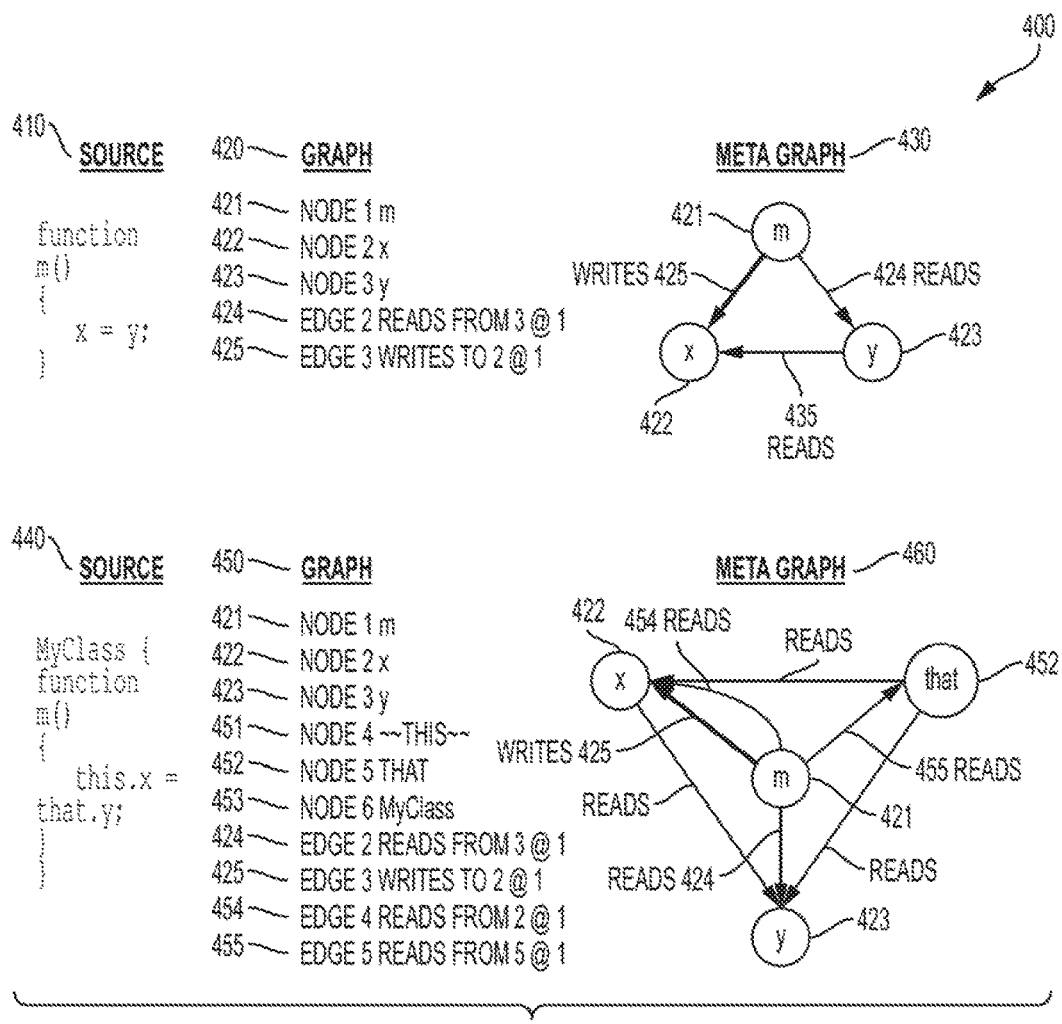
FIG. 4 is a diagram view of code graphical conversion.

FIG. 4 is a diagram view 400 of MetaEdge dependencies derived from a source code 410. The contents of the file text as graph file 420 are represented as nodes m 421, x 422 and y 423 represented as text in the graph file 420 and graphically in an associated MetaGraph file 430. The reciprocal edge relationships 424 and 425 in the graph file 420 represent the single horizontal edge 435 in the MetaGraph file 430. Note that the @1 relationships in the edges 424 and 425 that connect the nodes x 422 and y 423 in the graph file 420 are mirrored in the MetaGraph file 430. In addition to nodes m 421, x 422 and y 423 represented in both the graph file 420 and the MetaGraph file 430, the reciprocal edge relationships 424 and 425 in the graph file 420 represent the single horizontal edge 435 (reads) in the MetaGraph file 430.

As shown in view 400, the graph file 420 defines the relationship 435 between nodes x 422 and y 423 (reads). However, the MetaGraph file 430 additionally records in method m 421 that node x is written to as edge 425 (writes), and node y 423 is read from as edge 424 (reads). In addition to data and control dependencies, the MetaGraph file 430 affords an ability to track relationships from program elements like method m 421 in relation to the program elements like node x 422 and node y 423 accessed from that element. In the MetaGraph file 430, method m 421 is as dependent on node x 422 and node y 423 by edges 425 and 424 as node x 422 depends on node y 423 by edge 435.

Additional dependencies are derived from the edges. As stated above, NewImplementation edges are also represented as dependencies between functions and the parent implementation they replaced. Additional dependencies exist when a reference variable is used to access one of its members. When self-reference variables are used (e.g., "this" or "self" in various languages) the relationship is attributed to the method where the self-reference occurs. Similarly, accessing a static variable through the class name (e.g., MyClass.z) decomposes into MetaEdges between MyClass and z as well as the method where the reference occurs.

This is visually exemplified in view 400 with additional MetaEdge dependencies derived from a source code 440 (reminiscent of source code 410). A graph file 450 presents a list of nodes and edges (analogous to graph file 420). In addition to the nodes from graph file 420, the graph file 450 includes nodes ~~this~~ 451, that 452 and MyClass 453. The graph file 450 further includes edges 454 and 455. The contents of the file text as the graph file 450 are represented graphically in an associated MetaGraph file 460 (similar to MetaGraph file 430). The edges 424, 425, 454 and 455 listed in graph file 450 are further illustrated as corresponding arrows in MetaGraph file 460 from nodes m 421 to y 423 (reads), a 421 to x 422 (writes), a 421 to x 422 (reads), and a 421 to that 452 (reads).

FIG. 5 shows a diagram view 500 of a library access system 510. This includes a first node a 520 within a library boundary 525 that contains a first set 530 of External Library Members with first edge 535, and a second node b 540 within an interface boundary that contains a second set 550 of Interface Members with second edge 555. A third set 560 of Normal Members is disposed between the first and second sets 530 and 550. The third set 560 includes a third node x with third edge 575 to a fourth node y with fourth edge 585 to a fifth node z 590 with fifth edge 595 to the first node x 570. The first external connection 535 associates the first node a 520 with the third node x 570, and the second external connection 555 associates the second node b 540 with the fourth node y 580.

Thus the system 510 divides into three categories to which all program elements are initially assigned: External Library Members set 530, Normal Members set 560, and Interface Members set 550. The individual nodes are assigned to each group by setting a property in the MetaNode. First and second edges 535 and 555 that cross boundaries 525 and 545 are assigned a weight of zero. Subgraphs within the Normal Members set 560 contain edges 575, 585 and 595 with various weights depending on the number of relationships between the members. The fifth edge 595 is drawn as a thick line indicating that relationship is repeated (i.e., x writes to z many times), while the fourth edge 585 is drawn as a thin line, indicating a relationship that occurs only once.

This strategy for categorization and edge weighting as shown in view 500 is used to focus the metrics on Normal Members set 560. External Library Members from the set 530 are imported from other sources and are not considered part of the code being evaluated. Interfaces and their members in the set 550 constitute a special case related to the interface segregation principle (ISP). Those edges 535 and 555 are assigned a zero weight in recognition of their unique role in separating sections of code in an approved manner. Software that faithfully follows the ISP shows more separation between Normal Members in the set 560 because Interface Members in the set 550 are excluded from evaluation.

Part IV.B: Pre-Processing Events—After the MetaGraph has been finalized, the metric analysis can begin. Everything to this point has been accomplished to enable convenient traversal of the graph vertices and edges or ready attribution of properties through the MetaGraph. All metrics will use these graph elements. Some additional pre-processing may be performed in an effort to prepare for metrics and facilitate easier metric calculations later on. Exemplary embodiments include several such pre-processing events designed to identify known design patterns.

Discovering decorator methods is one example of a pre-processing event. The decorator method is related to the well-known Decorator design pattern. A decorator method is one that outputs the same value accepted as input. In the interval, the decorator method may manipulate or change the value in some way. Often this is accomplished with a collection of objects. Decorator methods may form longer chains A(B(C(x))). Decorator methods are used for various purposes, including filtering large data sets, normalizing data, or reformatting input. Identifying such methods is critical as they mask the transportation of the same value from input to output. Upon identification the value on either end is considered identical.

Exemplary embodiments employ a tracing algorithm to identify decorator methods. First, several exclusionary criteria can be used to identify methods that might be decorators. The criteria are:

(a) decorator methods have exactly one parameter, and (b) the return type of a decorator method must match the parameter type.

FIG. 6 shows a code diagram view 600 with a depth-first search (DFS) to identify a data-dependency between input and output. Select code lines 610, 620 with write 625, 630 with access 635a, parameter 635b instructions, and 640. The lines 610, 620, 630 and 640 correspond to respective nodes 650, 660, 670 and 680. Example source code is shown with a set of data-dependency links from the return statement 680 to the input 650. Intermediate links 670 and 660 have additional data-dependencies in the same lines. The variable myAnswer accesses the Add method 635a, and the Add method 635b receives the parameter '1' accordingly. The variable '1' is taken from the variable list write 625.

After a method has been preliminarily identified as matching the signature of a decorator, a DFS is performed from the return value. As shown in view 600, the DFS follows edges to find a connection between the return value and the input value. The DFS may follow write 625, access 635a, or parameter 635b relationships between different program elements. The myriad of possible relationships is limited to those that occur within the local context of the method in question (i.e., the statement is within the method scope). A decorator may have more than one return value, often accounting for null parameters, but at least one return value must demonstrate this relationship.

Discovering Accessor methods provides a second example of pre-processing events. Accessor methods, sometimes called getter and setter methods, form part of the public interface which can read and write to a privately scoped variable. Again, a set of exclusionary criteria are applied to limit the number of methods under evaluation. The criteria include:

(a) Accessor methods must be in the same class as the controlled variable;

(b) Getters have exactly zero parameters. Setters have exactly one parameter; and (c) Getters have a return type that matches the controlled variable. Setters have a void return type.

All methods that satisfy these initial criteria are subject to further traceability analysis. As with decorator methods, a path must be established that shows a data dependency between the setter's parameter and the controlled variable; or the getter's return value and the controlled variable. These relationships are established with another DFS limited to the scope of the method in question and taking decorator methods into account. Methods that satisfy either of these criteria are identified as potential getters or potential setters. Artisans of ordinary skill can note that a variable may be controlled by more than one method in either category.

After Accessors and a controlled variable have been identified, changes are made to the MetaGraph. The MetaNodes for Accessor methods are moved into the Interface category. This change reflects that their purpose is consistent with the ISP and that those methods form a barrier between the controlled variable and any external class. The edges between Accessors and Normal Members are assigned a zero weight, consistent with edges 535 and 555. In some metrics those weights will provide critical separation at this recognized boundary between classes. The edges, however, are preserved for other metrics which will recognize the special relationship in a different context.

Discovering lone nodes is a third example of pre-processing events. A number of programs contain program elements that have no connection to any other program elements. These elements are easily identified as the degree-in of the corresponding MetaNode is zero. The degree-in also excludes connections to Interface and External Library Members.

Part IV.C: Q Algorithm—Module Discovery. The first major metric to operate on the MetaGraph uses a variation of the Q algorithm described by V. D. Blondel et al.: "Fast unfolding of communities in large networks", J. of Statistical Mechanics (2008). See https://pdfs.semanticscholar.org/b434/c0199bbf38163abd5fj995e76aa1619d39db9.pdf, or preprint: https://arxiv.org/pdf/0803.0476.jxif. The algorithm from Blondel calculates Q as:

$$Q = \frac{1}{2T} \sum_{i,j} \left[ A_{ij} - \frac{k_i k_j}{2T} \right] \delta(m_i, m_j), \tag{1}$$

where subscripts i (vertex) and j (neighbor) denote associated edges a vertex and its neighbor; the value of $A_{ij}$ is the weight of the single edge between i and j; the value $k_j$ is the sum of weights for all edges incident on i; the value T is half the total of all edges in the graph; m is community of the associated vertex; and the kronecker delta function δ equals one {1} when $m_i=m_j$ and zero {0} otherwise. The sum of the edge weights incident to vertex i is:

$$k_i = \Sigma_j A_{ij}, \tag{2}$$

and $$m = \frac{1}{2} \sum_{i,j} A_{i,j}, \tag{3}$$

summing all the links in the network. Modularity ΔQ can be written as:

$$\Delta Q = \left[ \frac{\sum_{in} + 2k_{i,in}}{2m} - \left( \frac{\sum_{tot} + k_i}{2m} \right)^2 \right] - \left[ \frac{\sum_{in}}{2m} - \left( \frac{\sum_{tot}}{2m} \right)^2 - \left( \frac{k_i}{2m} \right)^2 \right], \tag{4}$$

where sums $\Sigma_{in}$ and $\Sigma_{tot}$ are respectively weights of links in the community and link weights incident to nodes in the community. Thus for two vertices in the same community module m, the value of Q increases by the weight of that edge in proportion to total of all edges. The value of Q increases when relatively few edges exist between modules. The algorithm maximizes Q by adjusting module membership of single vertices.

Figure 7:
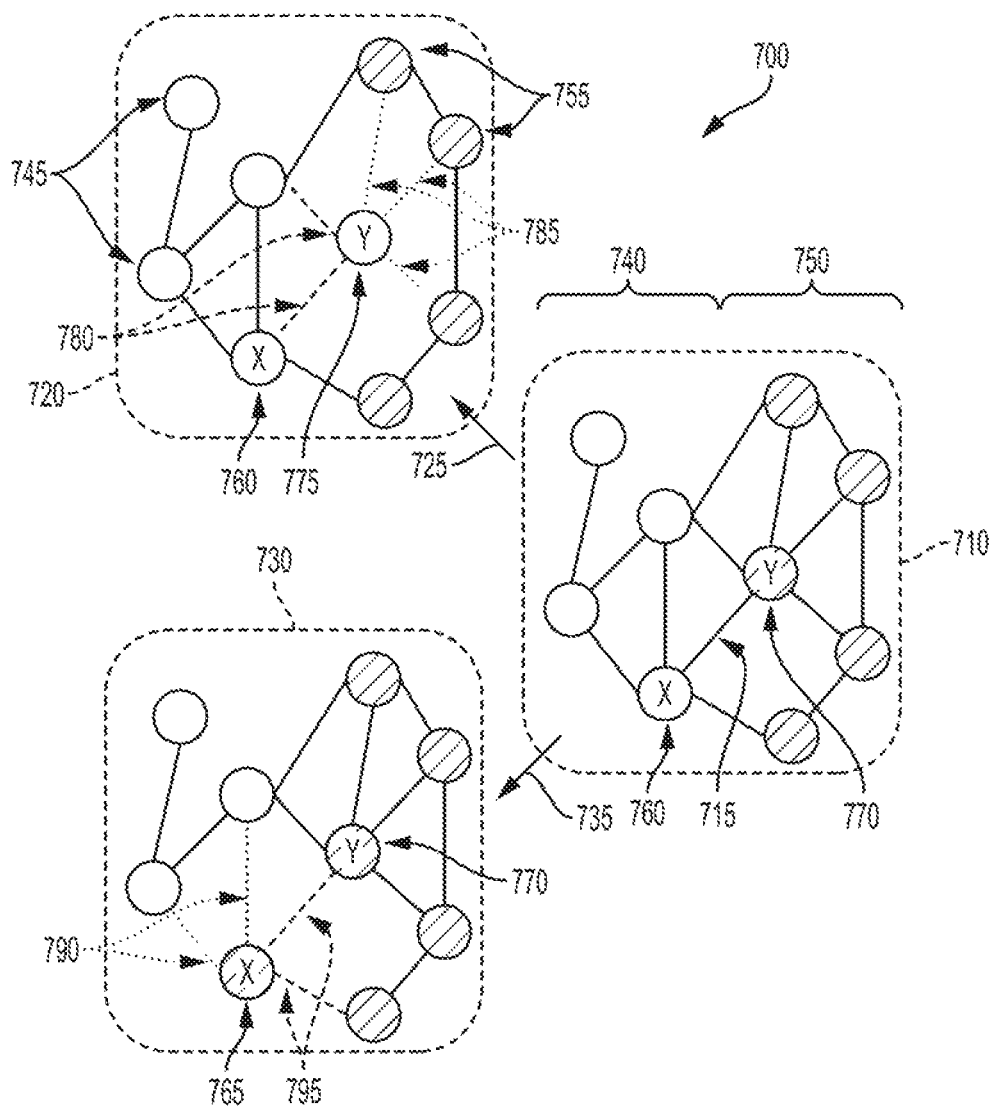
FIG. 7 is a diagram view of node changes.

FIG. 7 shows a diagram view 700 of changes made to the MetaGraph by the Q algorithm over alternate iterations beginning with an initial state 710 that includes an edge 715 between two nodes to be described. The initial state 710 changes to a first subsequent state 720 associated by vector operation 725, or to a second subsequent state 730 associated by vector operation 735. At the start of one iteration, the initial state 710 contains first cluster 740 with nodes 745 and second cluster 750 with nodes 755. Of interest are nodes X 760 and Y 770 that connected together by the edge 715.

The Q algorithm must determine the relative improvement to Q whether node Y 770 is altered via vector operation 725 into cluster 740 as node Y 775 with added edges 780 and subtracted edges 785, or else node X 760 is altered into duster 750 as node X 765 via vector operation 735 with added edges 795 and subtracted edges 790. Either of the follow-on states 720 or 730 has new Q values as edges 780 and 790 are added and edges 785 and 795 subtracted in each circumstance.

Part IV.D: Future State—After examining the effect of each proposed state on Q, the algorithm chooses the optimal future state from among 710, 720 and 730. In the diagram view 700 of future Q state of graph by moving node Y by operation 725 and node X by operation 735. The first cluster 740 includes node X 760 and the second duster 750 includes node Y 770. The first operation 725 proceeds to alter node Y 775 to belong to the first duster nodes 745. Alternatively, the second operation 735 proceeds to alter node X 765 to belong to the second cluster nodes 755.

The Q algorithm was significantly adapted for the purpose of discovering class boundaries. The calculation of the full Q value was so computationally expensive—order O(n!)—that an alternate process was required to determine variations in Q value based on single node movements. As shown in view 700, consider that altering nodes X or Y only alters Q with regard to the addition and subtraction of edges 780 and 785 or else 790 and 795. The other edges remain constant in their contribution to Q. This limits the change in Q to a simple subtraction calculation e.g., subtract weights of edges 785 from edge weights of edges 780. This calculation was designated as the "minor Q" and could be calculated for any pair of nodes in order O(c) time.

Figure 8:
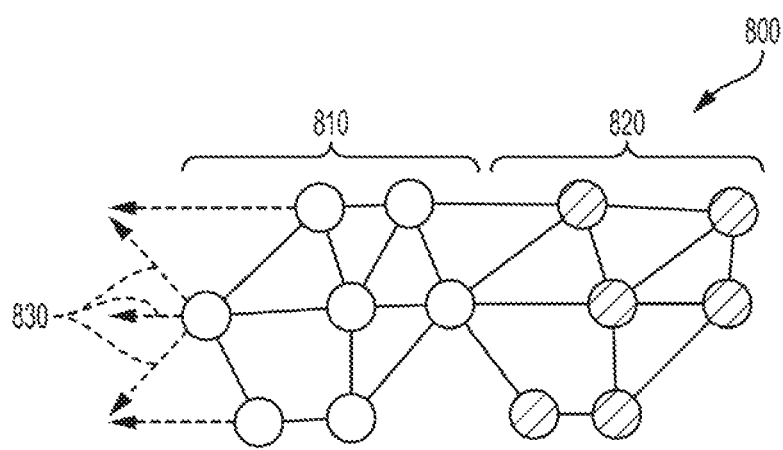
FIG. 8 is a diagram view of class connections.

FIG. 8 shows a diagram view 800 of two closely associated modules within the MetaGraph. This portion of the MetaGraph shows two modules 810 and 820. Module 810 is connected through various edges 830 to additional modules. Module 820, however, is only connected to module 810. Although module 820 clearly exists as an appendage to 810, no single-vertex adjustments overcomes the relative cohesion among members of 820. A gross adjustment is necessary to unify modules 810 and 820.

A second adaptation of the original algorithm enables the algorithm to make gross module adjustments. The primary method for adjustment was still made to single nodes as described by Blondel. In the second adjustment state two adjacent modules are examined as shown in view 800. The algorithm checks each module for additional adjacencies. For one of the modules found to be an appendage of the other (i.e., as with 820, having no additional adjacencies), then the two modules may be combined into a Super Module. For a module found to have no adjacencies, this indicates that the detected module is entirely separate from other modules within the MetaGraph. Each member of the module is marked as "Separated" from the Normal Members and that module is removed from further iterations of the Q algorithm.

Finally, the main loop of the Q algorithm was redesigned to converge on a "good enough solution" as defined. This meant that instead of meeting the original standard for repeating the loop (i.e., any improvement in the Q value) that the loop would repeat until the improvement was below an acceptable threshold of "goodness". In this exemplary implementation, a fifth decimal change (0.00001) is considered sufficient. The loop terminates when the Q value fails to improve by at least this amount.

A second condition is added to the Q algorithm that automatically advanced to the next iteration upon discovery of a super module or separated module. The second condition was necessary both to overcome instabilities in the Q value created by removing separated modules and to ensure that a relatively stable graph continues to combine adjacent modules even if Q values remained temporarily stable. During experimentation, temporary optimal Q values (i.e., without an improvement above the supposed minimum change) could be observed to maintain while a series of super modules formed. In some cases this was a terminal behavior and the Q algorithm reached its conclusion, but occasionally these small changes enabled further Q value optimizations that had not been possible before making gross movements. As both phases worked independently to achieve the goal of optimizing the Q value, both conditions are considered independently to determine if the final optimal module allocation had been achieved.

After execution of the Q algorithm, each program element is then designated as a member of a notional module based solely on dependencies rather than programmer-defined characteristics. These module numbers are stored as a property of the MetaNode and the new modules are recorded in a separate data structure analogous to that described in view 200. The module map 210 used a unique module identification (ID) number as a key. The map value 280 is a list of all members of that module. Again this structure affords rapid, ready access of members of a module or the module of any single member.

Figure 9:
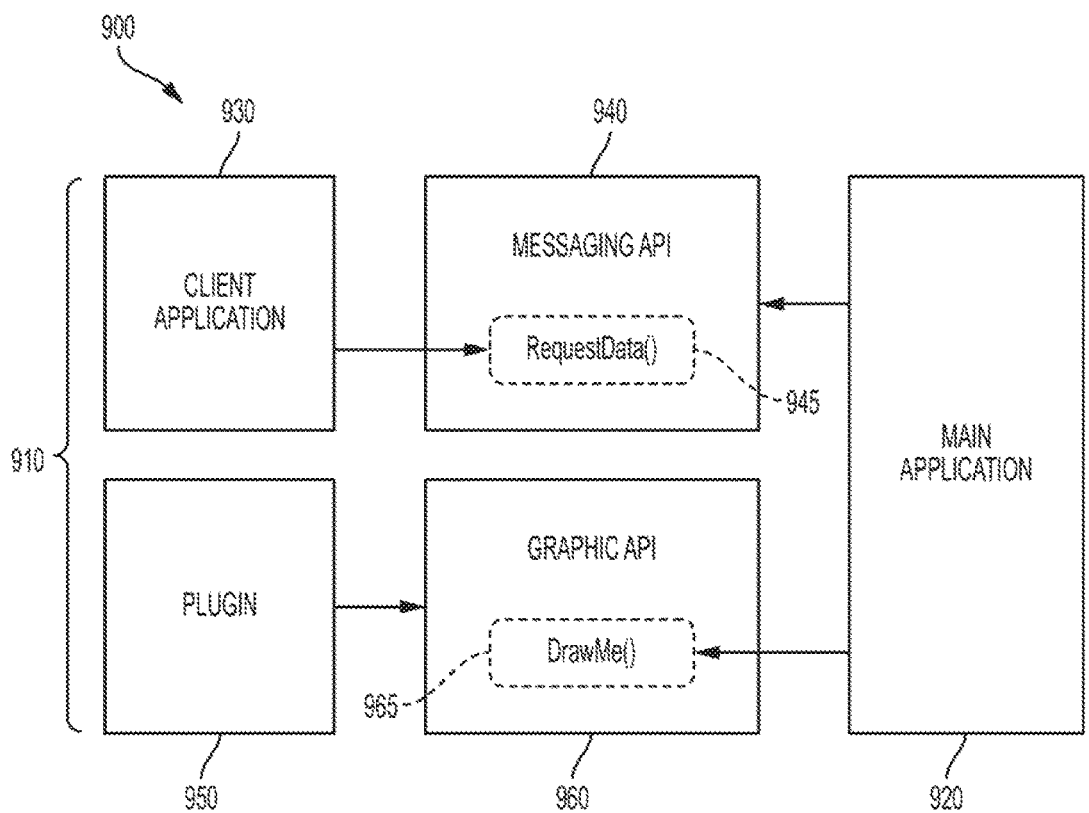
FIG. 9 is a schematic view of API processing.

Part IV.E: Metrics Related to Q Algorithm—FIG. 9 shows a diagram view 900 of an example program employing an application programming interface (API) 910. The components include a main application 920, a client application 930, a messaging API 940 with RequestData( ) instruction 945, a plug in 950 and a graphic API 960 with DrawMe( ) instruction 965. The main application 920 needs to connect with two separate programs as client application 930 and plugin 950. In order to facilitate this connection, the main application 920 contains two API classes 940 and 960 that define respective operations for communication. In this example program the client application 930 can call the RequestData( ) 945 through the published API 930 for messaging. Similarly, the main application 920 can call the DrawMe( ) 965 through the published API 960 for plugins. Using published APIs, no additional information needs to be shared between the three applications 920, 930, and 950.

After creating the MetaGraph and executing the Q algorithm groups of nodes stand out because they are not connected to the rest of the MetaGraph. Individual nodes without any connection are designated as "lone nodes" and, as discussed previously, separated modules are identified because they are not adjacent to any other modules. Some of these nodes are related sets of unused program elements. Occasionally, however, whole classes are composed of separated or lone nodes. An examination of these classes found that a great many are created expressly for the purpose of API-level communication as described in view 900. Therefore, any class whose members fall completely into one of these two categories is designated an "API class" and all its members are moved into a new module unique to that class.

The new metrics report finding API classes. There are two exceptions to this designation as two broad categories of classes are discovered that defied the category. The exceptions are:

(a) Anonymous types—Common in some programming languages, an anonymous type is created expressly to fulfill a temporary need, often an event listener, which does not require a full class to accomplish. These classes must also implement some API class found elsewhere in the program or in an imported library. These classes, although not otherwise connected with the program, are not API classes themselves.

(b) API implementation types—Unlike anonymous classes, a programmer may choose to implement the full class. A small class may be defined that merely implements an external API. That class looks exactly like an anonymous class and is not an API class.

Figure 10:
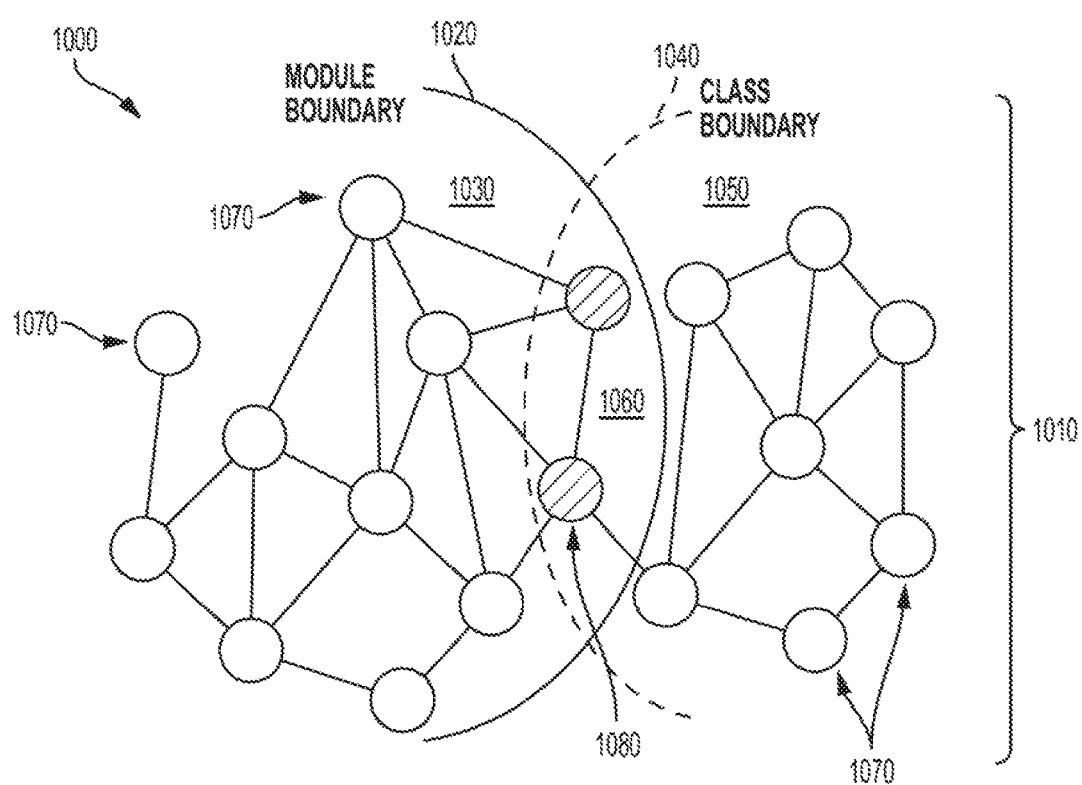
FIG. 10 is a diagram view of module and class boundaries.

FIG. 10 shows a diagram view 1000 of competing boundaries with disputed nodes of boundary space 1010 divided by a module boundary 1020 that defines a module space 1030 and a class boundary 1040 that defines a class space 1050. The two spaces 1030 and 1050 exclusively include nodes 1070 and mutually share a disputed region 1060, which contains a set of program elements 1080 that belong to both spaces 1030 and 1050. Overlapping and conflicting boundaries 1020 and 1040 produce the disputed region 1060. These disparities are the basis of additional metrics related to the Q algorithm. In approximately a quarter (25%) of the classes, module and class boundaries 1020 and 1040 exactly match. In all other cases, the integrity of the class and module is calculated and compared.

The subsequent steps include: reviewing all the members belonging to a class; and reviewing the module of that member and store a reference to that member in a map data structure. The next step involves tracking the module with the most members as each member is added to the map. As shown in the following equations, the completed map can be used to find the portion of each module within the class.

$$0 < s_m \leq 1, \quad (5)$$

$$\sum_m s_m = 1, \quad (6)$$

$$\forall_m \exists_M | s_m \leq s_M, \quad (7)$$

$$I_{class} = s_M. \quad (8)$$

The portion s of module m within the class is a positive number eqn. (5) and the sum of all portions is one {1} in eqn. (6). Of all modules within the class, one module is the largest eqn. (7). That portion of the class is the highest portion of integrated members within the class. The calculation for module integrity is calculated using the same technique.

Based on calculated integrity values, it is possible to identify areas of dispute considered in view 1000 and rank them according to size in class and module. A disputed area is considered "major" for being the largest portion in the class or module. Anything else is considered "minor" by comparison. Excluding perfect alignment between modules and classes, thresholds for "high" integrity can be established. Anything below that threshold is considered "low" integrity. These terms relative to size of disputed areas and integrity of the disputants allow for the classification of disputed areas.

Figure 11:
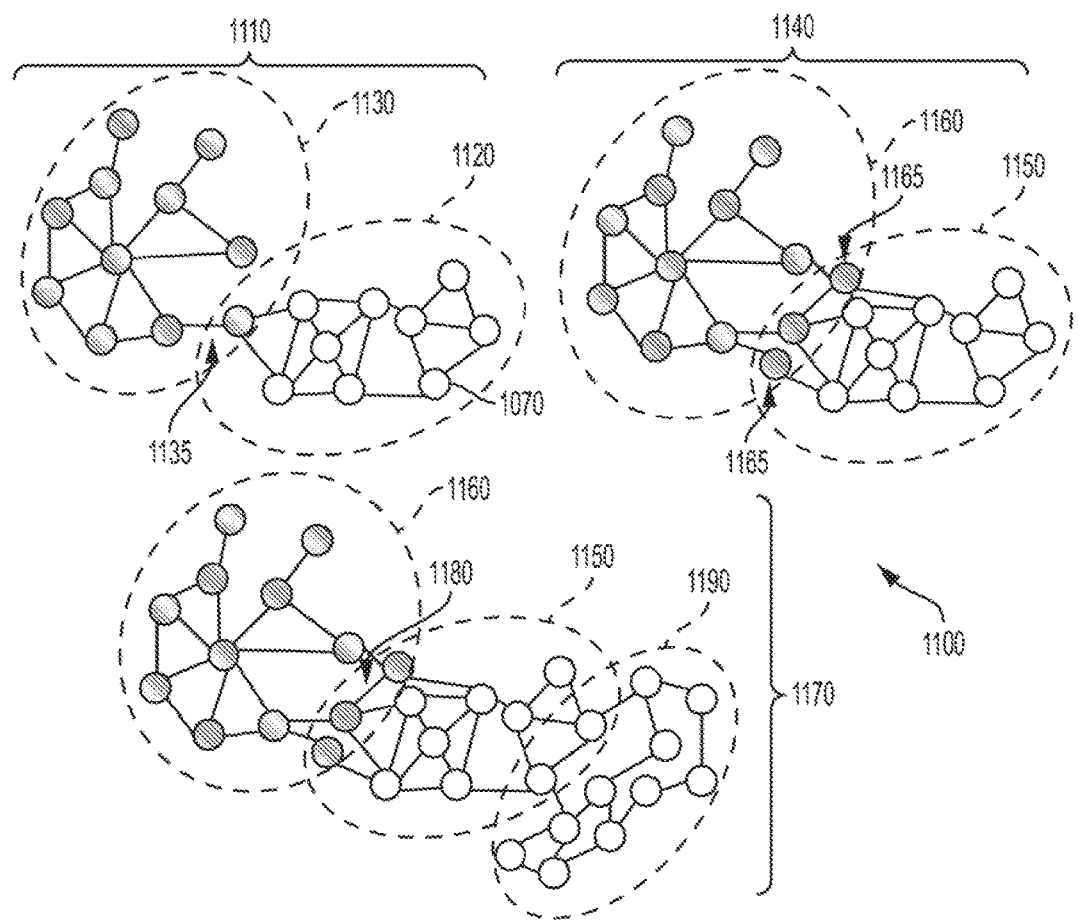
FIG. 11 is a diagram view of an invasive module.

FIG. 11 shows a diagram view 1100 of early and advanced intrusions of one module upon another. In the early stage 1110, the class 1120 containing elements 1070 has been violated by module 1130. The intrusion is very small, comprising only one program element 1135. In the more advanced stage 1140, the class 1150 is increasingly violated by module 1160. The intrusion has now increased with additional program elements 1165. Furthermore, final stage 1170 demonstrates that class 1150, with the intrusion denoted by overlap 1180, is actually composed of minor portions of two different modules 1160 and 1190.

The goal in addressing disputed areas is to identify which class or module is intruding upon the other. As shown in view 1100, in the early stage a minor portion 1135 of a highly-integrated class 1120 can be clearly identified as an intrusion from module 1130. As the condition advances to stage 1140, however, whether the disputed program elements are part of the class 1150 or the module 1160 remains unclear. In stage 1170, the ambiguity is more apparent as neither module 1160 or 1190 is clearly the original definition of class 1150. Either module 1160 or 1190 could be an intrusion on the original class.

Part IV.F: Analogy by Pathology—Medical science employs the term "dysplasia" to describe the invasion of cancer tissues into otherwise healthy tissue, occurring in two stages: the first being a minor intrusion that does not significantly alter function of the healthy tissue, and the latter being a major intrusion, sometimes involving increasing comingling of the cancerous and healthy tissues. This terminology was borrowed to describe phenomena that are described herein. In order to partially address the ambiguity demonstrated in view 1100, identification of dysplasia is based on threshold values for "low" and "high" integrity. In order for an intrusion from a class to be categorized as Dysplasia I, the class must show integrity above the "high" mark and the competing module must show integrity below the "low" mark. This suggests that the disputed area is almost certainly an intrusion from the profligate module. If the class has integrity below the "high" mark and the competing module is below the "low" mark, the intrusion may be more advanced. These are termed Dysplasia II.

Figure 12:
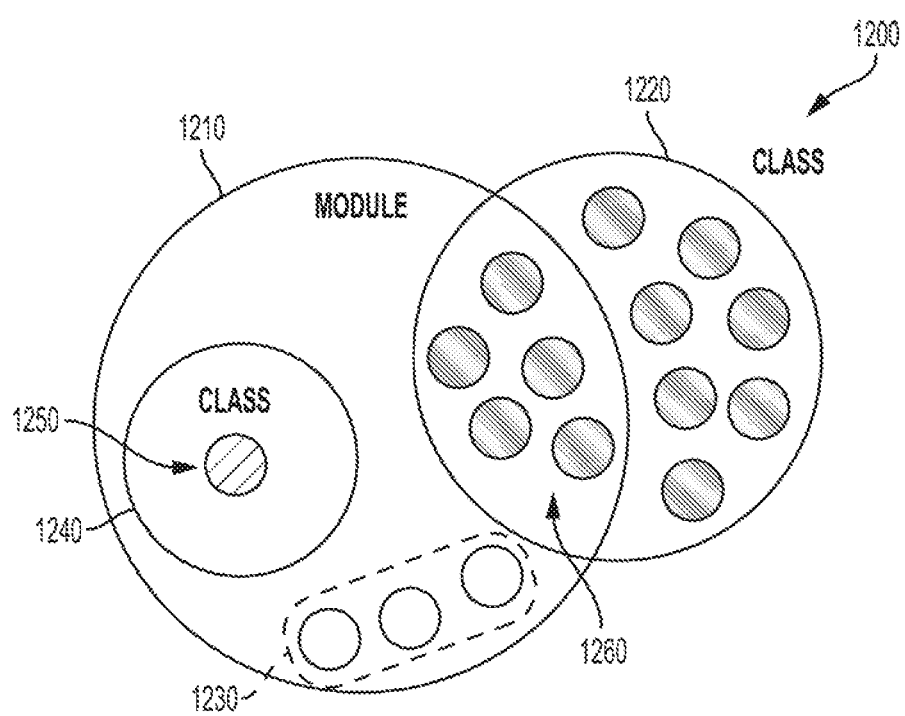
FIG. 12 is a diagram view of module and class overlaps.

FIG. 12 shows a diagram view 1200 of a module 1210 that contains elements of several classes 1220, 1230, and 1240. Classes 1230 and 1240 are fully integrated into the module 1210. The class 1240 contains a single member 1250. This member 1250, although alone, cannot be a form of dysplasia because the class 1240 is fully integrated into the module 1210 and so is termed "incompetent" in the case of class 1240. As in a Venn diagram, the module 1210 and class 1220 have an overlap region 1260 that share several members together. The disputed portion or overlap 1260 is a minor component of the class 1220, but is the major component of the module 1210. Such an overlap area 1260 is termed the "large splinter" of the module 1210.

Two other phenomena affect the metrics because of demonstrable ambiguity. As shown in view 1200, some classes have only one program element and that class is necessarily 100% integrated while concurrently being a clear fragment in the module. Such members are excluded from module counts as their significance is ambiguous. The "large splinter" overlap 1260 also demonstrates ambiguity. While a minor component of the class 1220, it is the largest component of the module 1210. Whether the module 1210 represents an intrusion upon class 1220, or else the intrusion from class 1220 is an advanced case of dysplasia remains unclear. In this example, the fragment overlap region 1260 is treated as a legitimate original class and thereby treated differently in the metrics.

Figure 13:
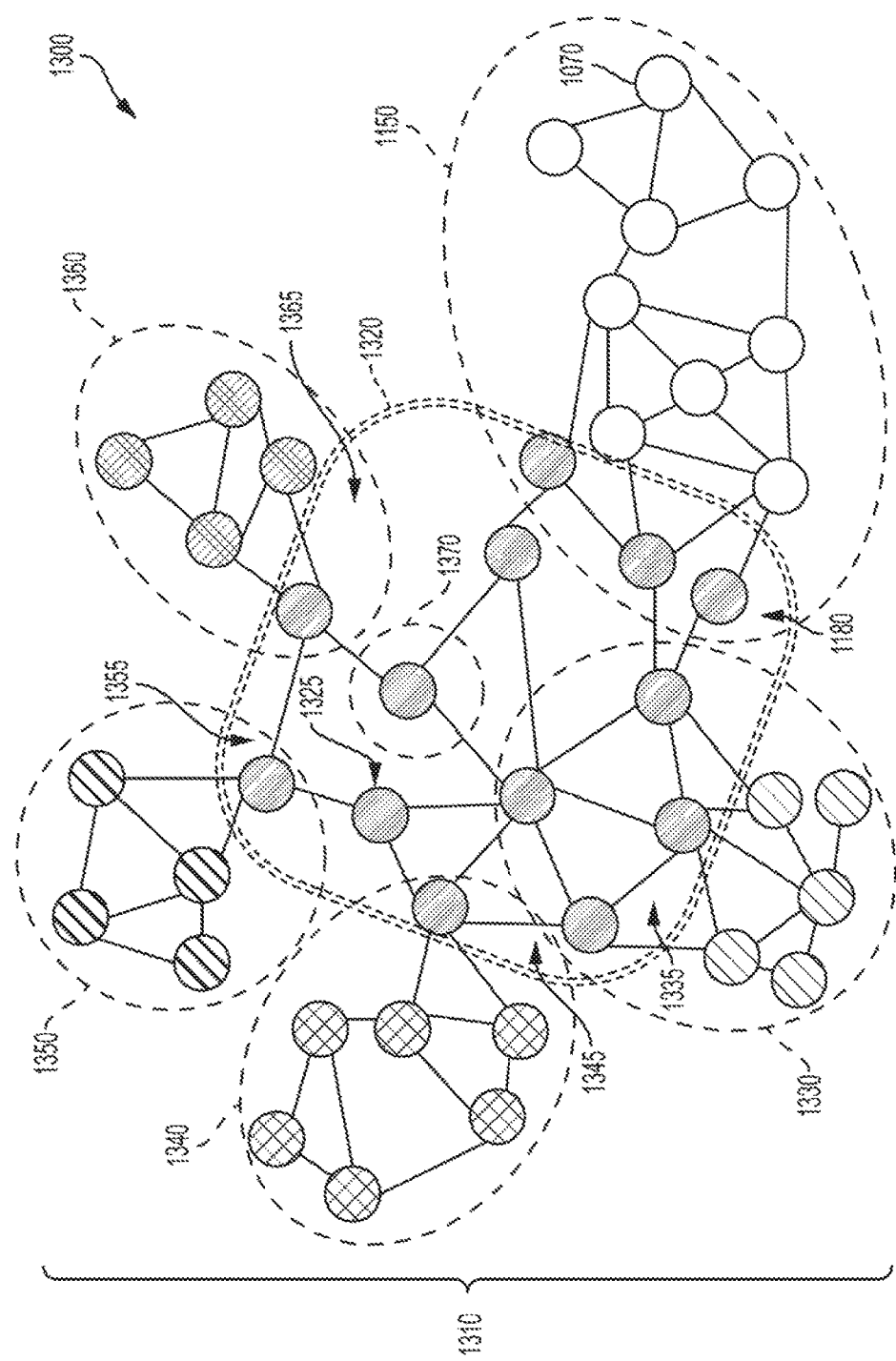
FIG. 13 is a diagram view of a tumor module overlapping into several classes.

FIG. 13 shows a diagram view 1300 of a module set 1310 with multiple classes containing a code tumor 1320 that includes tumor nodes 1325. The tumor 1320 is a single module defined by the black nodes 1325, several of which intrude onto five classes. The code tumor 1320 impinges on the first class 1350 at overlap 1380, the second class 1330 at overlap 1335, the third class 1340 at overlap 1345, the fourth class 1350 at overlap 1355, and the fifth class 1360 at overlap 1365. Class 1370 denotes an incompetent class completely contained within the code tumor 1320. Dysplasia I is demonstrated in disputed overlaps 1345, 1355 and 1365. Dysplasia II is demonstrated in disputed overlap 1380 from view 1100. The disputed overlap 1335 constitutes the large splinter in the tumor module 1320.

After identifying all forms of Dysplasia and excluding incompetent classes, identifying tumours within the code is possible. As shown in view 1300, module 1320 contains thirteen program elements. One of these is excluded for incompetency 1370. Module 1320 is diagnosed from the calculations in the following equations. First, the portions of dysplasia overlap 1345, 1355 and 1365 (6/13=0.46) must be greater than the portion of the large splinter overlap 1635 (4/13=0.31). Second, excluding the incompetent members 1370, the portion of dysplasia (6/12=0.50) must achieve a given threshold. In view 1300, half (50%) of module 1320 is some form of dysplasia, therefore all members of module 1320 are designated as part of a Tumor.

$$s_D > s_{LS}, \quad (9)$$

$$s_D \geq C, \quad (10)$$

where $s_D$ is the portion of dysplasia in the module, $s_{LS}$ is the portion of the large splinter and C is the critical tumor threshold.

Figure 14:
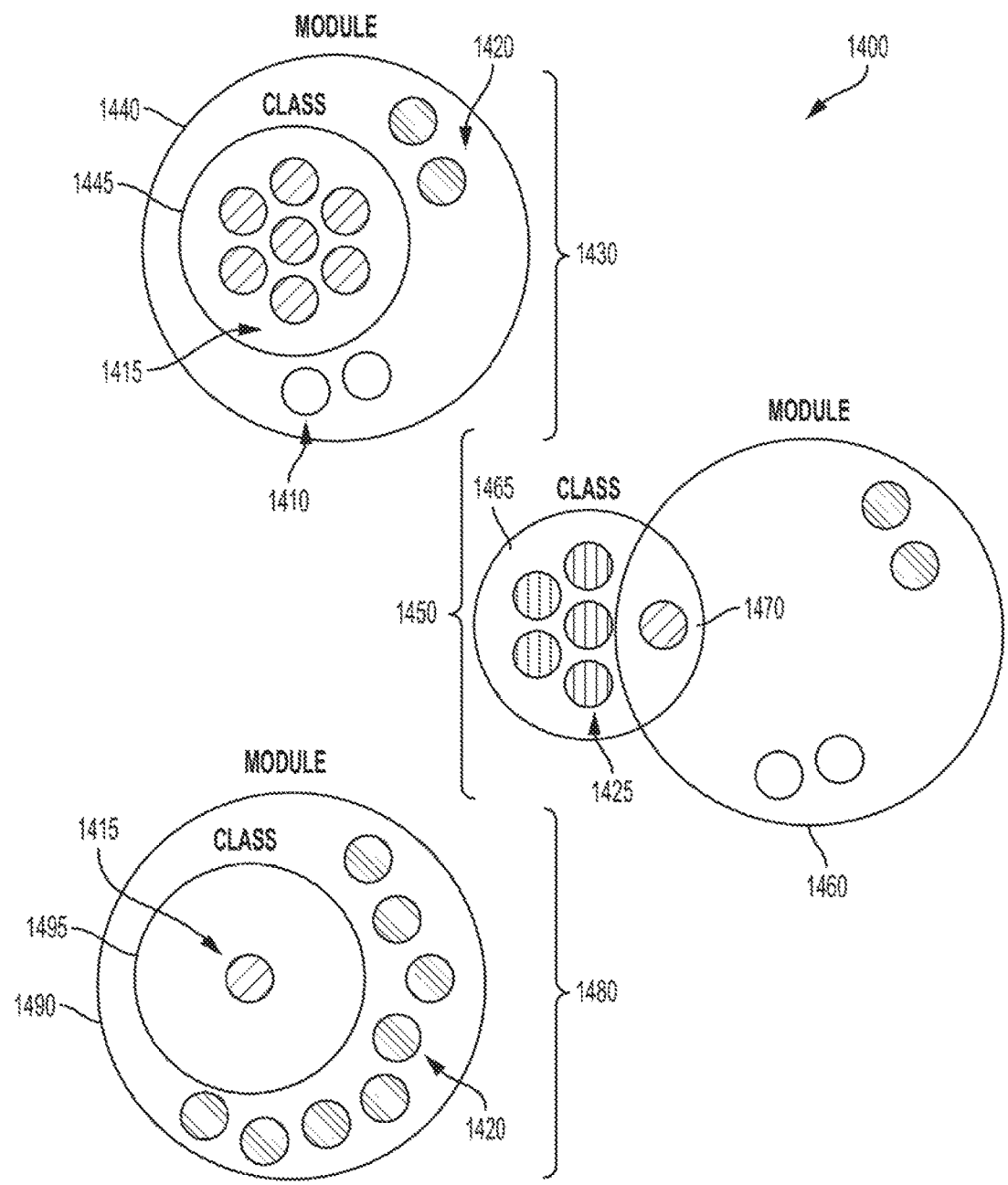
FIG. 14 is a diagram view of module and class overlaps.

Part IV.G: Module Diagrams—Similar diagrams can be observed in FIGS. 14 through 17. FIG. 14 shows a diagram view 1400 of a module set 1410 similar to view 1200. Various elements 1410, 1415, 1420 and 1425 are contained within modules. A first set 1430 includes first module 1440 with first and third elements 1410 and 1420 and wholly containing a first class 1445 with second elements 1415. A second set 1450 includes a second module 1460 partially containing a second class 1465 with fourth elements 1425 as well as sharing within an overlap region 1470 a second element 1415. A third set 1480 includes a third module 1490 with third elements 1420 and wholly containing a third class 1495 with an isolated second element 1415. Thus modules can associate classes in whole or in part with shared elements. Artisans will note that the elements 1410, 1415, 1420 and 1425 are representative only of organizational distinctions for explanatory and descriptive purposes, but do not in themselves inherently denote separate functional categories.

Figure 15:
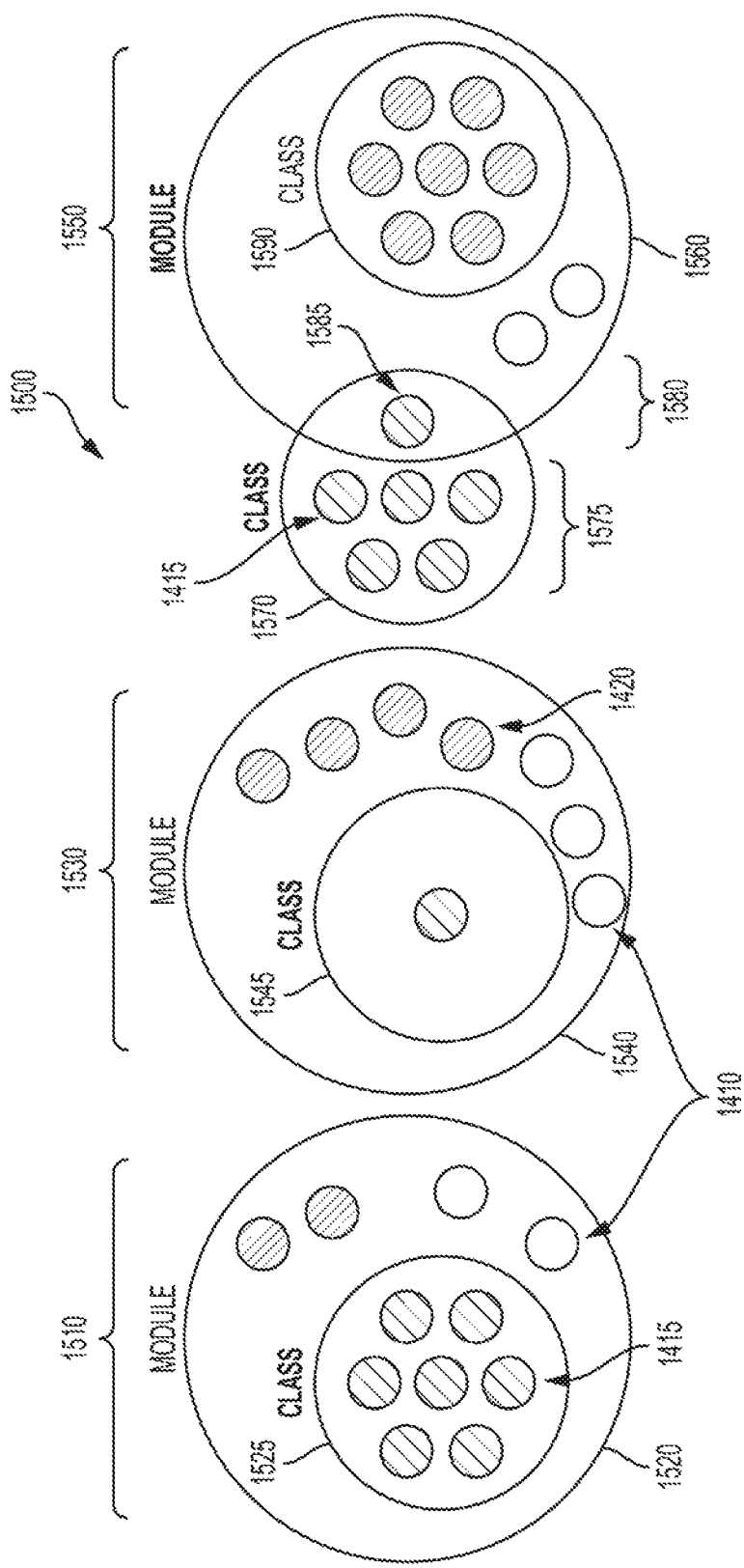
FIG. 15 is a diagram view of module and class overlaps.

FIG. 15 shows a diagram view 1500 of a module set 1510 similar to view 1200. A first set 1510 includes a first module 1520 that wholly contains a first class 1525. The first module 1520 includes first and third elements 1410 and 1420 while the first class 1525 therein contains second elements 1415. A second set 1530 includes a second module 1540 that wholly contains a second class 1545 with a single second element 1415. A third set 1550 includes a third module 1560 and a third class 1570 with an outside portion 1570 and a shared portion 1580 with a shared second element 1585. The third module 1560 also wholly contains a fourth class 1590 with third elements 1420.

Figure 16:
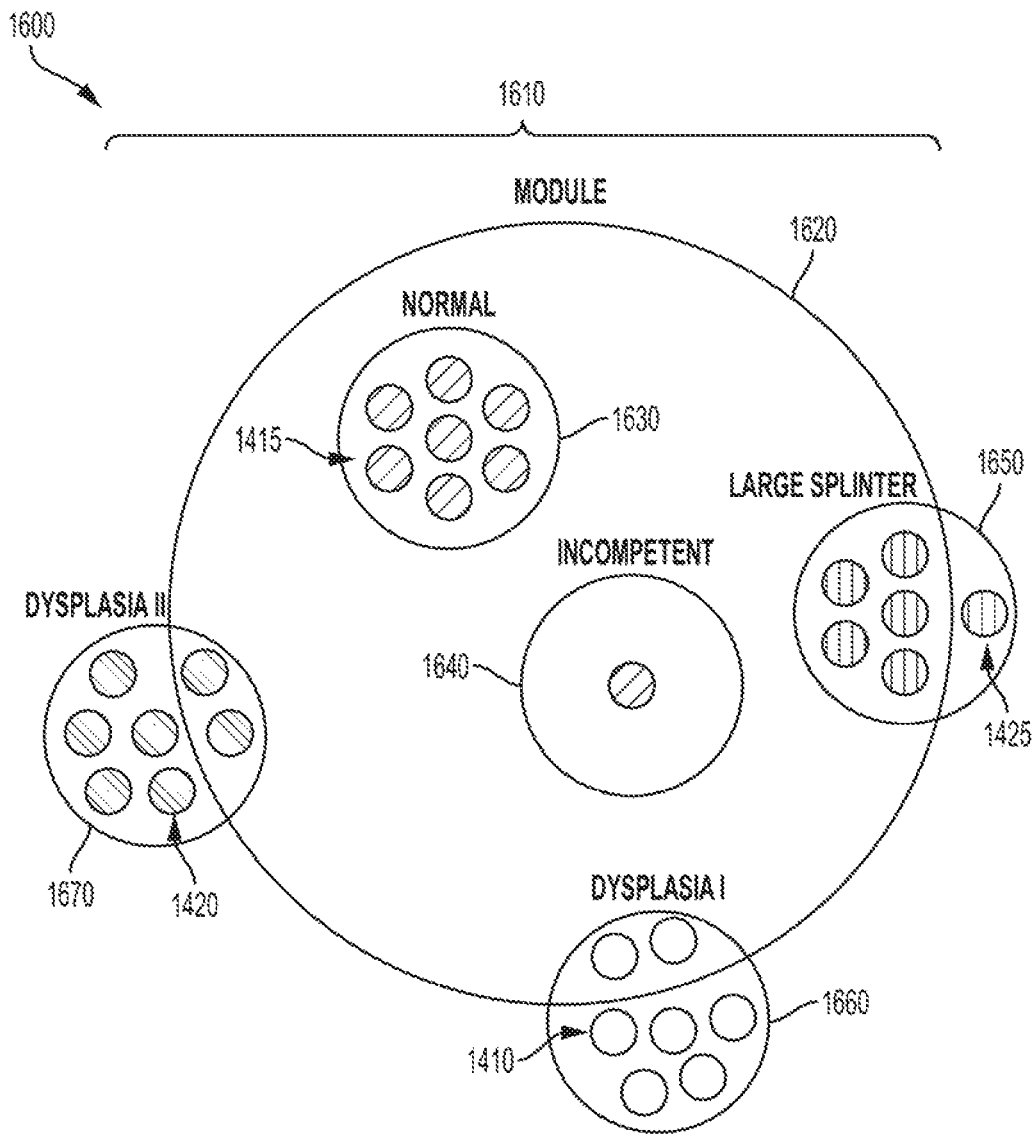
FIG. 16 is a diagram view of class overlap categories.

FIG. 16 shows a diagram view 1600 of a module set 1610 similar to view 1200. A module 1620 includes a normal class 1630 containing second elements 1415, an incompetent class 1640 with an isolated second element 1415, a large splinter class 1550 with several fourth elements 1425 primarily shared with the module 1620, a Dysplasia I class 1660 containing first elements 1410 and a Dysplasia II class 1670 containing third elements 1420. The module 1620 wholly contains the normal and incompetent classes 1630 and 1640, and shares overlap regions with the large splinter and dysplasia classes 1650, 1660 and 1670. The shared elements in the dysplasia classes 1660 and 1670 constitute a minority of the total elements therein, but a substantial majority for the large splinter class 1650.

Figure 17A:
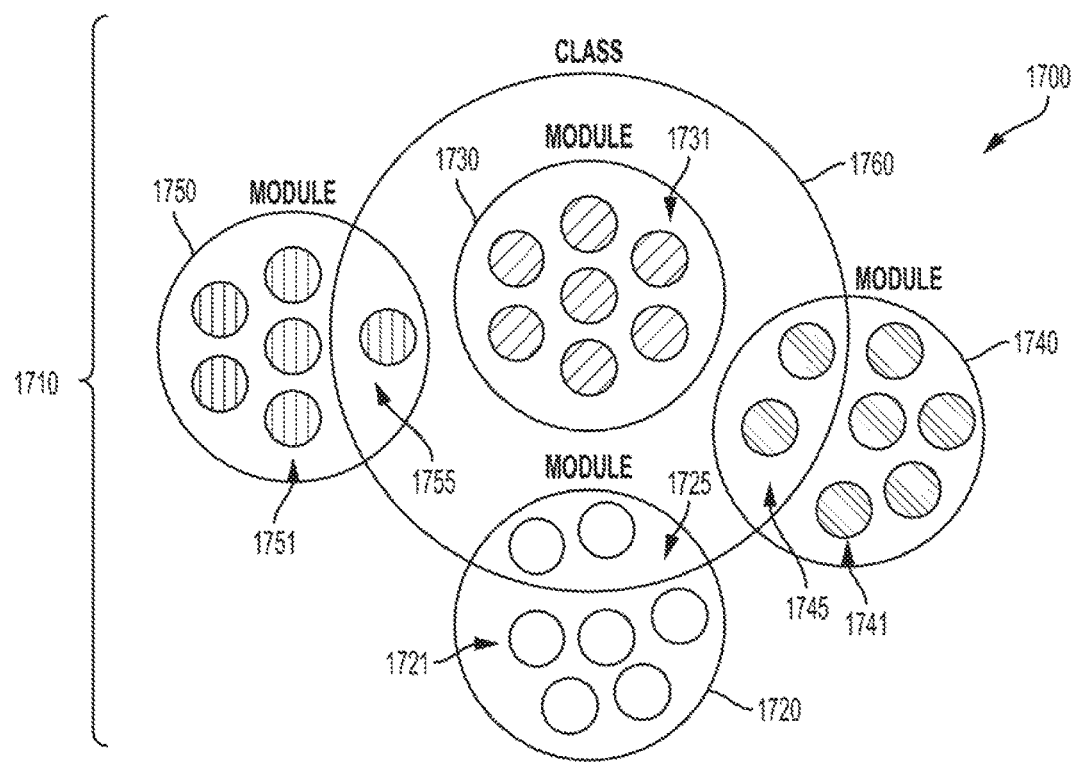
FIGS. 17A and 17B are diagram views of module and class overlaps.
Figure 17B:
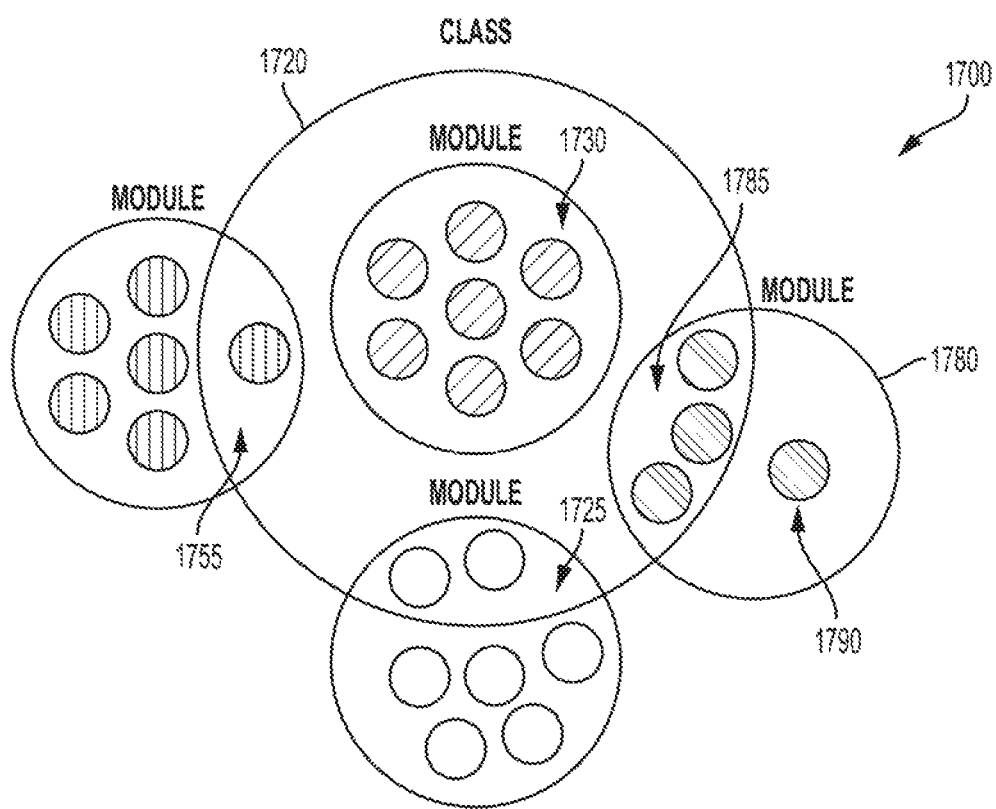

FIG. 17A shows a diagram view 1700 of a class set 1710 similar to view 1200. The set 1710 includes four modules: first 1720 with first elements 1721 and a corresponding shared region 1725, second 1730 with second elements 1731, third 1740 with third elements 1741 and a corresponding shared region 1745, and fourth 1750 with fourth elements 1751 and a corresponding shared region 1755. A class 1760 wholly contains the second module 1730 and shares elements in regions 1725, 1745 and 1755 with the respective first, third and fourth modules 1720, 1740 and 1750. None of these modules constitutes a large splinter. FIG. 17B shows a related diagram view 1770 of the class set 1710 with the third module 1740 replaced by a fifth module 1780 sharing region 1785 with the class 1760. Most of its third elements 1420 in the fifth module 1780 are shared with the class 1760 with a lone exception element 1790, thereby rendering the fifth module 1780 a large splinter. As results of a check divided class, one observes that modules 1730 and 1780 are Big portions. Module 1730 is the large splinter. Modules 1725 and 1755 are all Small portions. This means that the fragmentation of class 1760 is so advanced that the nodes in the small portion are designated as Dysplasia II.

Figure 18:
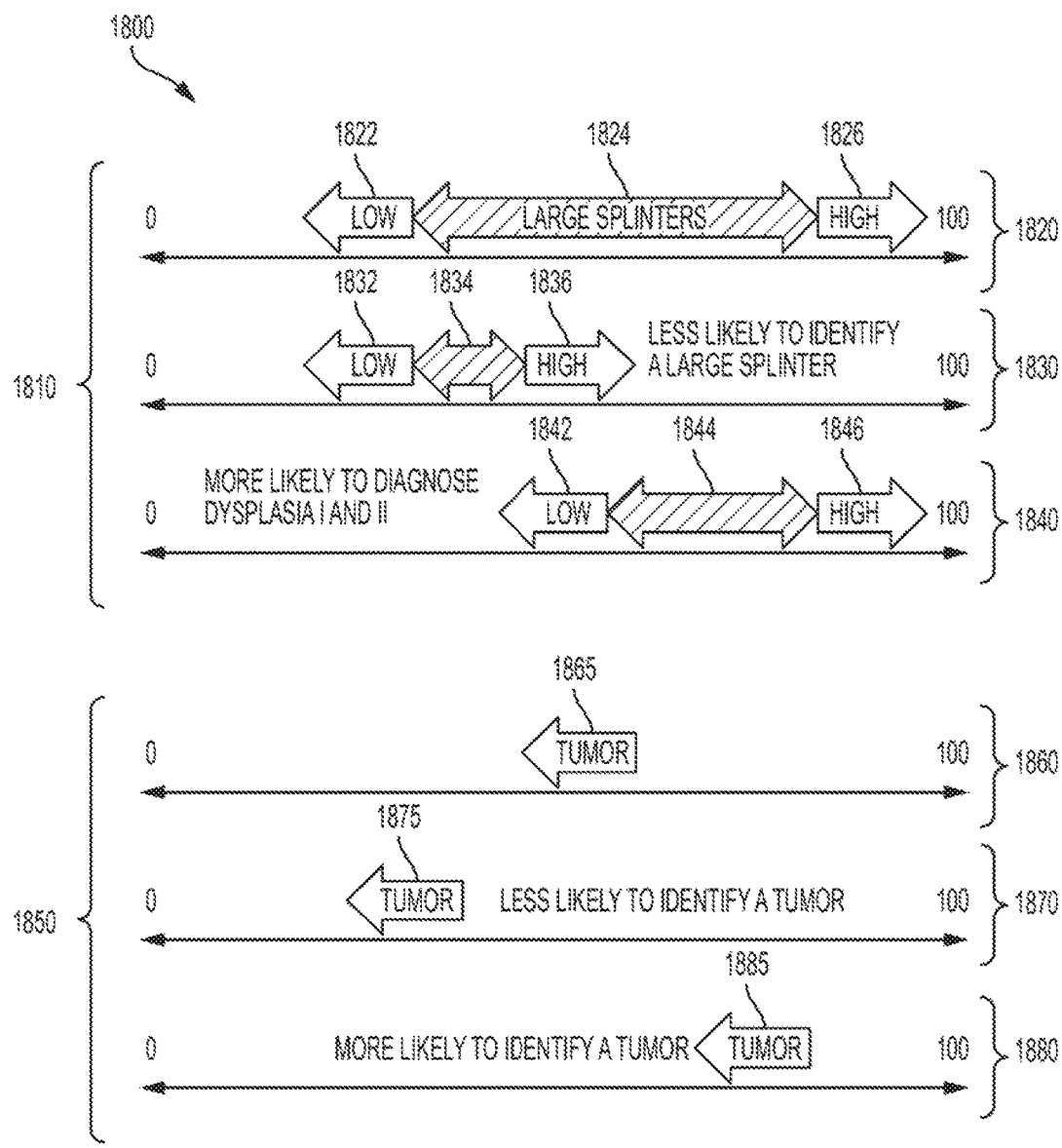
FIG. 18 is a chart view of diagnostic thresholds.

Part IV.H: Threshold Values and Metric Parameterization—Artisans of ordinary skill will note that tumor detection is dependent on dysplasia diagnoses and that threshold values significantly affect the detection outcomes. FIG. 18 shows a diagram view 1800 of variations in threshold values. The upper portion 1810 provides diagnosis for dysplasia ranging from zero to one-hundred in value. A first dysplasia scenario includes low 1822, large splinters 1824 and high 1826 ranges. A second dysplasia scenario includes low 1832, intermediate 1834 and high 1836 ranges. A third dysplasia scenario includes low 1842, intermediate 1843 and high 1846 ranges. The lower portion 1850 provides diagnosis for tumors ranging from zero to one-hundred in value. A first threshold scenario 1860 shows a tumor 1865 about midline; a second threshold scenario 1870 shows a less likely tumor 1875 and a third threshold scenario 1880 shows a more likely tumor 1885. In each of three dysplasia scenarios 1820, 1830, and 1840, the thresholds for low ranges 1822, 1832, 1842 and high ranges 1826, 1836, 1846 bound regions for large splinters 1824, 1834, 1844. In each of three threshold scenarios 1360, 1370 and 1380, the thresholds for cancer 1865, 1875, and 1885 are adjusted.

As shown in view 1800, the distance between high and low integrity tends to define the number of large splinters.

When these values are very far apart 1820 there are many large splinters, reducing reports of dysplasia. When these values are closely related 1830 there are few large splinters. Dysplasia reports also increase with the low integrity threshold 1840. The tumor metric is also sensitive to changes in the minimum tumor percentage as shown in view 1860. Decreasing the tumor threshold 1870 decreases the number of tumors identified, while increasing the threshold 1880 has the opposite effect. Tumor reports are also dependent on dysplasia reports and tumor reporting is reduced when dysplasia reports are decreased.

Exemplary embodiments are enacted with a "high" integrity value of 99%, a "low" integrity of 26%, and a cancer threshold of 50% as shown in scenarios 1820 and 1860. Extensive testing has shown that these values are highly reliable with only 15% of the reports being identified as a false-positive for Dysplasia or Tumors. Moreover, 95% of the true-positive reports are immediately actionable. Adjustments to the threshold values can increase the accuracy at the expense of additional false-negatives.

Part IV.I: $nZ\sigma$ Algorithm—State Member Detection. The second major metric relates to state members within a class. State is a rather ambiguous term in computer science, but can generally be defined as two or more distinct modes that affect how an object responds to input. In other words, an object may produce different output or different behavior depending on the state that it occupies. Because behaviors and outputs are altered by control structures, the concept of state appears to be closely related to state. As an initial definition, a member that participates in a control structure is related to state. Further direct experimentation determines additional criteria and exceptions to this definition.

A survey of control expressions found that a number of condition checks are unrelated to state. These included various kinds of variable validation (e.g., null checks, type checks, and equality checks), boundary conditions (e.g., x<limit, x!=0, x>-1), ordering (e.g., myDate>yourDate), modulo operations (e.g., b %2==e), and reporting operation success (e.g., IFinishedMyOperation( )). These operations are ignored as examples of control use because they are ultimately not associated with state. Direct evaluation of a field or method (e.g., thisIsTrue && thatIsTrue( )) appeared to be most related to state.

Some state-related members are found to occur in multiple control expressions so that frequency of occurrence was considered. Assuming that non-state variables only appeared infrequently in control statements, they could be excluded by means of a simple statistical test. Specifically, for a null hypothesis ($H_0$) that states zero uses to indicate no relevance to state, then for some standard deviation value $\sigma$ all members that had uses $c \geq \sigma$ must violate the null hypothesis.

$$\sigma = \sqrt{\frac{\sum (c-0)^2}{n-1}}, \qquad (11)$$

$$H_0 \; 0 \pm Z\sigma. \qquad (12)$$

A standard statistics formula for standard deviation $\sigma$ in eqn. (11) is applied to state counts c in contrast to the mean value for non-state members as zero {0}.

Furthermore, statistics provides a mechanism for producing highly reliable intervals related to $\sigma$. As shown in eqn. (12), for a given value Z, there is a specific level of confidence that a value within the specified range is not related to state. After classifying a large set of program elements as state or non-state, a Z value of 1.75, equivalent to a 95% confidence in the interval, is used to separate the two categories. Examination of the results, however, still shows a large number of non-state members outside of that interval. The Z value is further multiplied by positive integer values of n to identify the optimal interval. Thus the metric is based on the $nZ\sigma$ algorithm.

Figure 19:
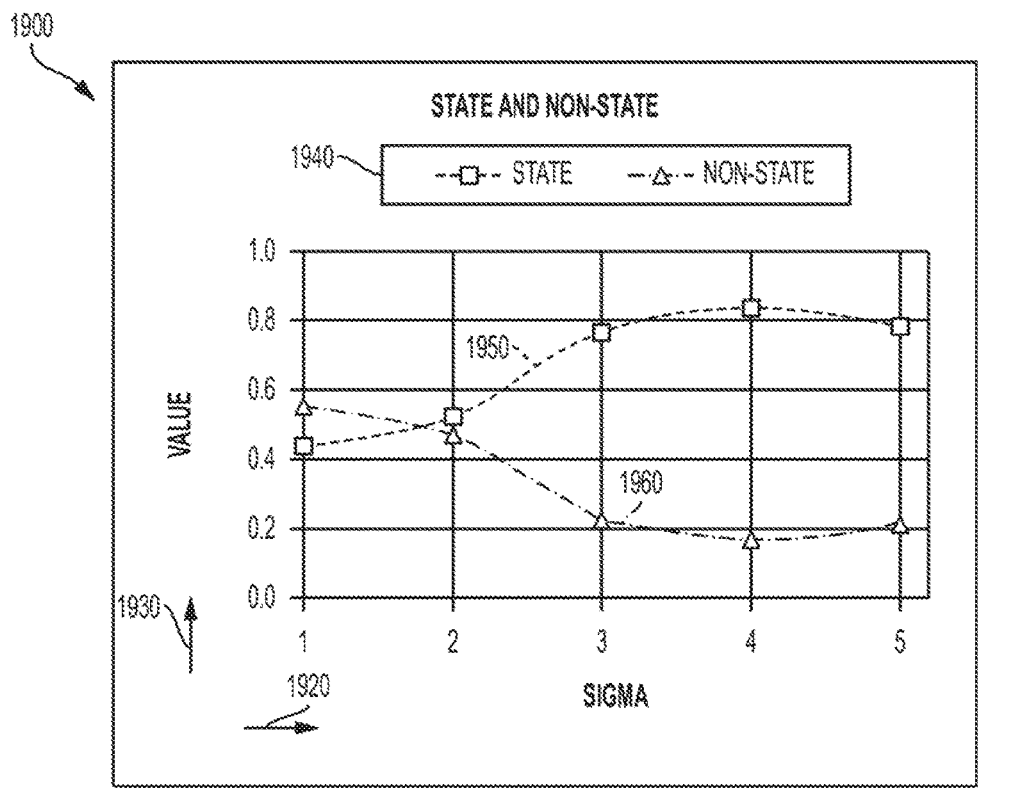
FIG. 19 is a graphical and tabular view of state and non-state values.

FIG. 19 shows a graphical view 1900 of State and Non-State values in relation to $nZ\sigma$. Positive integer values of n represents the abscissa 1920 for positive integer values of n, while values represents the ordinate 1930. A legend 1940 identifies state 1950 and non-state 1960 symbols plotted. Tabular data are provided in Table 1970. Manual classification reveals that the portion of state and non-state variables considerably mixes at 1 $Z\sigma$ and 2 $Z\sigma$. From counts above 3 $Z\sigma$, the number of non-state variables is very low and relatively stable. This means that values above 2 $Z\sigma$ can be reliably used to identify state members.

After a final examination of the results, one can observe that some key state variables are used only sparingly. These uses are critically important, but not repeated in multiple locations and the $nZ\sigma$ algorithm incorrectly classifies these as non-state. Fortunately, these variables are all of two distinct types: Booleans and enumerated values. Logically, this is a reasonable assumption as Boolean variables are the smallest representation of state, often distinguishing between one of two states as in AmIReady. Similarly, enumerations are often used to identify which of several potential values is the current state (e.g., ON, OFF, STANDBY). Thus a general exception was granted for all Boolean and enumerated types to be considered state-related based on their native type.

Another exception to the $nZ\sigma$ algorithm was created for inherited methods. Initially some inherited methods linked by the NewImplementation relationship are not identified as state. Individual class implementations had control uses below the $nZ\sigma$ threshold, although cumulatively they satisfy the cutoff. The $nZ\sigma$ algorithm changes to attribute all control uses from one of these methods to the parent implementation, effectively combining all uses of the method in the class hierarchy. Some of the original declarations are determined to have occurred in external library members (e.g., Object.equals( )) which are excluded from the $nZ\sigma$ algorithm. This change enables the $nZ\sigma$ algorithm to detect more state-related methods.

The last exception to the $nZ\sigma$ algorithm was related to accessors. It was noted that some native state fields had zero state uses, but the related accessors had some. This demonstrated that the statefulness of a program element was shared between accessors and the controlled variable. After completing the $nZ\sigma$ algorithm, non-state accessors or variables are also categorized as state related if they are related to members already classified as state related.

Part IV.J: Metrics Related to $nZ\sigma$ Algorithm. Just as detecting tumors is predicated on the Q algorithm, artisans of ordinary skill may suggest additional metrics predicated on the $nZ\sigma$ algorithm. A number of these have been demonstrated experimentally with various results. The following exemplary embodiments are representative of state-related metrics. As indicated previously, methods linked by NewImplementation relationships may be related to state. When this occurs, the hierarchy of methods is called a super-state method and may have an extensive impact on the program and these may be identified to the developer as a separate metric. This metric is experimentally shown to be 91% accurate.

Unread native state fields and uncalled Accessor methods may be of interest to the developer as a separate metric. This metric is not unlike the more typical "unused variable". Additional urgency may be found as these members have a demonstrable link to program state, however, experimentation showed that developers had little interest in this metric.

Setting are state-related variables where the value is determined at the instantiation of an object and remains fixed throughout the life of the instance. Typically, this pattern is used to define diverse behaviors for a single class depending on initial conditions. Experimentation has shown that these metrics are also of varied interest.

Some state variables are written to one or more times, but the value has always been the same. Effectively these variables are a constant, although not designated as such according to the language syntax. Experimentation shows that logic that depends on these constants is universally flawed.

Within a program, individual classes may be responsible for reading and distributing settings from an operator or a configuration file. Conversely, some objects act as repositories for current state during execution. These repositories are called state objects. Experimentation shows that state objects are of little interest to the developer, although they are informative for those unfamiliar with the source code.

Part IV.K: Threshold Values and Metric Parameterization—Artisans of ordinary skill will note that the n value affects the nZσ threshold and significantly alters the outcome of the state classification. Exemplary embodiments are enacted using the value n>2 as discovered experimentally. Extensive experimentation has shown that this value is 95% accurate in predicting state members. Alteration of n affects the false positive rate, but may be considered preferable for comparison of state-classification results at various levels of n.

Part IV.L: Advantages and Alternatives—The sort of analysis necessary to accomplish these tasks manually would take many hundreds of man hours. A human is also unlikely to be as capable of finding and proving the existence of many of the reported findings. Metrics that can perform classification comparable to or better than manual classification without human intervention is an extraordinary leap forward. While the metrics described in exemplary embodiments are intended to meet certain objectives paralleling manual program analysis, the same techniques can be used to accomplish similar goals that would not significantly depart therefrom and would rely upon these processes.

Fortify Static Code Analyzer from Hewlett Packard Enterprise (HPE) is a tool that uses many of the same techniques to accomplish completely different goals. The Fortify source code is compiled into a second-stage file structure that shows evidence of name mangling and registration of program elements. This file structure is then readily compiled into an internal representation used by the algorithms to detect and follow specific control flow and data flow elements. Without more direct knowledge of HPE's tradecraft, one cannot accurately describe how this is accomplished, but the results are data flow metrics that demonstrate potential security hazards. Fortify is categorized as a defect detection tool that uses a similar form of semi-dynamic, static analysis.

The Q Algorithm described by Blondel in "Fast unfolding of communities in large networks" is used as a starting point for one of the metrics described in exemplary embodiments. That algorithm, however, was significantly adapted in a number of ways described in section BSDX. While the original Q algorithm is an inspiration for that portion for the exemplary embodiments, its adaptation and especially the application of the data derived from the adapted algorithm are inventive in nature. While Blondel's objective is similar, the exemplary process is completely different.

Figure 41:
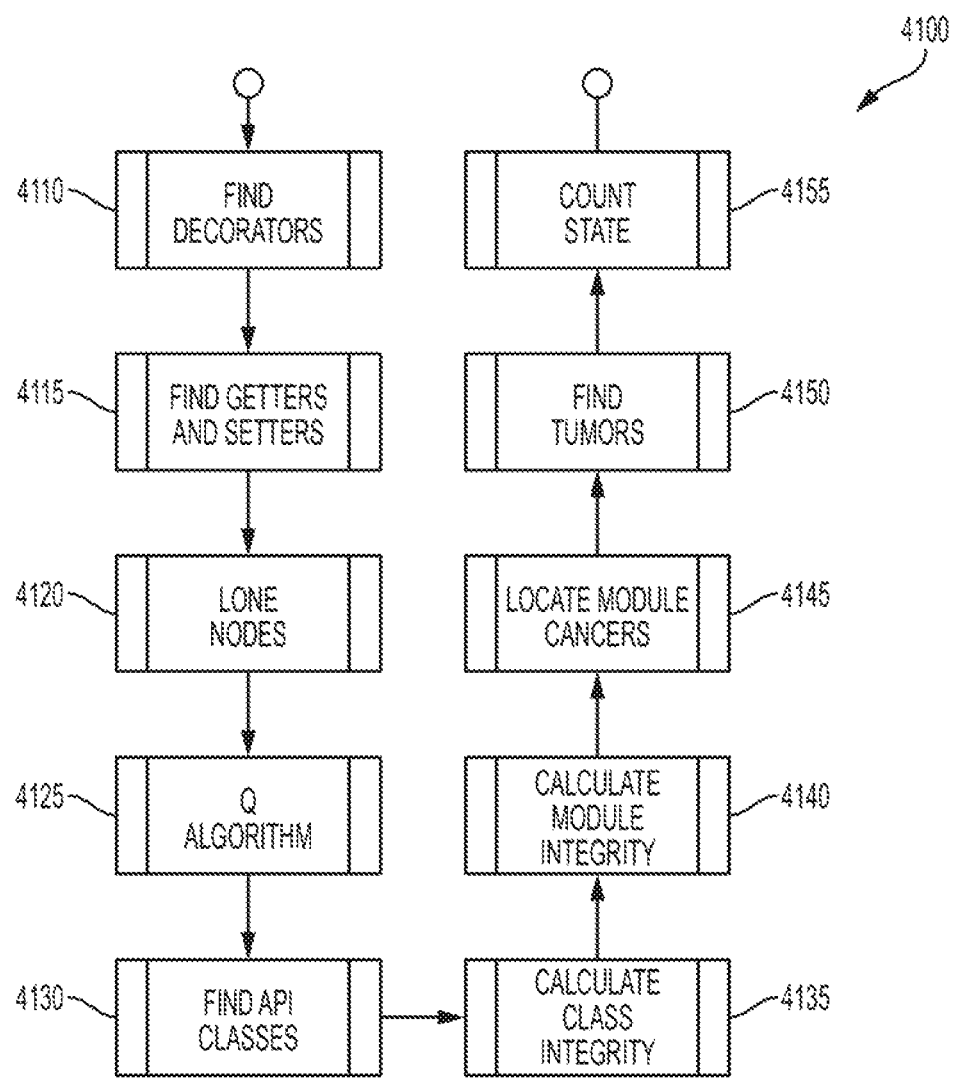
FIG. 41 is a flowchart view of the complete metric process.

Section V: Process. The following describes flowcharts related to these procedures. FIG. 41 shows a flowchart view 4100 of the process with sequential blocks 4110, 4115, 4120, 4125, 4130, 4135, 4140, 4145, 4150, and 4155 corresponding to views 2000, 2100, 2200, 2300, 2400, 3100, 3200, 3300, 3400, 3800, and 3900. Within these flow charts the following nomenclature will be used to denote specific attributes of the source code under consideration:

Methods are generally denoted as m,
Fields are generally denoted as f,
x to be used to distinguish from other named members,
Sets are denoted as the upper-case letters A, B, C, etc.,
Class C and Module M being special sets,
Empty sets denoted as { },
The size of a set as |X|,
Adding to a set as X+=x,
Setting the relationship rel of a meta node as y(rel)=x,
The parameterized relationship rel from y specific to z as y(rel, z),
The set of program elements X with relationship rel to y as X=y(rel),
The relationship between an accessor method m and controlled field f as m→f,
The ith element of a set as X[i],
The attribute a of program element x as x.a.

Figure 20:
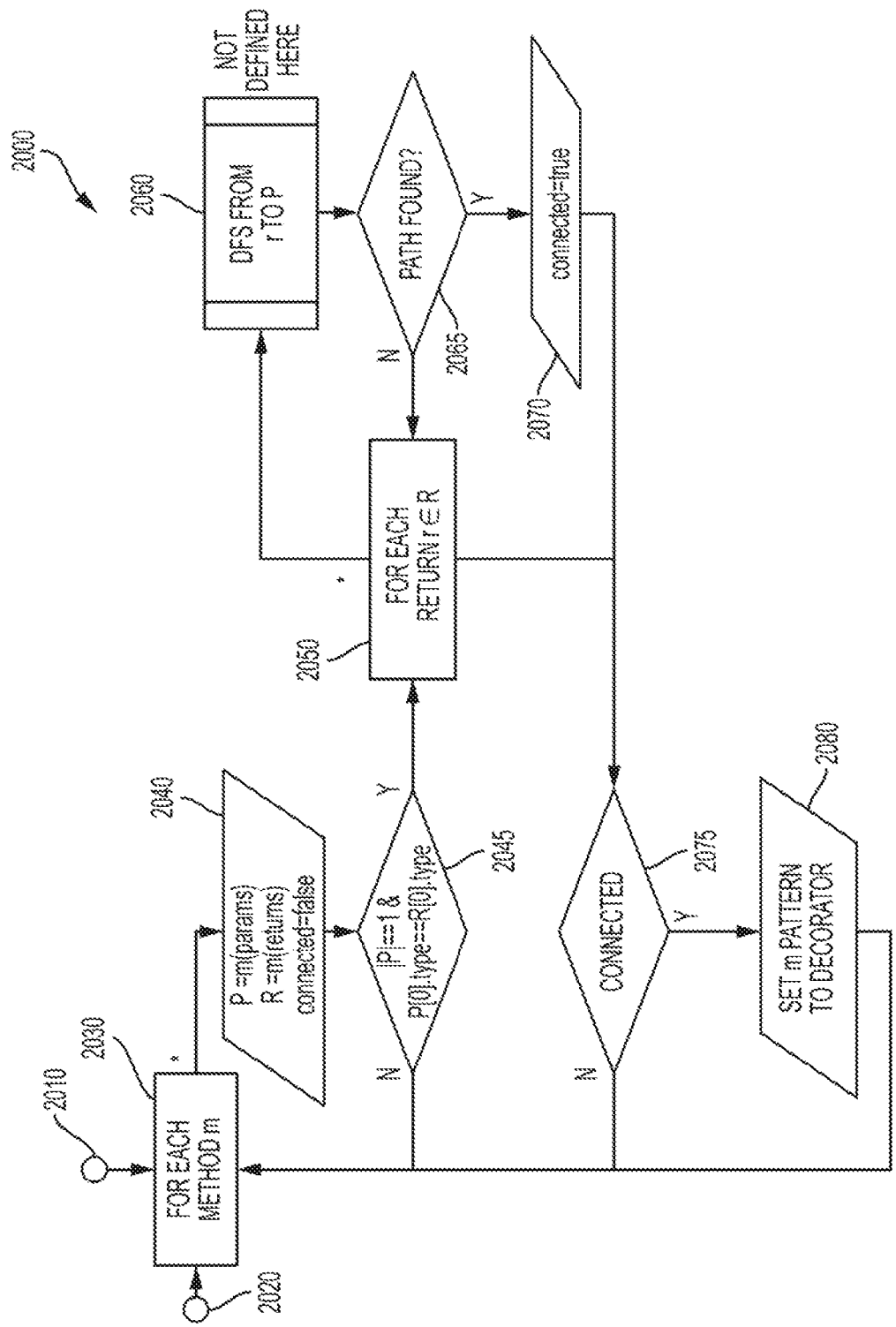
FIG. 20 is a flowchart view of Find Decorators.

FIG. 20 shows a flowchart view 2000 of a process to Find Decorators. The routine in view 2000 identifies operations between nodes for entry 2010 and exit 2020. The operations begin with an initial while loop 2030 for each method m marked by an asterisk (that denotes initial path direction) with a first declaration 2040 followed by a first decision 2045 regarding the parameters with "no" returning to loop 2030 and "yes" proceeding to a second while loop 2050 for each return r that performs a calculation 2060 for DFS from each return to the parameter. A second decision 2065 queries determination of the path, with "no" returning to loop second 2050 and "yes" proceeding to a second declaration 2070 before returning to second loop 2050. Upon completion of each return, a third decision 2075 queries whether paths are connected, with "no" returning to first loop 2030 and "yes" proceeding to a third declaration 2080 being set to Decorator, and then returning to loop 2030.

FIG. 20 describes a single-loop process which examines each method in the program under scrutiny. As described in, Part IV.B the decorator method embodies specific characteristics which make it data transparent. In other words, the input passed to the method as a parameter is returned from the method. As shown in FIG. 6, the list 650 passed in as a parameter is used iteratively at 660 and then added to myAnswer at 670. When myAnswer is returned at 680, the original parameter has been returned. This metric enables future metrics and has not been characterized as positive or negative for software design.

Figure 21:
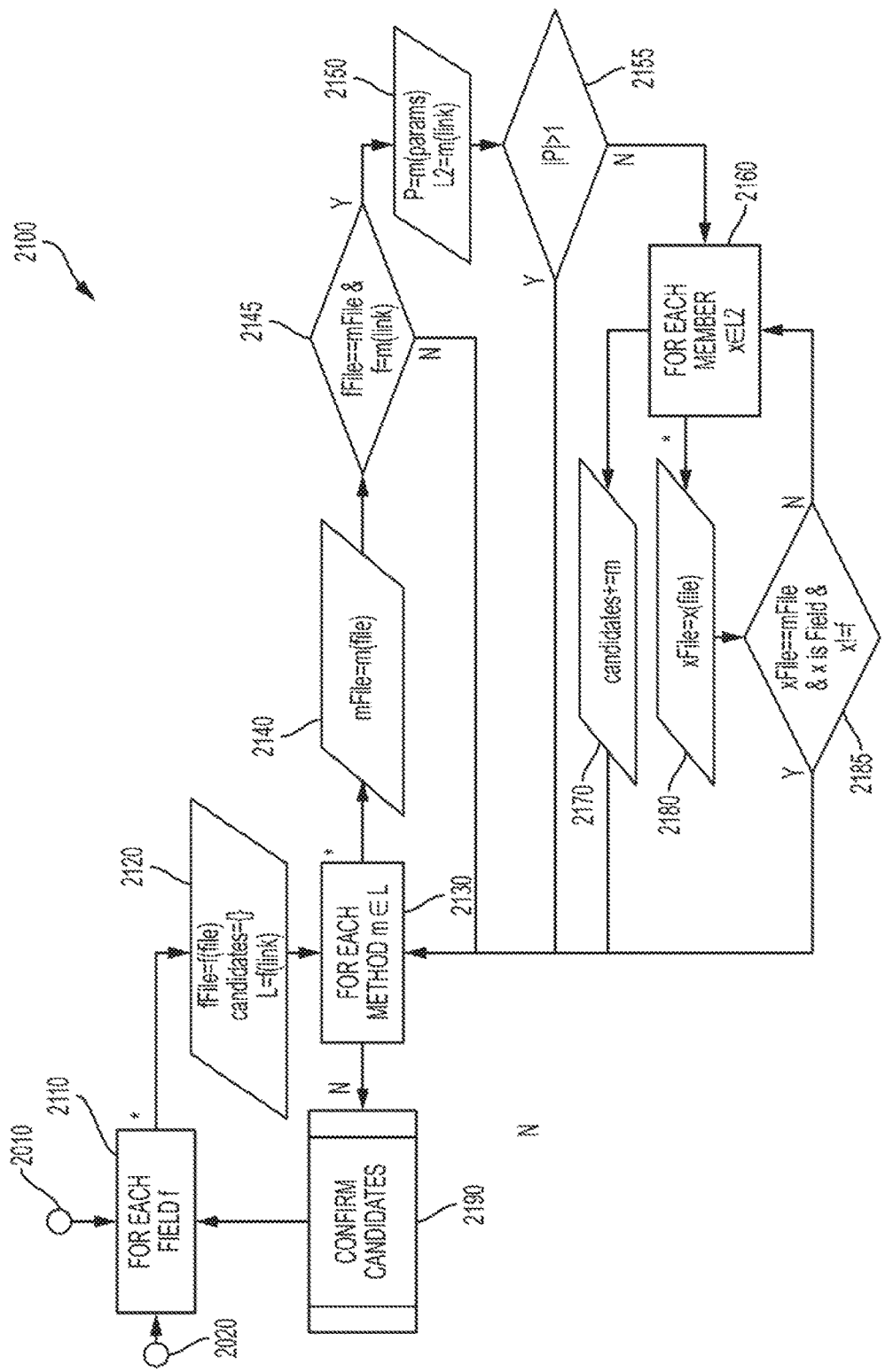
FIG. 21 is a flowchart view of Find Getters and Setters.

FIG. 21 shows a flowchart view 2100 of a process to Find Getters and Setters. For purposes of this disclosure, entry and exit nodes 2010 and 2020 continue to be referenced, albeit being specific for the separate processes. The operations begin from entry node 2010 with a first while loop 2110 for each field f with a first declaration 2120 followed by a second while loop 2130 and a second declaration 2140. This proceeds to a first decision 2145 that equates field and method, in which "no" returns to the second loop 2130 and "yes" proceeds to a third declaration 2150 followed by a second decision 2155 querying whether parameters exceed unity. In this case, "yes" returns to the second loop 2130 whereas "no" proceeds to a third while loop 2160 that sets a fourth declaration 2170 for candidates and a fifth declaration 2180 for members that proceeds to a third decision 2185 regarding whether the member is a field. In this case "no" returns to the third loop 2160 while "yes" returns to the second loop 2130. Upon completion of all loops 2110, 2130 and 2160, the process establishes confirmation 2190 of the candidates for each field in the first loop 2110 and terminates with exit node 2020.

Figure 22:
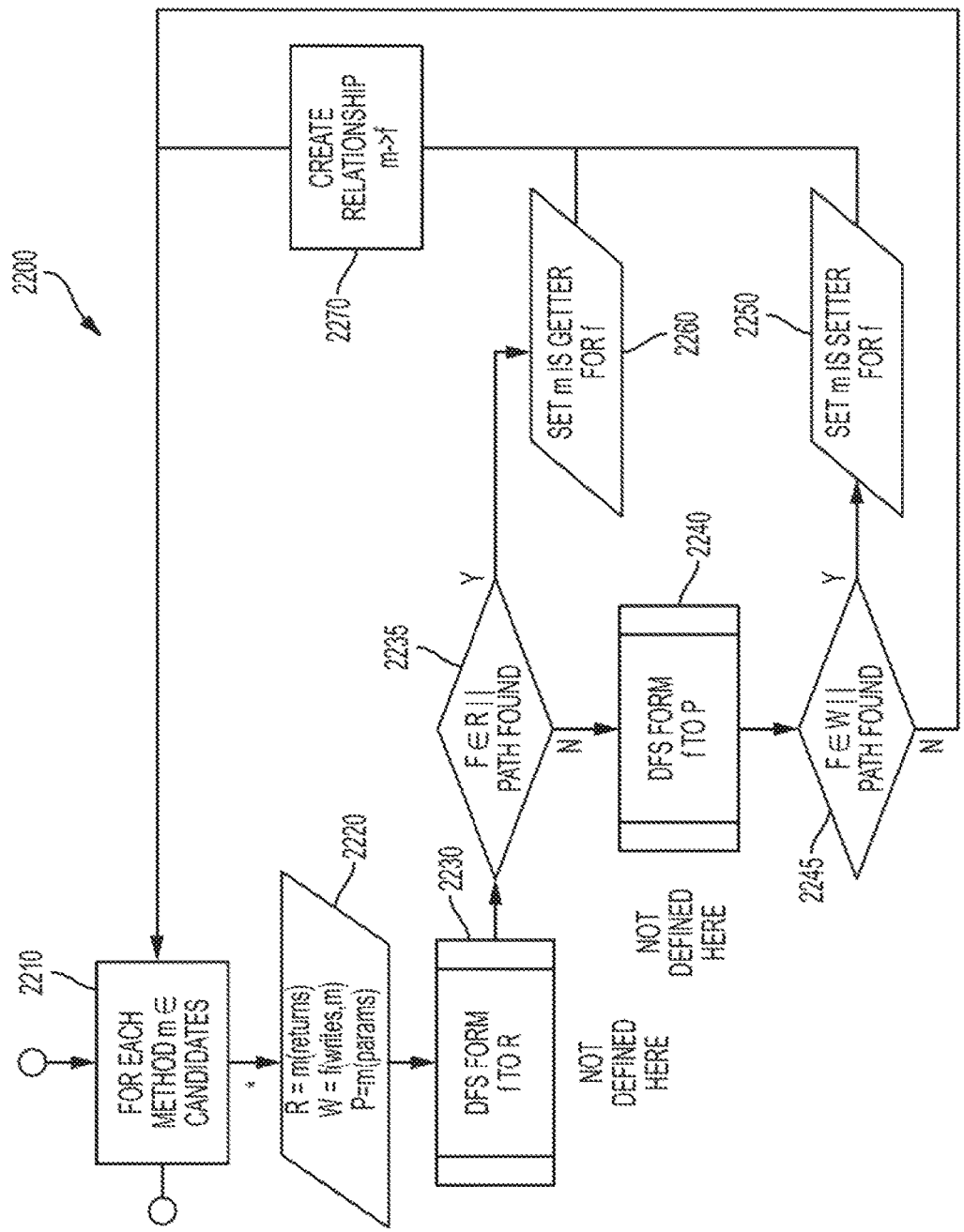
FIG. 22 is a flowchart view of Confirm Candidates.

FIG. 22 shows a flowchart view 2200 of a process to Confirm Candidates. The operations begin with a first while loop 2210 for each method m with a first declaration 2220 followed by a first calculation 2230 DFS from fields f within returns R. This leads to a first decision 2235 that determines a first path found in the field f, in which "no" proceeds to a second calculation 2240 DFS from fields f within param P. Then a second decision 2245 determines a second path found in the field f within write W in which "yes" sets a second declaration 2250 with m set for f. For the first decision 2235, "yes" diverts to a third declaration 2260 with m set for f, and both declarations 2250 and 2260 proceed to an operation 2270 to create a relationship of m>f. For the second decision 2245, "no" returns to the first loop 2210, as does the operation 2270.

FIGS. 21 and 22 describe a double-nested loop process where each field is compared to the methods that are linked to it. In the second loop each method is examined for the characteristics of Accessor methods described in Part IV.B. All methods which match these criteria are considered candidates and are passed to the Confirm Candidates subprocess where they are linked by DFS to verify the relationship between method and field. If no path is found to confirm the relationship, the method is ignored. The surviving methods are linked to the field in 2270.

Figure 23:
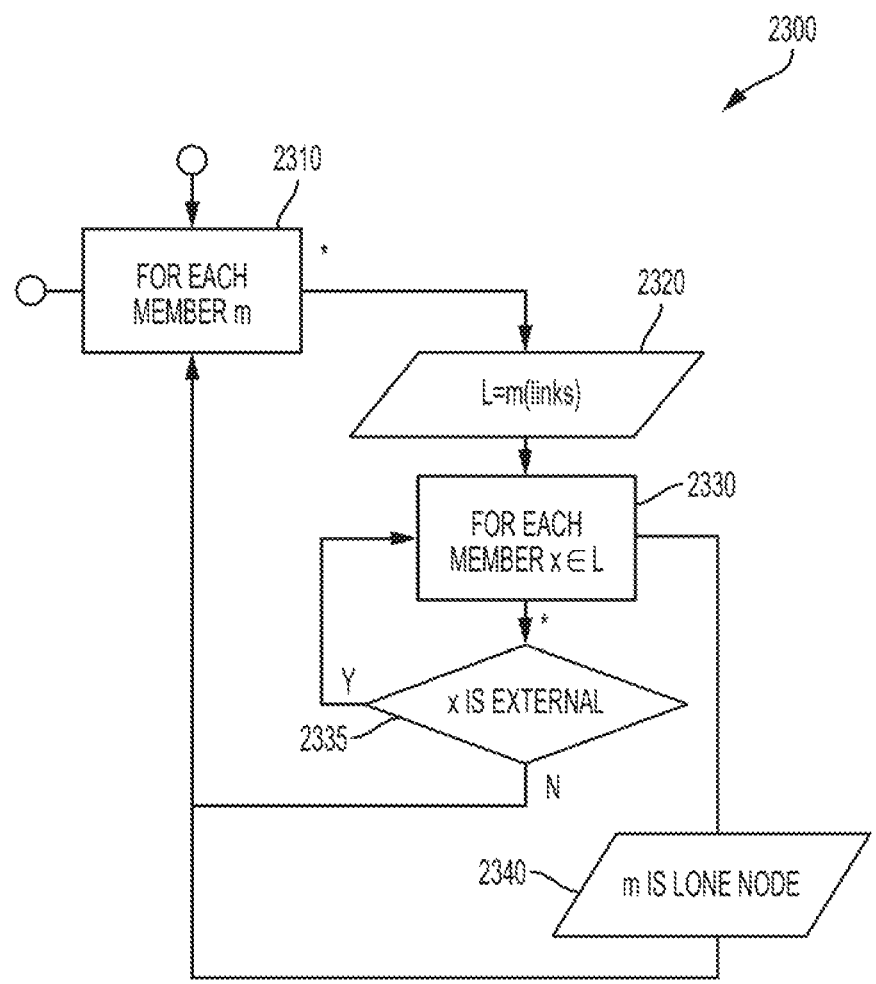
FIG. 23 is a flowchart view of Lone Nodes.

FIG. 23 shows a flowchart view 2300 of a process to identify Lone Nodes. The operations begin with a first while loop 2310 for each member m with a first declaration 2320 for links L followed by a second while loop 2330 for each member x. A decision 2335 determines whether member x is external, with "yes" returning to the second loop 2330 and "no" returning to the first loop 2310. Upon completion of each member, a second declaration 2340 for lone nodes identifies m accordingly, and returns to the first loop 2310.

The flowchart view 2300 details the double-nested loop process where Lone nodes are discovered as described in Part IV.C. Lone nodes are program elements that have no internal links. This divorces them from the program under scrutiny and suggests a complete lack of cohesion. The loop runs through an order $O(n^2)$ analysis of each member and checks for any internal connections. The first internal connection discovered in 2335 immediately exits to the next member 2310. The surviving members are set as lone nodes in 2340.

Figure 24:
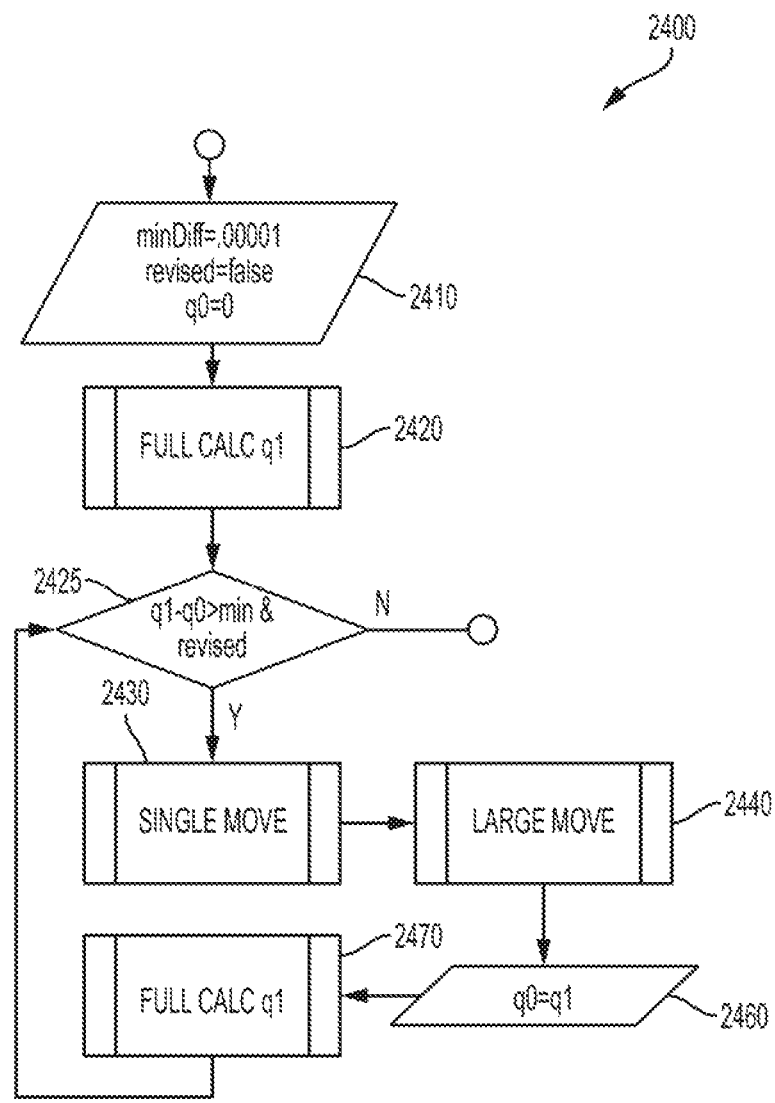
FIG. 24 is a flowchart view of Q Algorithm.

FIG. 24 shows a flowchart view 2400 of a process to execute the Q Algorithm. The operations begin with a first declaration 2410 for parameter q0 followed by a first calculation 2420 of q1. A decision 2425 determines whether q1-q0 is exceeds a set minimum, with "yes" followed by Single Move calculation 2430, Large Move calculation 2440, a second parameter declaration 2460 equating q0 to q11, and a Full Calc calculation 2470 before returning to the decision 2425, which terminates in response to "no" for the difference query.

Figure 25:
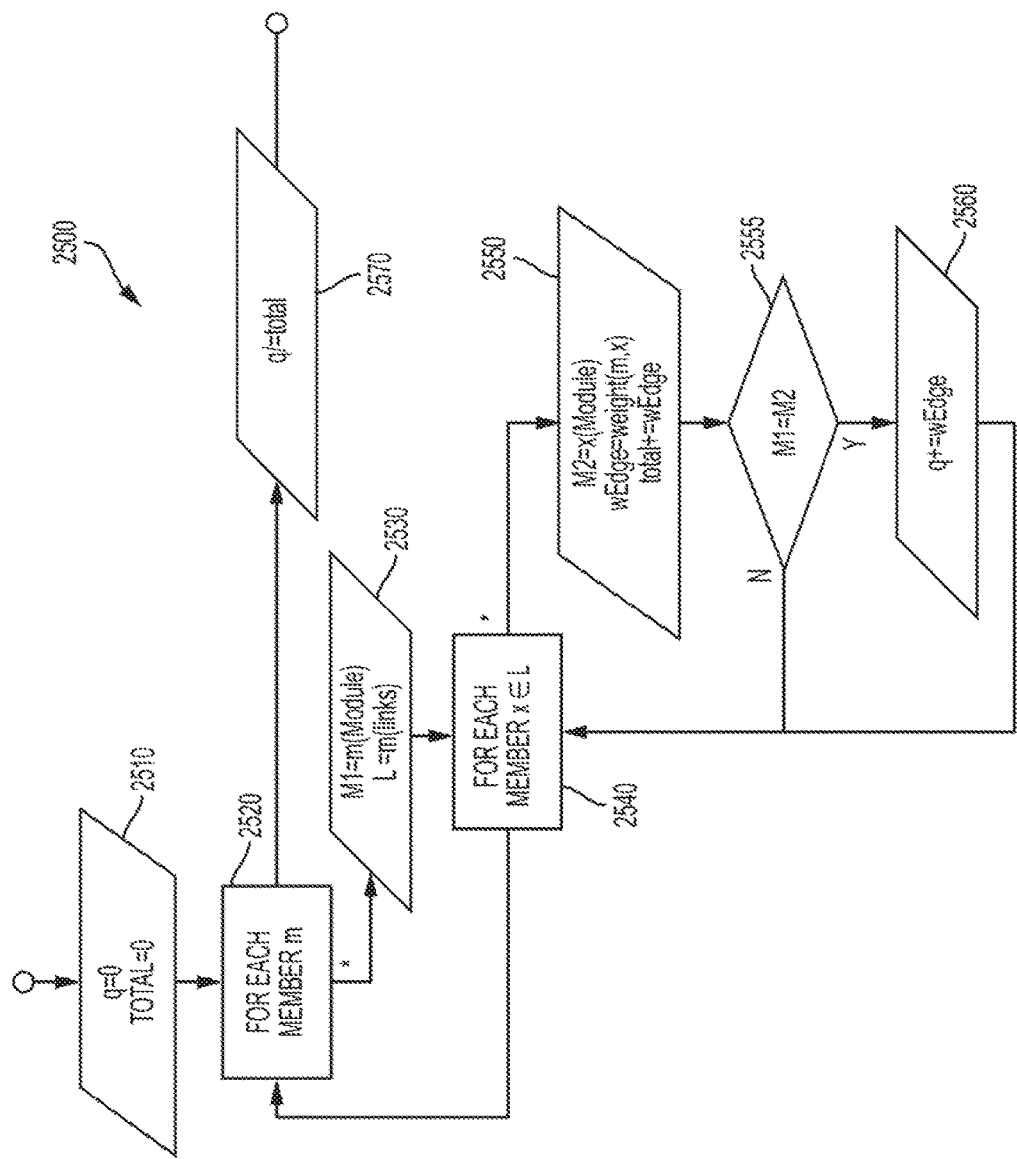
FIG. 25 is a flowchart view of Full Calc.

FIG. 25 shows a flowchart view 2500 of a process to execute Full Calc 2470. The operations begin with a first declaration 2510 initializing q followed by a first while loop 2520 for each member m with a first declaration 2530 for modules and links. This is followed by a second while loop 2540 with a second declaration 2550 for edges, a decision 2555 that determines equivalency between the module values, with "no" returning to the second loop 2540 and "yes" leading to a third declaration 2560 for edges followed by returning to the second loop 2540. Upon completion of the first loop 2520, a fourth declaration 2570 for summation establishes the total.

Figure 26:
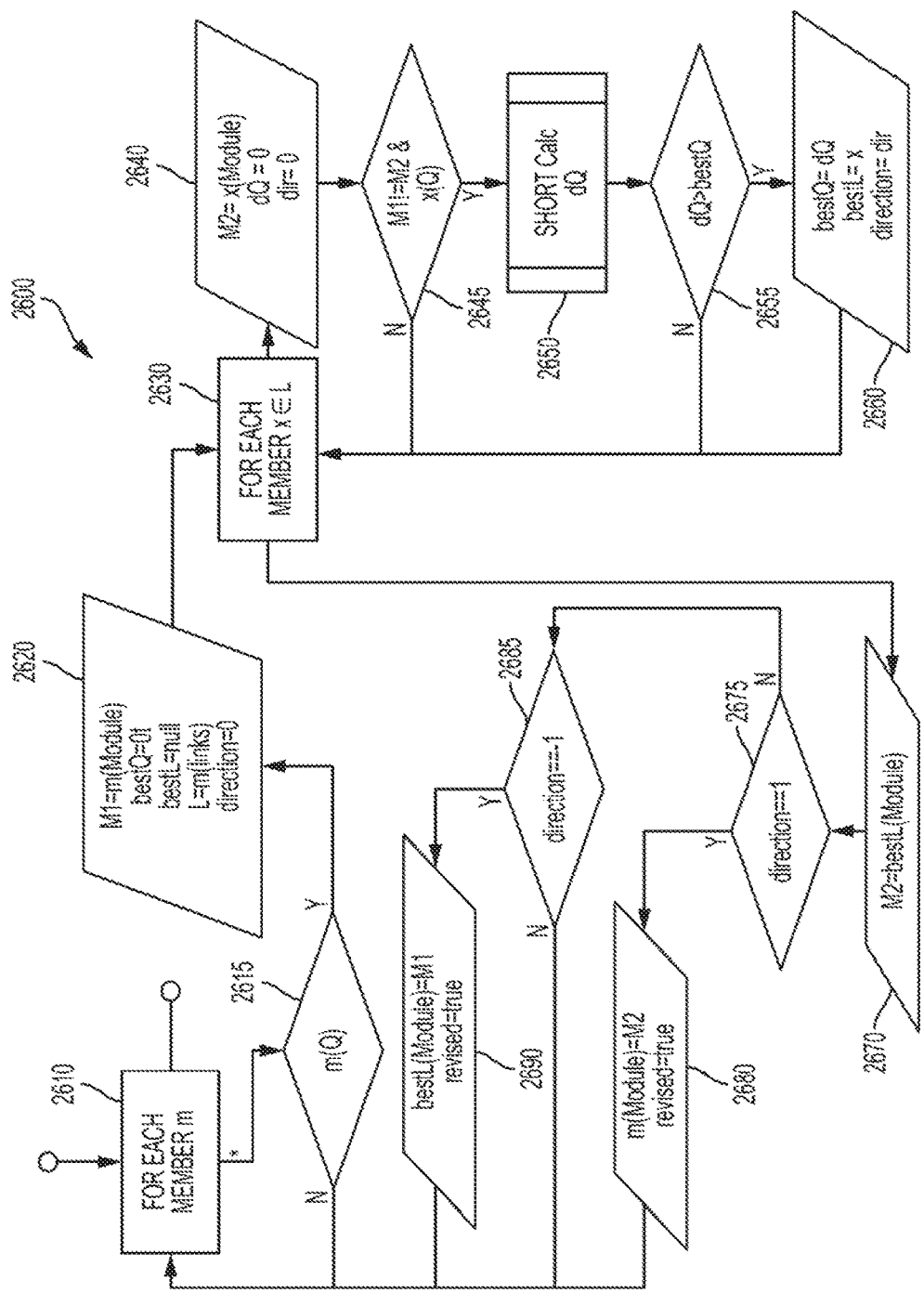
FIG. 26 is a flowchart view of Single Move.

FIG. 26 shows a flowchart view 2600 of a process to execute Single Move 2430. The operations begin with a first while loop 2610 for each member m with a first decision 2615 with "no" returning to the first loop 2610 and "yes" proceeding to a first declaration 2620 followed by a second while loop 2630 for each member x among links, succeeded by a second declaration 2640. A second decision 2645 determines equivalency of module counts followed by a calculation 2650 and a third decision 2655 with "yes" yielding a third declaration 2660, which returns to the second loop 2630, along with "no" responses from decisions 2645 and 2665. Completion of the second loop 2630 leads to a fourth declaration 2670 and a third decision 2675 in which "yes" proceeds to a fifth declaration 2680 that returns to the first loop 2610, and "no" proceeds to a fourth decision 2685 in which "yes" proceeds to a sixth declaration 2690 and "no" returns to the first loop 2610, as does the sixth declaration 2690.

Figure 27:
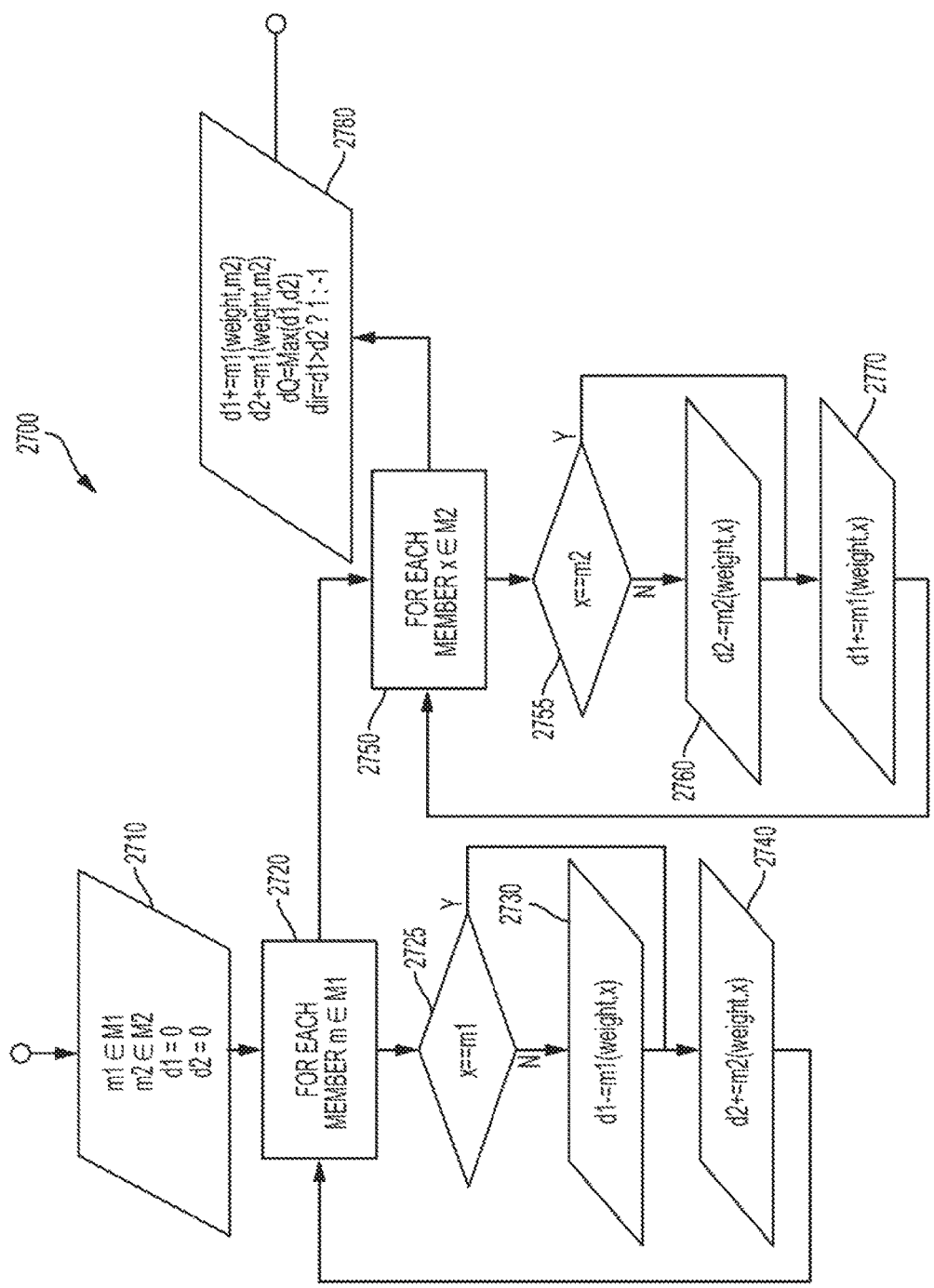
FIG. 27 is a flowchart view of Short Calc.

FIG. 27 shows a flowchart view 2700 of a process to execute Short Calc 2650. The operations begin with a first declaration 2710 followed by a first while loop 2720 for each member x to a first decision 2725 of x set to m1, with "no" proceeding to a first parameter declaration 2730 for d1– followed by a second parameter declaration 2740 for d2+, and "yes" diverting to the second declaration 2740. Upon completion of the first loop 2720, the operation proceeds to a second while loop 2750 for each member x to a second decision 2755 of x set to m2, with "no" proceeding to a third parameter declaration 2760 for d2– followed by a fourth declaration 2770 for d1+, and "yes" diverting to the fourth declaration 2770. Upon completion of the second loop 2750, the operation proceeds to a fifth declaration 2780.

Figure 28:
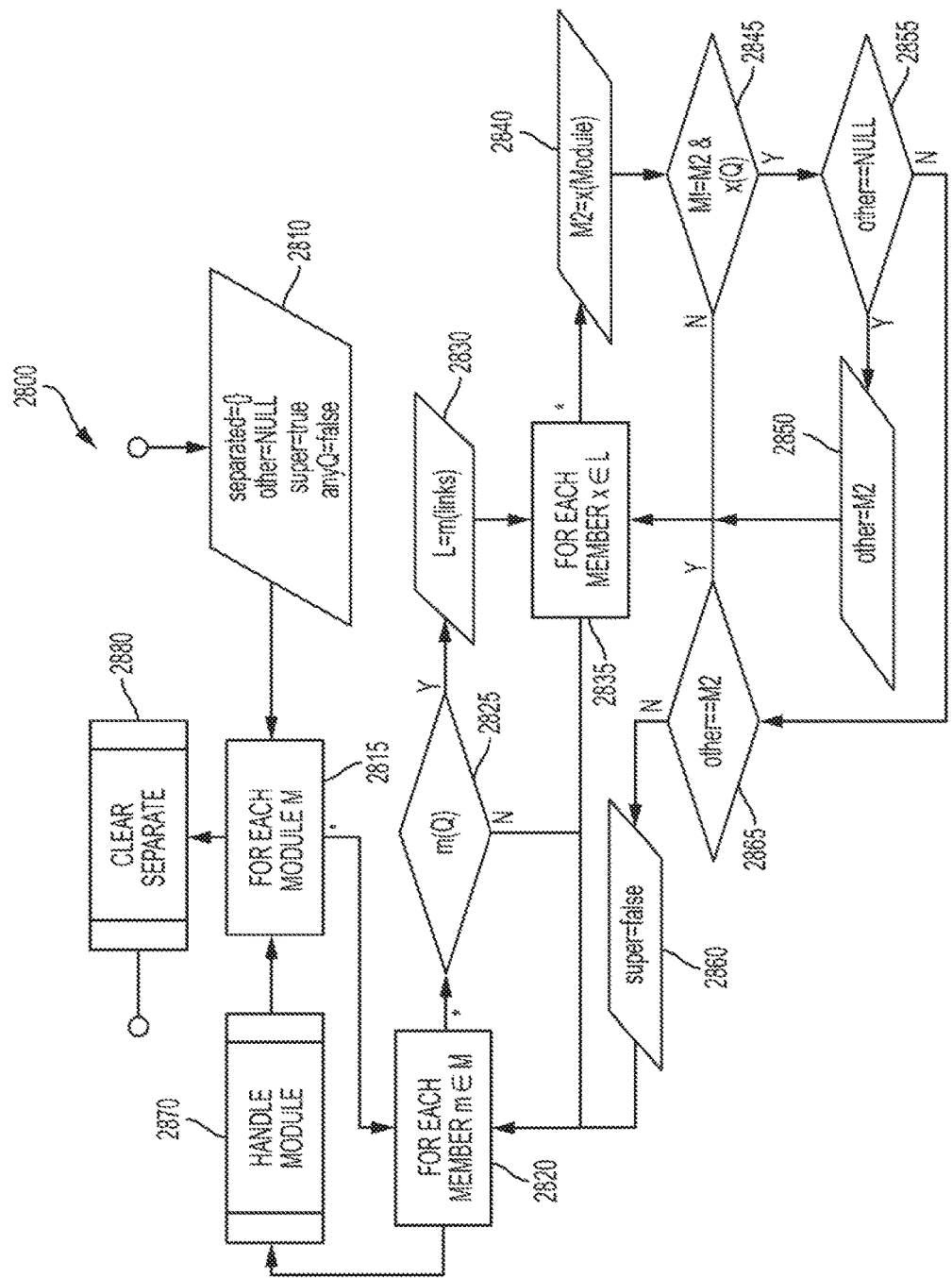
FIG. 28 is a flowchart view of Large Move.

FIG. 28 shows a flowchart view 2800 of a process to execute Large Move 2440. The operations begin with a first declaration 2810 followed by a first while loop 2815 for each module M to a second while loop 2820 for each member m proceeding to a first decision 2825 of m, with "no" returning to the second loop 2820 and "yes" proceeding to a first parameter declaration 2830 for links L. This is followed by a third while loop 2835 for each member x proceeding to a third declaration 2840 for M2, and continues to a second decision 2845 for module equivalency, with "no" returning to the third loop 2835, as can a fourth declaration 2850. For the second decision 2845, "yes" proceeds to a third decision 2855 regarding NULL, with "yes" proceeding to the fourth declaration 2850 and "yes" diverting to a fourth decision 2865, with "yes" returning to the third loop 2835 and "no" proceeding to a fifth declaration 2860, which then returns to the second loop 2820. A first calculation 2870 for the Handle Module proceeds from completion of the second loop 2820 and returns to the first loop 2815, which upon completion proceeds to a second calculation 2880 for Clear and Separate.

Figure 29:
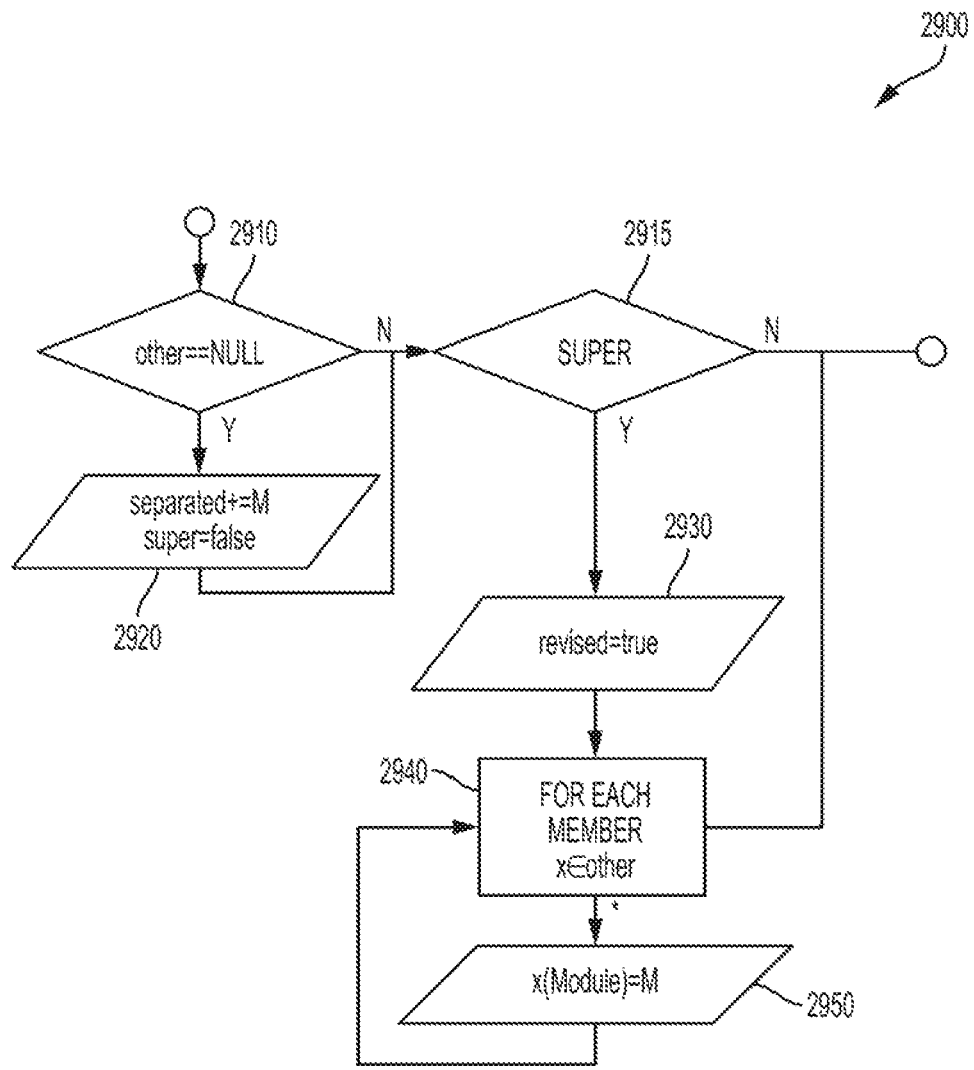
FIG. 29 is a flowchart view of Handle Module.

FIG. 29 shows a flowchart view 2900 of a Handle Module 2870. The operation begins with a first decision 2910 for NULL (similar to 2855), with "no" proceeding to a second decision 2915 for super and "no" diverting to a first declaration 2920 for module. For the second decision 2915, "yes" proceeds to a second declaration 2930 for modules, followed by a while loop 2940 for each member x that proceeds to a third declaration 2950 setting members to the module. Upon completion of the loop 2940 and "no" from the second decision 2915 terminates the operation.

Figure 30:
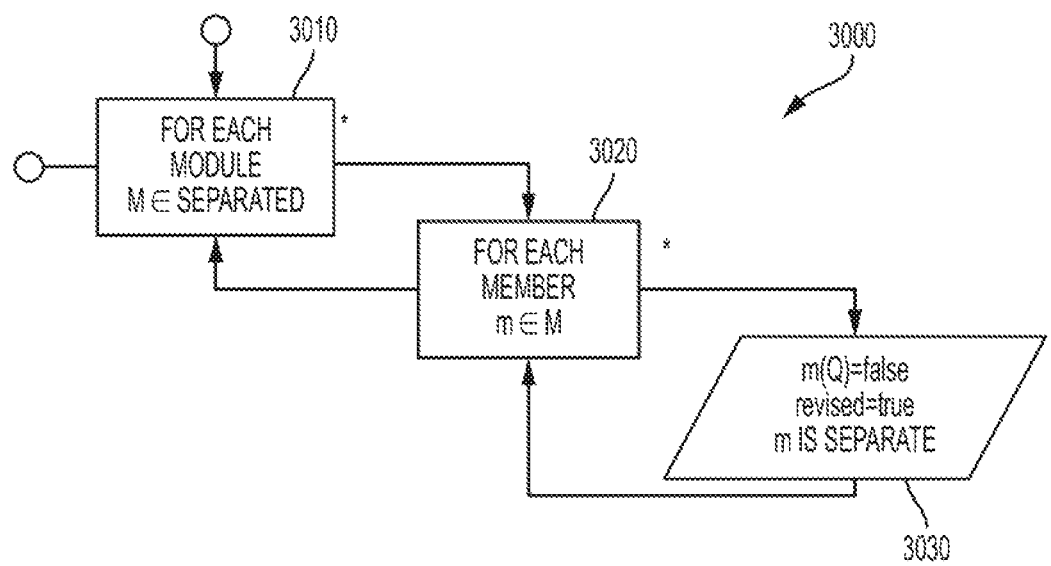
FIG. 30 is a flowchart view of Clear and Separate.

FIG. 30 shows a flowchart view 3000 of a process to execute Clear and Separate 2880. The operations begin with a first while loop 3010 for each module M with a second while loop 3020 for each member. A declaration 3030 sets the method a for each member, which terminates upon completion of both loops 3010 and 3020.

FIGS. 24 through 30 describe the iterative Q algorithm adapted from Blondel for software analysis. As described in Parts IV.C and D, the process has been adapted by adding the short Q calculation 2470, the large move 2440, and a second revised condition in 2425.

The full calculation of Q 2500 describes in a double-nested loop which embodies the original calculation described by Blondel and shown in eqn. (1). The short calculation of Q 2700 describes a pair of single-loop calculations which are executed sequentially. The cost of the full calculation is O(n!) and is too costly to execute repeatedly for each small move. The short calculation is much shorter as it only considers the edges directly affected by the proposed change. As shown in FIG. 7, the movement of 775 into 740 or 765 into 750 affects edges 780, 785, 790 and 795. This narrowly focused subset of the graph is the whole domain of the short Q calculation.

Note in 2700 that the short calc process features prominently in the test of two alternatives 725 and 735. Although not prominent in 2600, the direction used in 2675 and 2685 are set in 2780 based on the optimal value for the move. When ties occur, a small random decision may be implemented, but is not shown in these exemplary embodiments.

The single move process 2600 is much like that described by Blondel, but the large move process 2800 is entirely new. Also shown in FIG. 8, even though two modules 810 and 820 are clearly connected to each other no single node may move because of the internal cohesion within each module. In 2820 each member of the module 820 would be examined. The decision 2845 is meant to identify any "other" module (i.e., M!=M2) which is linked to the module M. If two or more "other" modules are found, as with 810's connection to 820 and 830, no large movement is possible 2860. If only one "other" module is found, as with 810, then the two modules may be combined into a super module in 2870. If no "other module is found, then the module is considered to be separated and is removed from the Q algorithm 2880.

The addition of large movements 2800 creates an instability in the value Q such that q1 calculated in 2470 may be less than q0 recorded in 2460. This instability may cause the value of q1-q0 to be negative in 2425 and necessitates a second condition revised which forces the next cycle of the Q algorithm. The second condition is set in 2930 and 3030 when a large move is made. Thus the new operation is accounted for in the main loop 2400 as part of the criteria to continue the Q algorithm.

Figure 31:
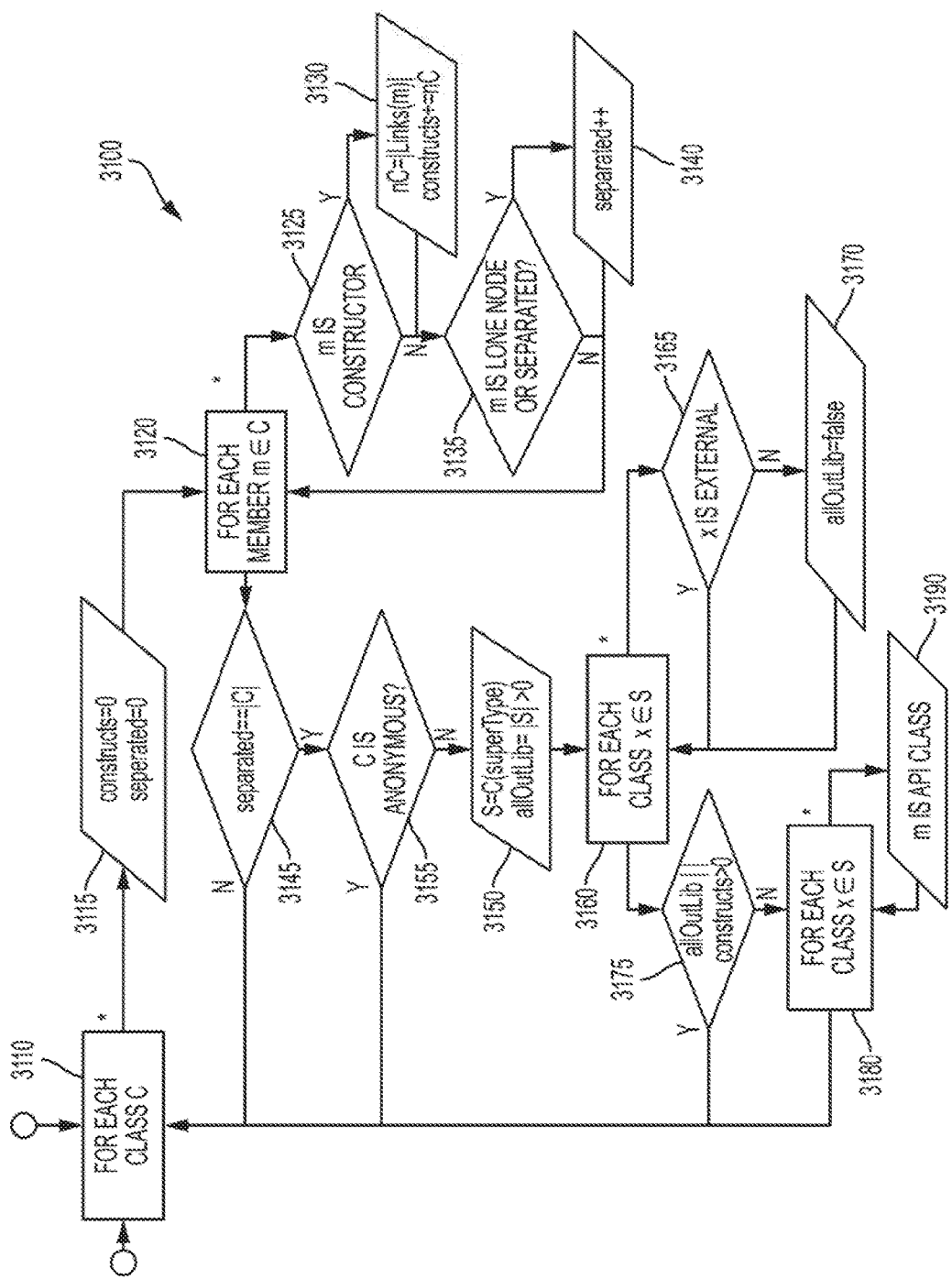
FIG. 31 is a flowchart view of Find API Classes.

FIG. 31 shows a flowchart view 3100 of a process to execute Find API Classes. The operations begin with a first while loop 3110 for each class C with a first declaration 3120 followed by a first declaration 3115 to initialize constructs and separated values and then a second while loop 3120 for each member m as an element of the class. The process continues to a first decision 3125 for whether the member is a constructor, with "yes" proceeding to a second declaration 3130 and "no" leading to a second decision 3135 for whether the member is separated, such that "yes" increments a separated counter in a third declaration 3140, and "no" returns to the second loop 3120, which upon completion proceeds to a third decision 3145 that subsequently leads to a fourth declaration 3150. For the separated operation in the third decision 3145, "yes" leads to a fourth decision 3155 as to whether the class is anonymous, with "no" proceeding to the fourth declaration 3150. The operation returns to the first loop 3110 in response to "no" from the third decision 3145 and "yes" from the fourth decision 3155. A third while loop 3170 initiates for each class following the fourth declaration 3150 and leading to a fifth decision 3165 for whether the member is external, with "yes" returning to the third loop 3170 and "no" setting a label in a fifth declaration 3170. Completion of the third loop 3160 leads to a sixth decision 3175 on whether constructs exceed zero, with "yes" returning to the first loop 3110 and "no" leading to a fourth while loop 3180 to set the member as an API class in a sixth declaration 3190. Upon completion the fourth loop 3180 proceeds to the first loop 3110.

API classes are complete classes which lack connection to the rest of the program under scrutiny. The complete API class is identified because all of the nodes are part lone nodes or separated modules 3135. As described in Part IV.E, the API class may represent a section of unused code erroneously left in the program or a portion of API code meant to interface with external code. As shown in FIG. 9 API code may represent either an external API 940 called by external code 930 and implemented by the application 920 or an internal API 960 called by the application 920 and implemented by external code 950. Either condition creates code 940 and 960 that is not connected to the main application 920. Approximately half of API classes are examples of unused code and represent a design flaw.

Figure 32:
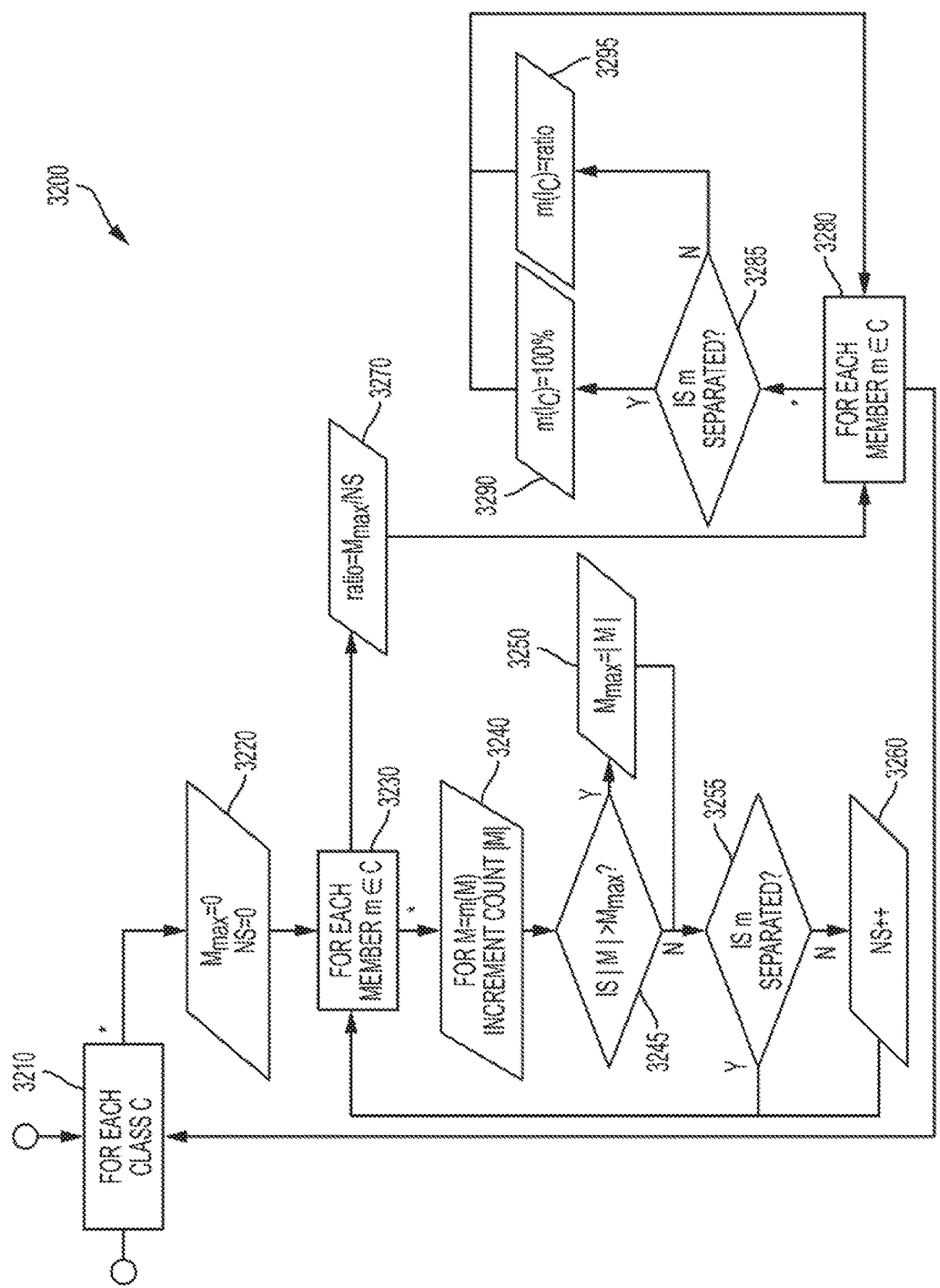
FIG. 32 is a flowchart view of Calculate Class Integrity.

FIG. 32 shows a flowchart view 3200 of a process to execute Calculate Class Integrity. The operations begin with a first while loop 3210 for each class C with a first declaration 3220 to initialize the member maximum followed by a second while loop 3230 for each member m that proceeds to a second declaration 3240 to increment the member and then a first decision 3245 for whether the absolute member exceeds the maximum. A response of "yes" diverts to setting the maximum to the member value in a third declaration 3250, while "no" proceeds to a second decision 3255 for whether the member is separated, with "yes" returning to the second loop 3230 and "no" proceeding to incrementing the NS value. Upon completion of the second loop 3230, a fourth declaration 3270 sets a ratio of the maximum-to-NS and proceeds to a third while loop 3280 for each member in the class. This leads to a third decision 3285 on whether the member is separated, with "yes" proceeding to class integrity being set to 100% in a fifth declaration 3290, and "no" diverting to the ratio in a sixth declaration 3295 before both return to the third loop 3280, leading to completion of the first loop 3210.

Figure 33:
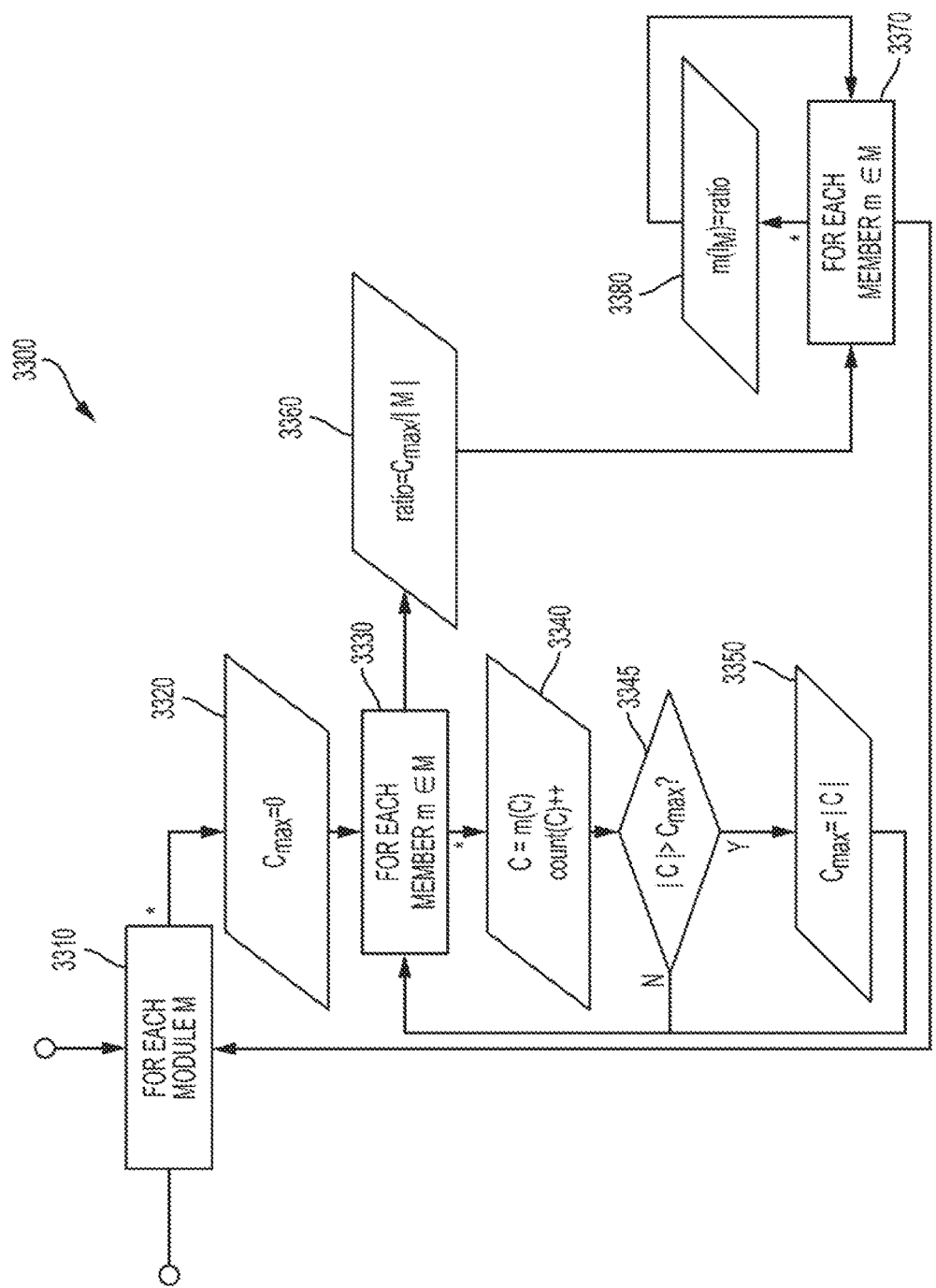
FIG. 33 is a flowchart view of Calculate Module Integrity.

FIG. 33 shows a flowchart view 3300 of a process to execute Calculate Module Integrity. The operations begin with a first while loop 3310 for each module M with a first declaration 3320 to initialize the class maximum followed by a second while loop 3330 that proceeds to a second declaration 3340 to increment class. The operation then leads to a first decision 3345 of the absolute class value being greater than the maximum, with "no" returning to the second loop 3330 and "yes" diverting to a third declaration 3350 setting the maximum to the class value. Upon completion of the second loop 3330, the operation proceeds to a fourth declaration 3360 for a ratio of class maximum to modules, followed by a third while loop 3370 to set the integrities to the ratio in the fourth declaration 3380 before returning upon completion of the third loop 3370 to the first loop 3310.

FIGS. 32 and 33 represent similar double-nested loop processes for the calculation of class and module integrity values. Also described in Part IV.E, the processes are substantially similar except for the consideration of separated class members in 3285 and 3290. The purpose of the loop is to identify the largest fragment of the class (or module) which is completely integrated within a module (or class). As shown in FIG. 10, classes and modules do not always align. Here the fragment 1060 is a portion of the class 1050 within Module 1030 and a portion of the module 1030 within the class 1030. In each case 1060 represents a minor portion of the whole.

FIG. 12 shows a second example which exemplifies class and module integrity. Here portions of module 1210 belong to three classes 1220, 1230 and 1240. The largest portion of 1210 is 1260 representing 5/9 or 56% of the module. This value is applied as the module integrity to all members of the module 3380. Conversely, class 1220 is divided into two modules with the largest portion being 7/12 or 58% of the class. This value is applied as the class integrity to most members 3295, but separated members all have a class integrity of 100%. These values are calculated as a required element of the dysplasia detection process.

FIG. 15 shows additional examples of integrity values between competing classes and modules. In 1510 the module 1520 is fragmented between three classes with the largest portion (6/10 or 60%) is in class 1525. In 1530 the largest portion of module 1530 (4/8 or 50%) is in class 1420. In 1550 the largest portion of module 1560 (6/9 or 67%) is in class 1590.

Figure 34:
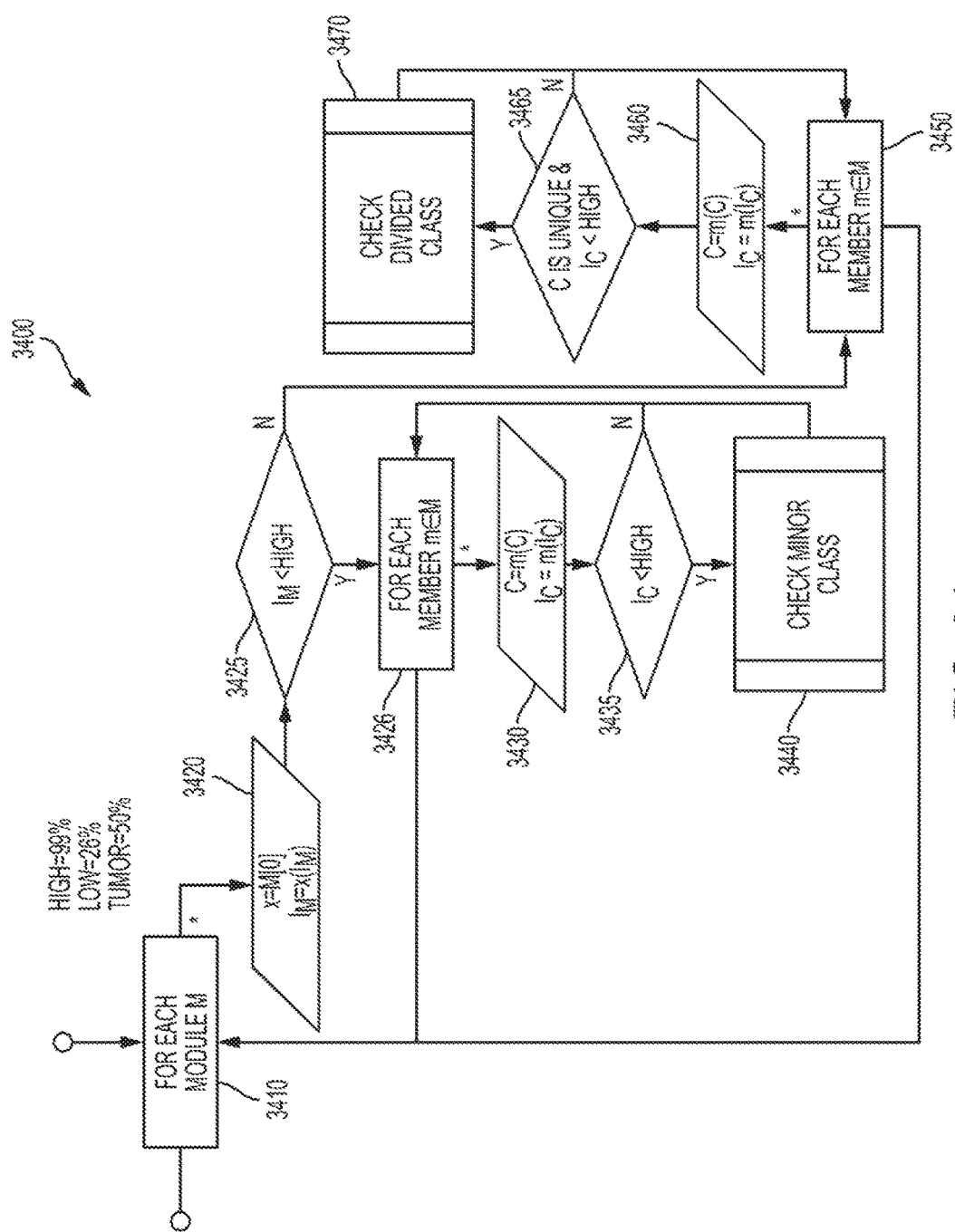
FIG. 34 is a flowchart view of Locate Module Cancers.

FIG. 34 shows a flowchart view 3400 of a process to execute Locate Module Cancers. The operations begin with a first while loop 3410 for each module M with a first declaration 3420 followed by a first decision 3425 for whether the module integrity is less than high. For this, "yes" proceeds to a second while loop 3426 which proceeds to a second declaration 3430 that leads to a second decision 3435 for whether the class integrity is greater than high. For this, "no" returns to the first loop 3410 and "yes" leads to a first calculation 3340 to check minor class before returning to the first loop 3410. For the first decision 3425, "no" diverts to a third while loop 3450 for each member and sets initial values in a third declaration 3460 followed by a third decision 3465, with "no" returning to the third loop 3450 and "yes" proceeding to a second calculation 3470 to check divided class before returning to the third loop 3450. The operation returns to the first loop 3410 upon completion of the third loop 3450.

Figure 35:
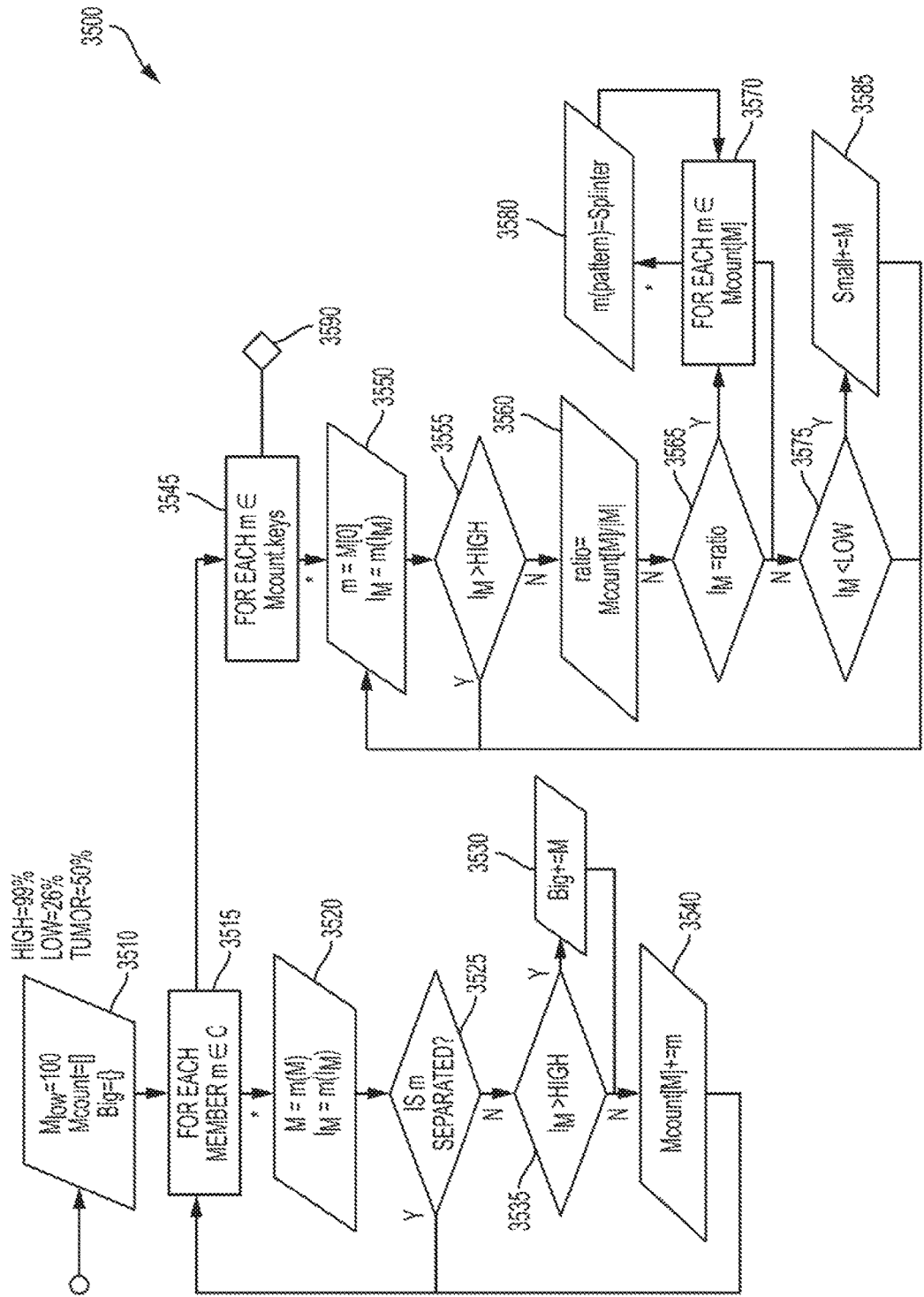
FIG. 35 is a flowchart view of Check Divided Class (part A)

FIG. 35 shows a flowchart view 3500 of a process to execute Check Divided Class (part A). The operations begin with a first declaration 3510 to set counts followed by a first while loop 3510 for each member m with parameter declaration 3520 followed by a second declaration 3520 to set module values. The operation inquires a first decision 3525 for whether the member is separated, with "yes" returning to the first loop 3515 and "no" leading to a second decision 3535 for whether module integrity is greater than high. In this case, "yes" diverts to a third declaration 3530 for the module and "no" leads to a fourth declaration 3540 for the module count before returning to the first loop 3515. Upon completion of the first loop 3515, the operation proceeds to a second while loop 3545 involving keys followed by a fifth declaration 3550 that leads to a third decision 3555 (similar to the first decision 3535), with "yes" returning to the second loop 3545 and "no" proceeding to a fifth declaration 3560 setting the module count. This is followed by a fourth decision 3565 for whether module integrity equals the ratio, where "yes" diverts to a third while loop 3570 and "no" leading to a fourth decision 3575 for whether module integrity is greater than low, where "no" returns to the second loop 3545. The third loop 3570 sets the pattern to splinter in a sixth declaration 3580 before returning to the fourth decision 3575, which for "yes" diverts to setting module to small in a seventh declaration 3585. Upon completion of the second loop 3545, this operation terminates at exit 3590.

Figure 36:
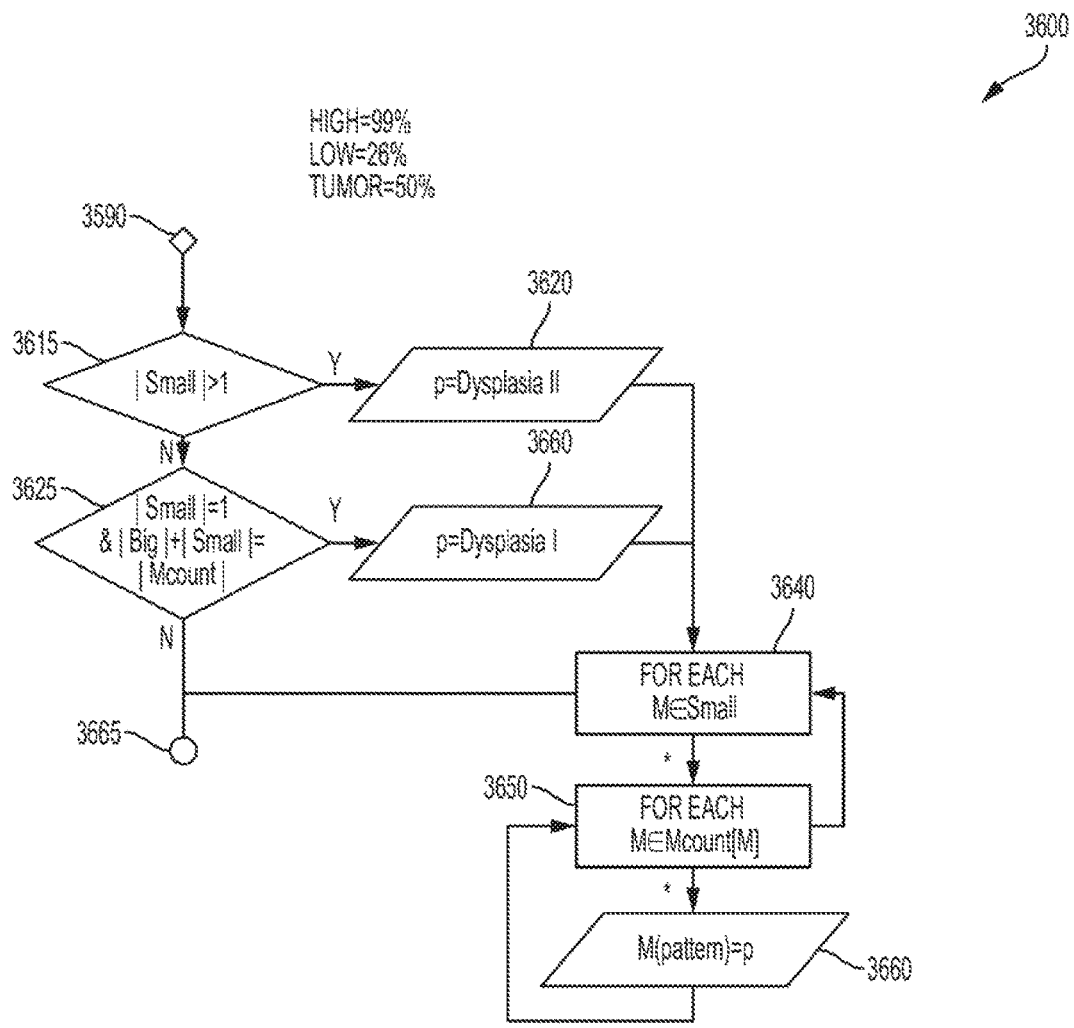
FIG. 36 is a flowchart view of Check Divided Class (part B)

FIG. 36 shows a flowchart view 3600 of a process continuing from exit 3590 on FIG. 35 to execute Check Divided Class (part B) that begins at entry 3610 (corresponding to exit 3590) and leads to a first decision 3615 for whether small exceeds unity, with "yes" proceeding to a first declaration 3620 for Dysplasia II and "no" proceeding to a first while loop 3625. In this case, "yes" diverts to a second declaration 3630 for Dysplasia I and "no" terminating at exit node 3665. After each declaration 3620 and 3230, the operation continues to a second while loop 3640 for each method that proceeds to a third while loop 3650 for each module count for which patterns are set by a third declaration 3660. The operation returns to the second loop 3640 upon completion of the third loop 3650, and the operation terminates at 3665 upon completion of the third loop 3640.

Figure 37:
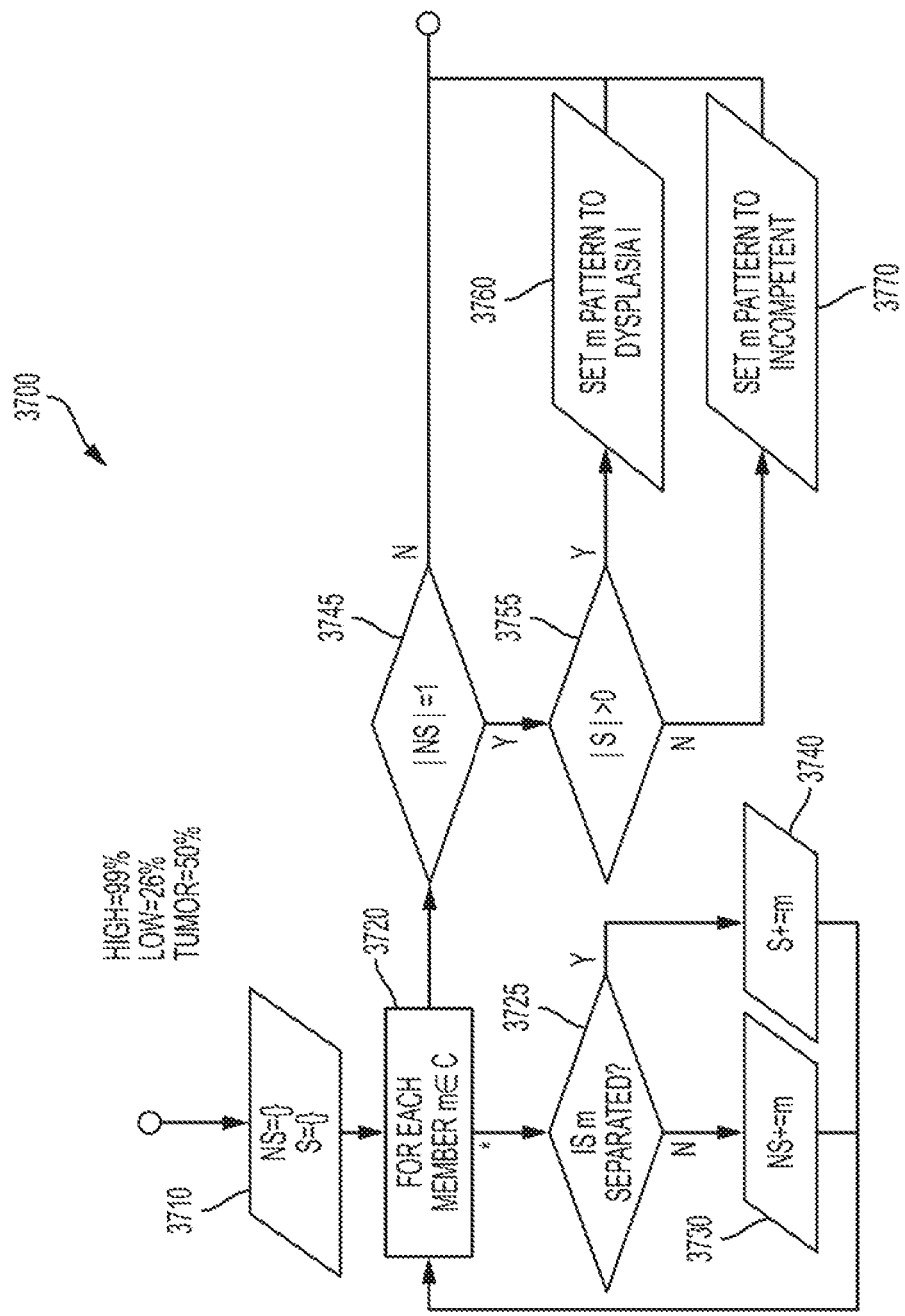
FIG. 37 is a flowchart view of Check Minor Class.

FIG. 37 shows a flowchart view 3700 of a process to execute Check Minor Class 3470. The operations begin with a first declaration 3710 for NS followed by a while loop 3720 for each member m followed by a first decision 3725 for member being separated. For this, "no" sets NS to the method by a first declaration 3730, while "yes" sets S to the method by a second declaration 3740 before each returns to the loop 3720, which upon completion proceeds to a second decision 3745 as to whether NS is unity, with "yes" leading to a third decision 3755 as to whether S is greater than zero. For the third decision 3755, "yes" sets the method pattern to Dysplasia I by a fourth declaration 3760, and "no" sets the method pattern to Dysplasia II by a fifth declaration 3770. Both declarations 3760 and 3770, along with "no" from the second decision 3745 proceed to termination.

FIGS. 34 through 37 describe the single-loop process which detects dysplasia. As described in Part IV.F this process examines disputed areas defined by threshold values HIGH and LOW. FIG. 16 shows examples of each in a single module. The first decision 3425 is meant to identify poorly integrated modules. If any class in the module is highly integrated 3435, it may be of interest and be further scrutinized in view 3700. If the module is highly integrated, then each poorly integrated class 3465 is examined in views 3500 and 3600.

The objective in view 3700 to check minor class is to determine the meaning of the single node (the only condition which could trigger this check. If the single node is the only surviving member of a class with many separated members, it is a form of dysplasia 3760. Otherwise it is the only member in the class that must be incompetent 3770.

The objective in check divided class 3500 and 3600 is to determine the degree of division among the class members. The first loop 3500 determines if the various modules within C have high integrity or low. The second loop 3545 checks to see if the portion of M within C (i.e., Mcount [M]) is the largest piece of M 3565. If so 3570 this is a large splinter. If not, a further possibility exists that the module is also highly fragmented 3585. These are referred to as Big 3530 and Small 3585 portions within C. Passing into view 3600, if more than one Small portion exists, then the dysplasia is too advanced to know where the fault lies and the pattern is designated as Dysplasia II 3620. The other possibility is that there is one Small module and the rest are Big. If this occurs, then the small module is Dysplasia I 3630. If either condition is satisfied, the designated pattern is put on all small nodes 3660.

FIG. 15 serves to demonstrate the different conditions discovered in this process. None of the modules in 1510, 1530, or 1550 have high integrity. The first case does not exhibit any condition of interest. However, the single nodes 1545 and 1585 represent an incompetent node detected in 3770 and Dysplasia I detected in 3760.

Figure 38:
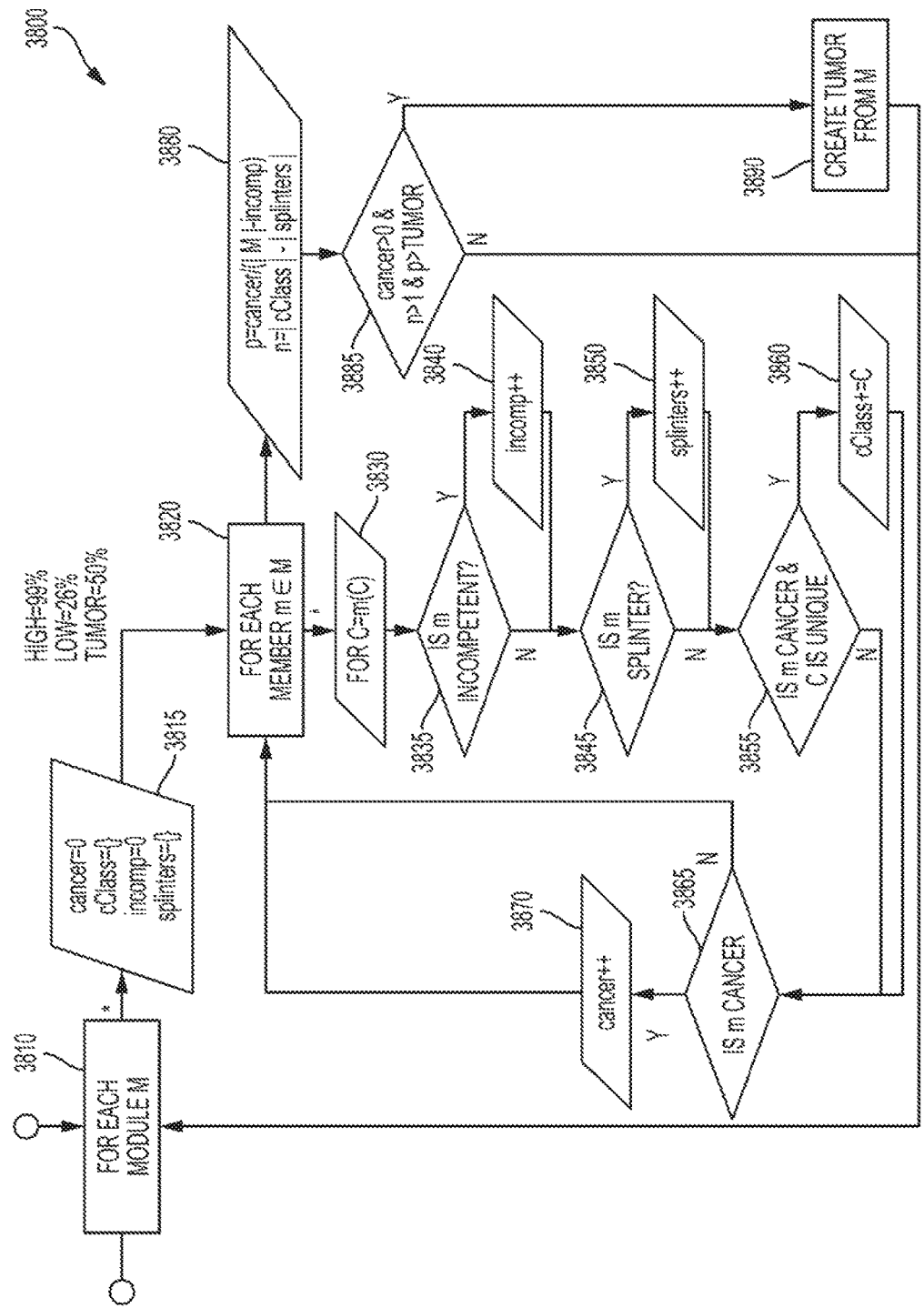
FIG. 38 is a flowchart view of Find Tumors.

FIG. 38 shows a flowchart view 3800 of a process to execute Find Tumors. The operations begin with a first while loop 3810 for each module M with a first declaration 3820 followed by a second while loop 3820 that proceeds to a second declaration 3830 on class succeeded by a first decision 3835 regarding competence. For the first decision 3835, "yes" increments an incompetence counter in a third declaration 3840, and "no" diverts to a second decision 3845.

For the second decision 3845, "yes" increments a split counter in a fourth declaration 3850, and "no" diverts to a third decision 3855. For the third decision 3855, "yes" increments a class counter in a fourth declaration 3860 for class, and "no" diverts to a fourth decision 3865, where "no" returns to the second loop 3820 and "yes" diverts to a fifth declaration 3870 to increment cancer.

Upon completion of the second loop 3820, the operation proceeds to a sixth declaration 3880 on cancer and splitters. This leads to a fifth decision 3885, with "no" returning to the first loop 3810 and "yes" diverting to create tumor by a calculation 3890.

View 3800 shows the double-nested loop process for discovering tumors. As described in Part IV.G, this is actually a simple process meant to determine if the previously discovered dysplasia justifies the identification of a tumor based on the cancer threshold value. This happens on a module level and loop 3810 examines each module in turn. Each member in the module falls into one of several critical groups. Incompetent nodes discovered in 3770 are counted 3840. Splinters discovered in declaration 3580 are also counted 3850. The term "cancer" in decisions 3855 and 3865 are meant to indicate either Dysplasia I or Dysplasia II. Classes containing cancer are counted as decision 3860 as well as all cancer members individually as decision 3870.

The complex formulae in decision 3880 determine if the critical cancer threshold has been reached. The divisor of ratio p (i.e., |M|-incomp) excludes all incompetent nodes from contributing to the ratio p. Only the cancer members contribute to the ratio p. Then the number of cancerous classes must exceed the number of splinters. These two conditions ensure that in 3885 the decision is made based on a majority of cancer and a lack of coherent splinters within the module. If the conditions are satisfied, then a tumor is created 3890.

Consider the example demonstrated in FIG. 13. Here module 1320 is a tumor. There is an incompetent node in class 1370. There are no large splinters as none of the disputed areas 1335, 1345, 1365, and 1380 are the largest component of their corresponding classes. Thus the ratio p is calculated as p=10/10=100% and n=5−0=5. Thus the condition 3885 is satisfied and module 1320 is a tumor.

Figure 39:
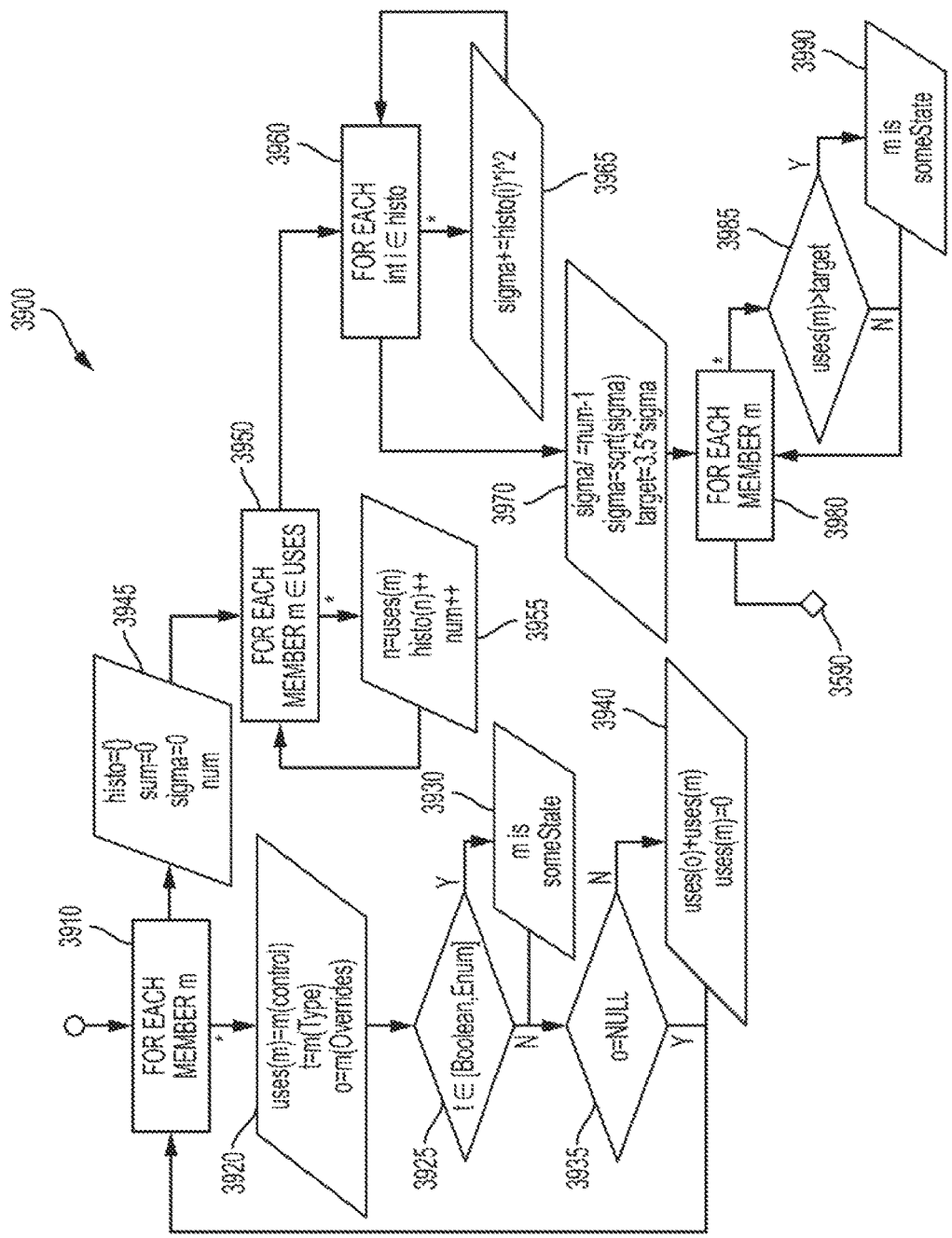
FIG. 39 is a flowchart view of Count State (part A)

FIG. 39 shows a flowchart view 3900 of a process to execute Count State (part A). The operations begin with a first while loop 3910 for each member m with a first declaration 3920 followed by a first decision 3925 on t being an element of Boolean or numerical sets, with "yes" diverting to a second declaration for a state identifier and proceeding to a second decision 3935 for NULL, also resulting from "no" from the first decision 3925. For the third decision 3935, "no" diverts to a third declaration for uses, afterwards returning to the first loop 3910, also applicable to "yes" from the second decision 3935. Following completion of the first loop 3910, the operation proceeds to a third declaration 3945 followed by a second while loop 3950 for setting a fourth declaration 3955. After completion of the second loop 3950, the operation proceeds to a third while loop 3960 as a history counter for setting a fifth declaration 3965. After completion of the third loop 3960, the operation proceeds to a sixth declaration 3970 for standard deviation, followed by a fourth while loop 3980 for a decision 3985 of uses exceeding target, in which "no" returns to the fourth loop 3980 and "yes" diverts to setting state identification by a seventh declaration 3990, returning to the fourth loop 3980. After completion of the fourth loop 3980, this operation terminates at node 3990.

Figure 40:
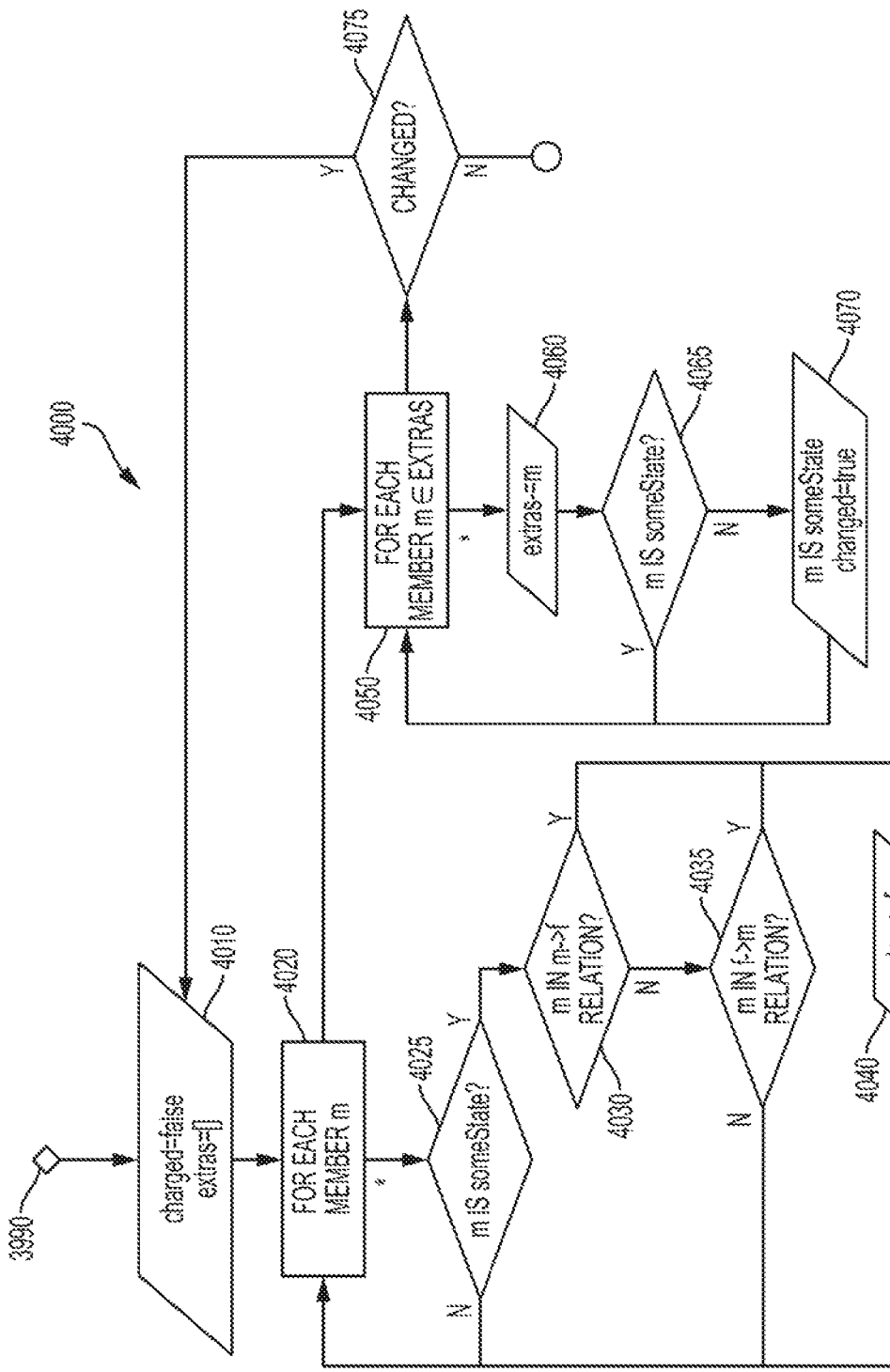
FIG. 40 is a flowchart view of Count State (part B)

FIG. 40 shows a flowchart view 4000 of a process continuing from node 3990 in FIG. 39 to execute Count State (part B). The operations begin with a first declaration 4010 followed by a first while loop 4020 for each member m to a first decision 4025 regarding identification with a state, with "no" returning to the first while loop 4020 and "yes" proceeding to a second decision 4030 regarding relationship to fields, with "yes" proceeding to a third decision 4035, and "yes" to either decisions 4030 and 4035 proceeding to a second declaration 4040 before returning to the first loop 4020. A second while loop 4050 proceeds from completion of the first loop 4020 to a third declaration 4060 and a fourth decision 4065 (similar to 4025) regarding state identification, with "yes" returning to the second loop 4050 and "no" proceeding to a fourth declaration 4070 stating a change. Upon completion of the second loop 4050, the operation proceeds to a fourth decision 4075 of changes, with "yes" returning to the first declaration 4010 and "no" terminating the operation.

FIGS. 39 and 40 describe the process of counting state members. As described in Part IV.I, this is a multi-stage process. In the first loop 3910 the control uses of each member is counted 3920. If the native state of the member is a Boolean or Enumeration 3925, then state is assumed 3930. If the member overrides another method, the uses are attributed to the original method 3940.

Having taken care of the native state types in the first stage, the second loop 3950 creates a histogram that represents the distribution of uses throughout the program. The third loop 3960 completes the process by calculating the variance of the histogram and finally calculating the target value nZσ 3970 which separates statistically identifiable state members from non-state members. Each member which exceeds the target value is designated as state 3990.

Finally, the last loop controlled by the decision 4075 looks for state members with a relationship linking them to non-state members. This specifically targets accessor relationships 4030 and 4035. These extra elements are examined 4065 and any non-state member is changed to state 4070. This linking process may be repeated several times until no changes are found 4075 and the process exists. Note that the related metrics described in Part IV.J are not shown in these flow charts, but are obvious derivatives based on the state members and data flow analysis.

FIG. 41 shows the overall flow chart view 4100. Note that all preprocessing steps 4110, 4115, and 4120 must be completed first as those results affect later metrics. Q Algorithm related steps 4125, 4130, 4135, 4140, 4145, and 4150 must be completed in sequence. Although this exemplary embodiment shows state counting 4155 after the Q Algorithm steps, 4155 may be completed independently.

While the metrics described in exemplary embodiments are intended to meet certain objectives paralleling manual program analysis, the same techniques can be used to accomplish similar goals that would not significantly depart from this invention and would rely upon these processes. While certain features of the embodiments of the invention have been illustrated as described herein, many modifications, substitutions, changes and equivalents will now occur to those skilled in the art. It is, therefore, to be understood that the appended claims are intended to cover all such modifications and changes as fall within the true spirit of the embodiments.

What is claimed is:

1. A computer-implemented software diagnostic method for identifying code patterns in a plurality of source code files for segregating degenerate code, said method comprising steps of:
    compiling said plurality of source code files into a plurality of compilation files;
    generating a graph to form from said plurality of compilation files, a plurality of nodes and a plurality of edges, each node denoting a code element from said plurality of source code files, and each edge denoting a corresponding relationship between nodes in said plurality of nodes, said code element representing one of a field, a function, an enumeration and a member;
    identifying a data transparency property for said each node having said function;
    calculating a distribution control use to identify data-dependency for said plurality of nodes;
    assigning a first pattern label for at least one of decorator, getter and setter functions;
    calculating a degree to identify external connections of said third plurality of nodes;
    identifying a lone node within said plurality of nodes;
    assigning a second pattern label for said lone node;
    mapping a plurality of modules through a Q algorithm to form an optimal node-to-module map between said plurality of nodes and said plurality of modules for determining groups of closely-related nodes within said graph;
    establishing a plurality of classes within said each source code file in said plurality of source code files corresponding to said plurality of modules;
    assigning a third pattern label for said plurality of classes;
    determining a class integrity for each class of said plurality of classes
    determining a module integrity for each module in said plurality of modules;
    segregating a plurality of high-integrity classes from said plurality of classes, wherein said plurality of high-integrity classes are above pre-determined classes threshold;
    segregating a plurality of high-integrity modules from said plurality of modules, wherein said plurality of high-integrity modules are above pre-determined modules threshold;
    responsive to said segregations, correlating a portion of modules of said plurality of high-integrity modules with corresponding high-integrity classes of said plurality of high-integrity classes;
    assigning a fourth pattern label for dysfunctional nodes among said plurality of nodes;
    determining a code cancer portion of dysfunction for said dysfunctional nodes assigned said fourth pattern label within each said module of said plurality of modules; and
    based on determining said code cancer portion of dysfunction, establishing a state to identify and correct said plurality of source code files.

2. The method according to claim 1, wherein said dysfunctional nodes in said plurality of nodes include dysplasia, splinter and incompetent nodes.

3. The method according to claim 1, wherein said getter function has no parameter and said setter function has one parameter.

4. The method according to claim 1, wherein said code cancer portion determination employs an $nZ\sigma$ algorithm.

* * * * *